US00RE50689E

(19) United States
(12) Reissued Patent
Hinkey

(10) Patent Number: US RE50,689 E
(45) Date of Reissued Patent: Dec. 9, 2025

(54) PORTABLE APPAREL DRYING ASSEMBLIES AND METHODS OF USE

(71) Applicant: Lawrence A. Hinkey, Glens Falls, NY (US)

(72) Inventor: Lawrence A. Hinkey, Glens Falls, NY (US)

(21) Appl. No.: 18/188,659

(22) Filed: Mar. 23, 2023

Related U.S. Patent Documents

Reissue of:
(64) Patent No.: 10,961,655
Issued: Mar. 30, 2021
Appl. No.: 16/695,780
Filed: Nov. 26, 2019

U.S. Applications:
(63) Continuation-in-part of application No. 16/227,757, filed on Dec. 20, 2018, now Pat. No. 10,718,565,
(Continued)

(51) Int. Cl.
*D06F 59/02* (2006.01)
*A47G 25/20* (2006.01)
(Continued)

(52) U.S. Cl.
CPC ..... *D06F 59/02* (2013.01); *A47G 25/20* (2013.01); *A47L 23/205* (2013.01); *F26B 3/02* (2013.01); *F26B 21/008* (2013.01)

(58) Field of Classification Search
CPC ..... F26B 21/00; F26B 21/001; F26B 21/004; F26B 21/008; F26B 9/003; D06F 59/00;
(Continued)

(56) References Cited

U.S. PATENT DOCUMENTS 386,746 A * 7/1888 Hess ..... F26B 21/006 34/104
1,037,224 A * 9/1912 Ermentrout ..... D06C 5/005 138/37
(Continued)

FOREIGN PATENT DOCUMENTS

CA 2801681 A1 7/2013
DE 2852762 A1 6/1980
(Continued)

OTHER PUBLICATIONS

Communication pursuant to Article 94(3) EPC from related EP application 17739420.2 dated Jun. 30, 2020, 2 pages.
(Continued)

*Primary Examiner* — Sarah B Mcpartlin
(74) *Attorney, Agent, or Firm* — Tech Valley Patent, LLC; John Pietrangelo

(57) ABSTRACT

Portable assemblies and methods for drying apparel, for example, footwear or gloves, are provided. The assemblies include a housing; projections or pegs pivotally mounted to or inserted into the housing, the projections each having an inlet, an outlet, an internal passage communicating the inlet to the outlet, and the projections can be oriented in a position adapted to receive the apparel; and a source of air having an outlet in fluid communication with the inlets of the projections. The assemblies may include a handle or strap for transporting the assemblies. The air may be provided by a fan or blower, and may be heated. The projections can be pivotally mounted in different directions and extend and retract into the housing. The retracted projection may be flush with the surface of the housing when not in use.

20 Claims, 29 Drawing Sheets

Related U.S. Application Data which is a continuation-in-part of application No. 15/195,250, filed on Jun. 28, 2016, now Pat. No. 10,197,332.

(51) Int. Cl.
*A47L 23/20* (2006.01)
*F26B 3/02* (2006.01)
*F26B 21/00* (2006.01)

(58) Field of Classification Search
CPC ..... D06F 59/02; D06F 59/04; D06F 59/06; A47G 25/00; A47G 25/20; A47G 25/06; A47G 25/0607; A47G 25/0664; A47G 25/0685; A47G 25/08; A47L 23/20; A47L 23/205
See application file for complete search history.

(56) References Cited

U.S. PATENT DOCUMENTS

| | | | | |
|---|---|---|---|---|
| 1,074,888 | A | 10/1913 | McIver | |
| 1,413,862 | A * | 4/1922 | David | A43D 11/14 34/112 |
| 2,443,695 | A | 6/1948 | Russell | |
| 2,465,362 | A * | 3/1949 | Elliott | A47L 23/20 392/416 |
| 2,668,368 | A | 12/1952 | Jacobs | |
| 2,835,049 | A | 5/1958 | Jacobs | |
| 3,626,602 | A | 12/1971 | Glowacki | |
| 3,793,744 | A | 2/1974 | Saita | A43D 3/1491 34/104 |
| 3,798,788 | A | 3/1974 | Kuntz | |
| 4,145,602 | A | 3/1979 | Lee | |
| 4,200,993 | A | 5/1980 | Blanc et al. | |
| 4,579,504 | A * | 4/1986 | Lemme | B66F 9/061 414/607 |
| 4,727,656 | A | 3/1988 | Jannach et al. | |
| 4,787,153 | A * | 11/1988 | Chen | A47L 23/205 34/239 |
| 4,856,206 | A | 8/1989 | Klein | |
| 4,887,153 | A | 12/1989 | Uehara et al. | |
| D310,742 | S | 9/1990 | Johnson | |
| 5,199,188 | A | 4/1993 | Franz | |
| 5,222,308 | A | 6/1993 | Barker et al. | |
| 5,287,636 | A | 2/1994 | Lafleur et al. | F26B 21/006 34/239 |
| 5,394,619 | A | 3/1995 | Kaplan | |
| 5,412,928 | A | 5/1995 | Reithel | |
| 5,642,462 | A | 6/1997 | Huff | |
| 5,778,556 | A | 7/1998 | Ohsugi | |
| 5,894,680 | A | 4/1999 | Dalvy | A47L 23/205 34/442 |
| 5,987,773 | A | 11/1999 | Lipscy | |
| 6,698,106 | B1 | 3/2004 | Reithel et al. | |
| 6,766,591 | B1 | 7/2004 | McKinney et al. | D06F 59/02 34/106 |
| 8,322,541 | B2 | 12/2012 | Maclaren-Taylor | |
| 8,857,072 | B1 | 10/2014 | Cocker et al. | F26B 9/003 34/106 |
| 8,984,766 | B2 | 3/2015 | Williams | |
| 9,609,970 | B2 | 4/2017 | Piraino | |
| 10,197,332 | B2 * | 2/2019 | Hinkey | F26B 3/02 |
| 10,718,565 | B2 * | 7/2020 | Hinkey | F26B 21/006 |
| D984,764 | S * | 4/2023 | Dai | D32/8 |
| 2005/0204579 | A1 | 9/2005 | Rosseau et al. | |
| 2006/0186073 | A1 * | 8/2006 | Roe | D06F 59/02 211/85.3 |
| 2007/0193059 | A1 * | 8/2007 | Carey | A47L 23/205 34/239 |
| 2010/0031526 | A1 | 11/2010 | Tuckett | D06F 58/10 34/215 |
| 2013/0008045 | A1 | 1/2013 | McLoughlin et al. | |
| 2013/0199581 | A1 | 8/2013 | Christopherson | |
| 2017/0370647 | A1 | 12/2017 | Hinkey | |
| 2018/0105972 | A1 | 4/2018 | Smoots | |
| 2019/0070472 | A1 * | 3/2019 | Duran | A47F 5/04 |
| 2019/0120551 | A1 | 4/2019 | Hinkey | |
| 2020/0095723 | A1 * | 3/2020 | Hinkey | A47G 25/20 |
| 2024/0110749 | A1 * | 4/2024 | Hinkey | D06F 59/02 |

FOREIGN PATENT DOCUMENTS

| | | | |
|---|---|---|---|
| DE | 20215507 | U1 | 3/2003 |
| EP | 180530 | A1 | 5/1986 |
| FR | 2199452 | A1 | 4/1974 |
| FR | 2702345 | A1 | 9/1994 |
| JP | H02116397 | A | 5/1990 |
| KR | 1020110128483 | A | 11/2011 |
| WO | 2006082487 | A1 | 1/2006 |

OTHER PUBLICATIONS

Annex to Communication pursuant to Article 94(3) EPC from related EP application 17739420.2 dated Jun. 30, 2020, 2 pages.
Seha, Patrick, "Piano Coat Rack," 2pp., Brochure [online]. Seha, date unknown. [retrieved on Jun. 28, 2016] Retrieved from the Internet: <URL: https://www.smow.de/pdf/PerUse_Piano_1.pdf>.
BK Blower Manual, 108998-01, Rev. F, 8pp, Feb. 2007.
Cyclone boot dryers, 3pp., Brochure [online].Cyclone, date unknown. [retrieved on Jun. 21, 2016] Retrieved from the Internet: <URL: http://www.cyclonebootdryers.com>.
Cozywinters boot dryers, 4pp., Brochure [online]. Cozywinters, date unknown. [retrieved on Jun. 21, 2016] Retrieved from the Internet: <URL: http://cozywinters.com/boot-dryers.html>.
Search Report from related EP application 19218807.6-1016, dated Apr. 3, 2020, 7 pages.
International Search Report from related PCT application PCT/US2017/039501, dated Aug. 6, 2017, 4 pages.
Written Opinion from related PCT application PCT/US2017/039501, dated Aug. 6, 2017, 8 pages.
Wiliams Boot Dryers. Datasheet [online]. Williams, date unknown. [retrieved on Feb. 22, 2018] Retrieved from the Internet: <URL: http://www.seaproductsonline.com/WilliamsBootDryers.htmll>.
GearDryer Boot Dryers. Datasheet [online]. GearDryer, date unknown. [retrieved on Feb. 22, 2018] Retrieved from the Internet: <URL: http://www.seaproductsonline.com/GearDryer.html>.
Wintersteiger Boot Dryers. Datasheet [online]. Wintersteiger, date unknown. [retrieved on Feb. 22, 2018] Retrieved from the Internet: <URL: https://www.wintersteiger.com/us/Drying-and-Hygienic/Products/Product-Range/Open-drying-systems-in-steel-Boot-dryer-glove-dryer/206-Boot-51020l>.
Office Action for parent U.S. Appl. No. 15/159,250 dated Jun. 20, 2018, including Notice of References cited, 8pp.

* cited by examiner

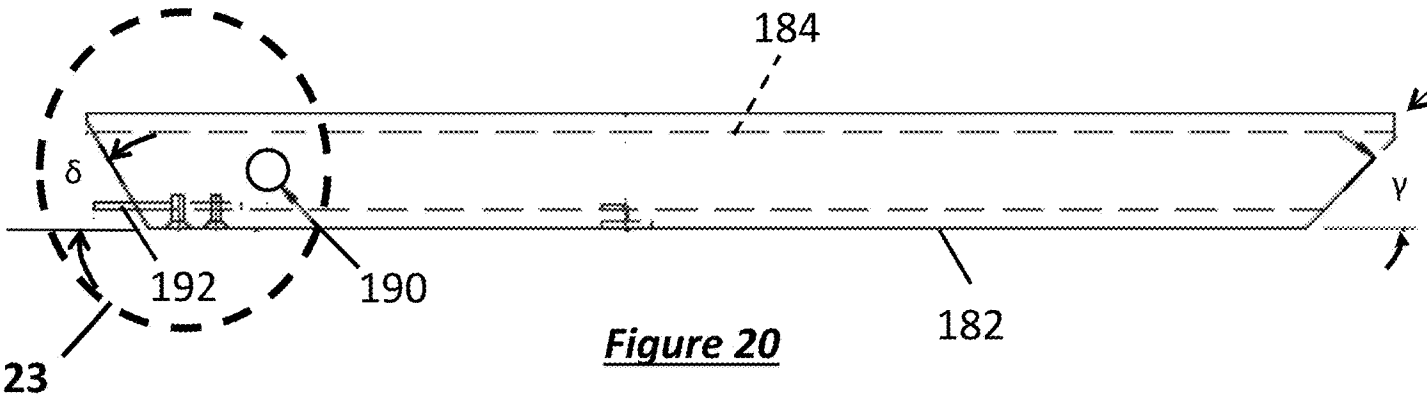
Figure 20
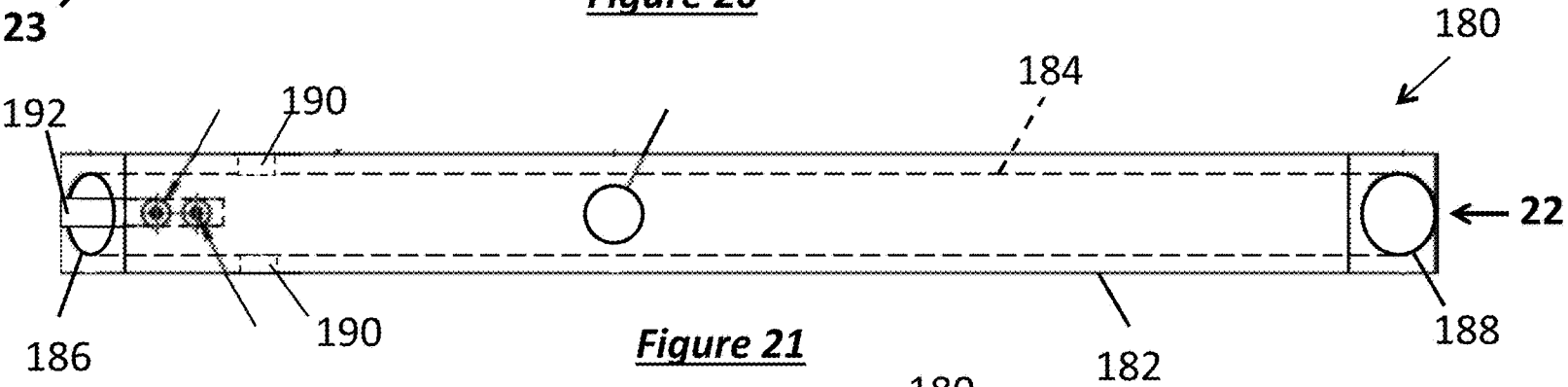
Figure 21
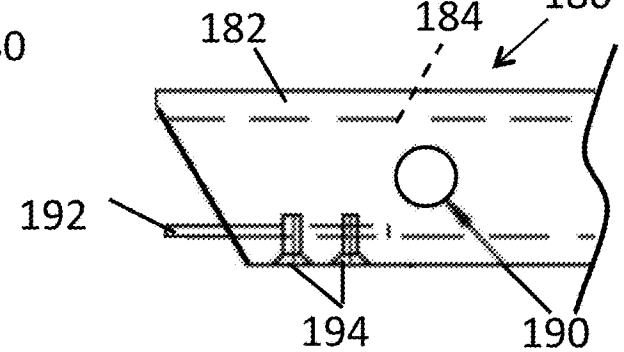
Figure 23
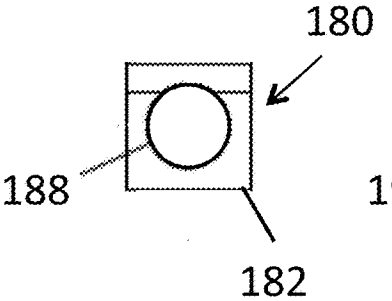
Figure 22
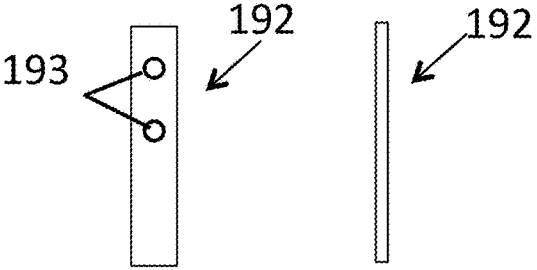
Figure 24
Figure 25

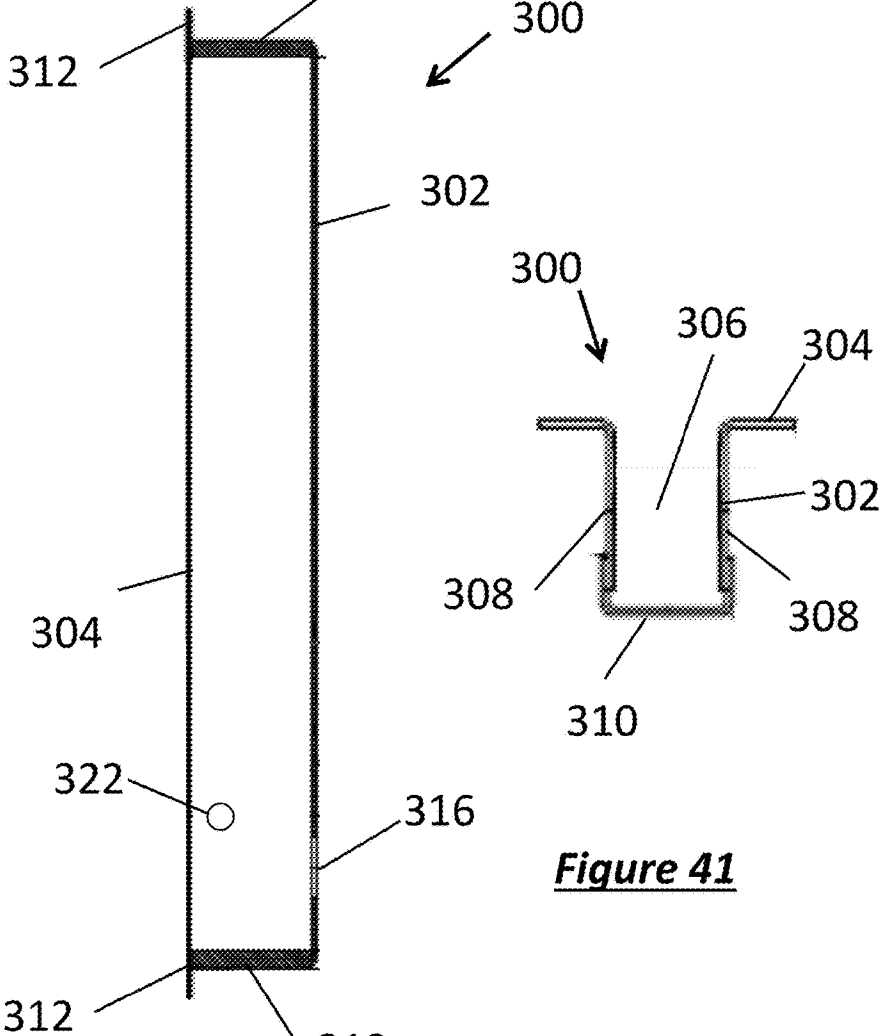
Figure 41
Figure 40
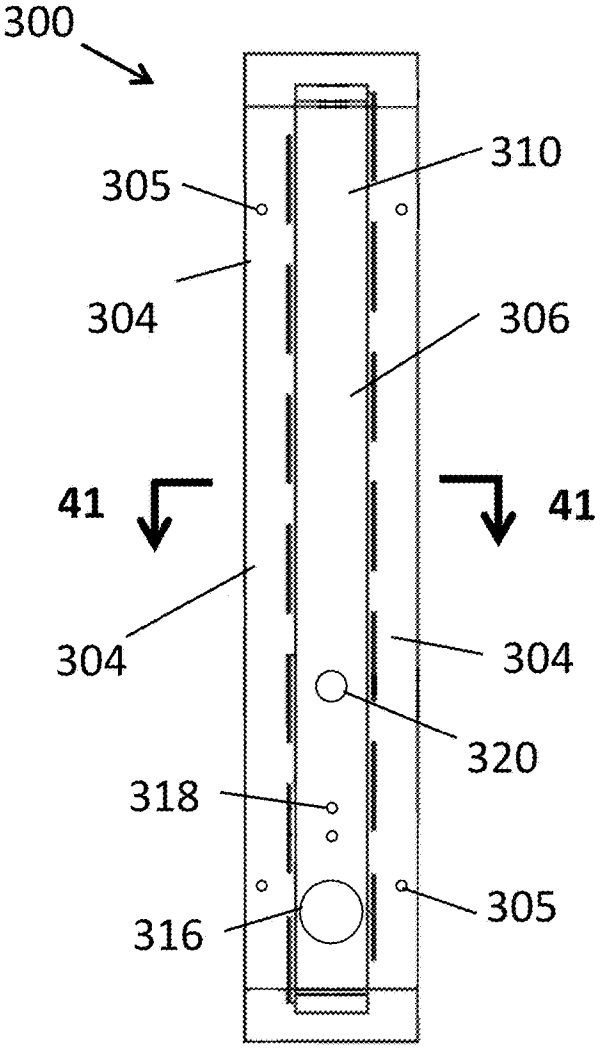
Figure 39

PORTABLE APPAREL DRYING ASSEMBLIES AND METHODS OF USE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application is a continuation-in-part application of U.S. application Ser. No. 16/227,757 filed on Dec. 20, 2018, which is a continuation-in-part of and claims priority to U.S. application Ser. No. 15/195,250 filed on Jun. 28, 2016, now U.S. Pat. No. 10,197,332, the disclosures of which are included by reference herein in its entirety.

BACKGROUND OF THE INVENTION

Technical Field

The present invention concerns apparel drying, for example, the drying of footwear and hand wear. Specifically, aspects of the invention provide drying assemblies and methods employing wall-mounted panels and portable assemblies having pivotally mounted projections adapted to emit a flow of drying air to apparel hung on the projections.

Description of Related Art

Wet clothing, especially, wet footwear, is a common irritation and inconvenience to most, in particular to mothers and skiers. Waiting for footwear or clothing to dry for re-use or storage can hamper outdoors activity or prevent timely access to recreational opportunities and commercial enterprises. Accordingly, many attempts have been made in the art to facilitate the drying of apparel. However, prior art attempts have typically included cumbersome devices and methods that, for example, do not lend themselves to the décor or environment typically desired in a home, office, or resort.

For example, U.S. Pat. No. 3,793,744 discloses a wall-mounted rack for drying shoes having conduits and rigidly mounted extensions for distributing air. U.S. Pat. No. 4,200,993 discloses a tower for drying ski boots having a vertical plenum and rigidly mounted tubes projecting from the plenum for distributing air to the boots. U.S. Pat. No. 5,287,636 discloses a shoe dryer having pivoting tubes that are inserted into the shoes to distribute hot air. PCT Publication WO 2006/082487 discloses a wall-mounted boot dryer having projections that rotate when loaded to contact a switch which activates a heating element in the projection. German patent DE 20215507 discloses a heating rack having vertical tubes and horizontal tubes carrying heated water with projecting tubes for hanging articles.

In addition, numerous boot-drying devices are presented online, for example, the "Cyclone" boot dryer disclosed at www.cyclonedryers.com and several portable boot dryers at http://cozywinters.com/boot-dryers.html, among others.

However, these and other devices and methods lack the convenience, appearance, and utility of aspects of the present invention.

SUMMARY OF THE INVENTION

The present invention, in its many embodiments and aspects, was inspired by an existing coat rack. Specifically, the "Piano Coat Rack" designed and offered by Patrick Seha, a Belgian furniture designer. Though somewhat similar in appearance to the Seha coat rack, the present invention includes a wall-mounted rack/panel for drying apparel, such as, footwear and gloves. The panel includes retractable hooks or pegs upon which apparel can be hung. The pegs are hollow and perforated and fed by drying air, for example, heated drying air. The retractable pegs pivotally mount to the panel and engage an air distribution system, and, when extended, the pegs may engage the source of drying air. When not in use, the retractable pegs are retracted into the panel to, for example, provide an aesthetically appealing wall decoration.

One embodiment of the invention is an apparel drying assembly comprising or including: a panel; a projection, or a "peg," mounted to the panel, the projection having an inlet, at least one outlet, an internal passage communicating the inlet to the at least one outlet, and the projection oriented in to at least one position adapted to receive an apparel; and a source of pressurized air having an outlet in fluid communication with the inlet of the projection; wherein the pressurized air passes into the inlet of the projection, through the internal passage, and out of the at least one outlet to contact and at least partially dry the apparel received by the projection. In one aspect, the projection, or one or more projections, can be pivotally mounted to the panel. In one aspect, the pivotally mounted projection may have at least one first position extending from the panel, and a second, retracted position. When the projection is positioned in the second, retracted position, a surface of the projection can be substantially coplanar with a surface of the panel.

In another aspect, the drying assembly may further include one or more projection modules mounted to the panel, where one or more of the projection modules contain the projections. In one aspect, the projection module comprises a plurality of passages, for example, the passages having an inlet in fluid communication with the outlet of the source of pressurized air.

In one aspect, the drying assembly may also include a heater adapted to heat the pressurized air.

In one aspect, the pivotally mounted projection may further include an extension or pine from a proximal end of the pivotally mounted projection, the extension or pin positioned to deflect a valve element when the pivotally mounted projection is rotated into the at least one position adapted to receive the apparel. The extension from the proximal end of the pivotally mounted projection may be an extension of the pivotally mounted projection, a projection, a tab, a pin, a rod, or a bar. The valve element may be a deflectable baffle or a reed valve mounted to the panel.

In one aspect, when the deflectable baffle is not deflected, the baffle at least partially obstructs an opening in the panel between the source of pressurized air and the pivotally mounted projection, and wherein, when the deflectable baffle is deflected by the extension, at least some pressurized air is allowed to pass to the internal passage of the pivotally mounted projection.

Another embodiment of the invention is a method of drying apparel. The method of drying apparel comprises or includes: pivotally mounting a projection to a panel, the projection having an inlet, at least one outlet, and an internal passage communicating the inlet to the at least one outlet; providing a source of pressurized air having an outlet operatively connected to the inlet; mounting an apparel on to the projection; passing the pressurized air to the inlet of the projection, through the internal passage, and out of the at least one outlet; and contacting the air discharged from the at least one outlet upon the apparel to at least partially dry the apparel.

In one aspect, the step of mounting a projection module to the panel, wherein the projection is pivotally mounted to the projection module, may comprise the practice of pivotally mounting the projection to the panel.

In another aspect, the method may further include rotating the pivotally mounted projection from a retracted position to an extended position. In another aspect, the method may include heating the pressurized air.

In one aspect, the apparel may be footwear or hand wear.

In a further aspect, deflecting a valve element to allow the pressurized air to flow to the inlet of the projection may practice the step of passing the pressurized air to the inlet of the projection. For example, deflecting the valve element may be practiced by engaging the valve element with an extension or pin on a proximal end of the projection while pivoting the projection.

In one aspect, the valve element may a deflectable baffle or reed valve at least partially obstructing an opening in the panel between the outlet of the source of pressurized air and the inlet of the projection, and wherein engaging the valve element with the extension on the proximal end of the projection comprises contacting and deflecting the deflectable baffle to at least partially reduce obstructing the opening.

A further embodiment of the invention is an apparel drying projection module comprising or including: a housing; and a projection mounted to the housing, the projection having an inlet, at least one outlet, an internal passage communicating the inlet to the at least one outlet, and the projection oriented in to at least one position adapted to receive an apparel. In one aspect, the housing may include a pair of side elements and an internal element positioned between the side elements. In another aspect, the housing may include passages in fluid communication with the inlet of the projection and in fluid communication with a source of pressurized air. In one aspect, the module may be substantially completely made of wood, for example, a decorative hardwood.

In one aspect, the projection further comprises an extension from a proximal end of the projection, the extension positioned to deflect a valve element when the projection is rotated into the at least one position adapted to receive the apparel. The extension from the proximal end of the projection may be an extension of the projection, a projection, a tab, a pin, a rod, or a bar.

A further embodiment of the invention an apparel drying assembly comprising or including a vertically oriented panel having an internal passage; a plurality of projections, each of the plurality of projections pivotally mounted to the vertically oriented panel, and having an inlet in fluid communication with the internal passage of the panel, at least one outlet, an internal passage communicating the inlet to the at least one outlet, and positionable in to at least one position adapted to receive an apparel; a source of pressurized air having an outlet in fluid communication with the internal passage of the panel; a valve element in the vertically oriented panel, the valve element positioned adjacent the inlet of at least one of the plurality of projections, and the valve element at least partially obstructing flow of pressurized air to the inlet of the at least one of the plurality of projections; wherein the at least one of the plurality of objections further comprises an extension positioned to contact and deflect the valve element when the at least one of the plurality of projections is pivotally rotated to at least partially reduce the obstructing of flow of pressurized air to the inlet of the at least one of the plurality of projections; and wherein the pressurized air from the source of pressurized air passes through the internal passage of the panel, passed the valve element, into the inlet, through the internal passage, and out the at least one outlet of the at least one of the plurality of projections to contact and at least partially dry the apparel received by the at least one of the plurality of projections.

In one aspect, the extension may an extension located at a distal end of the at least one of the plurality of projections, for example, an extension of the pivotally mounted projection, a projection, a tab, a pin, a rod, and a bar.

In one aspect, the valve element may be bar, a plate, a baffle, and a flap, for example, a reed valve.

In one aspect, the pivotally mounted projections may be pivotally mounted to the panel with a biasing element, for example, a spring.

In one aspect, the assembly may further include a retaining device configured to assist in retaining a positioning of projections, for example, a touch latch.

A still further embodiment of the invention is an apparel drying assembly, for example, a portable assembly, comprising or including: a housing having an internal passage; a plurality of projections, each of the plurality of projections pivotally mounted to the housing, having an inlet in fluid communication with the internal passage of the housing, at least one outlet, and an internal passage communicating the inlet to the at least one outlet, and wherein each of the plurality of projections are pivotally extendable into at least one extended position adapted to receive an apparel; and a source of pressurized air having an outlet in fluid communication with the internal passage of the housing, wherein the pressurized air passes through the internal passage of the housing, into each inlet, through each internal passage, and out each of the at least one outlet to contact and at least partially dry the apparel received by at least one of the plurality of projections; wherein, when extended in the at least one extended position, at least one of the plurality of projections is oriented in a first direction and wherein, when extended in the at least one extended position, at least one of another of the plurality of projections is oriented in a second direction, different from the first direction; and wherein each of the plurality of pivotally mounted projections comprises a retracted position, wherein, in the retracted position, a surface of each of the plurality of pivotally mounted projections is substantially coplanar with an external surface of the housing. In one aspect, the second direction may be oriented at least 5 degrees circumferentially from the first direction, or at least 15 degrees circumferentially from the first direction, or oriented 90 degrees circumferentially from the first direction.

In one aspect, the pivotally mounted projection may further comprise an extension from a proximal end of the pivotally mounted projection, the extension positioned to deflect a valve element when the pivotally mounted projection is rotated into the at least one position adapted to receive the apparel. The valve element may comprise a deflectable baffle mounted to the panel. In one aspect, the extension from the proximal end of the pivotally mounted projection may be an extension of the pivotally mounted projection, a projection, a tab, a pin, a rod, and a bar.

In one aspect, when the deflectable baffle is not deflected, the baffle may at least partially obstruct an opening in the panel between the source of pressurized air and the pivotally mounted projection, and when the deflectable baffle is deflected by the extension, at least some pressurized air may be allowed to pass to the internal passage of the pivotally mounted projection.

In one aspect, the drying assembly may be portable, for example, having a carrying handle or a carrying strap.

Another embodiment is a method of drying apparel, the method comprising or including: pivotally mounting a plurality of projections to a housing having an internal passage, each of the plurality of projections pivotally mounted to the housing, having an inlet in fluid communication with the internal passage of the housing, having at least one outlet, having an internal passage communicating the inlet to the at least one outlet; and pivotally extendable into at least one extended position adapted to receive apparel; pivotally extending at least one of the plurality of projections in the at least one extended position in a first direction from the surface of the housing; pivotally extending at least one of the plurality of projections in the at least one extended position in a second direction, different from the first direction; mounting an apparel on to at least one of the extended projections; passing pressurized air to the inlet, through the internal passage, and out the at least one outlet of the at least one of the extended projections; contacting the air discharged from the at least one outlet upon the apparel to at least partially dry the apparel; and after contacting the air and at least partially dry the apparel, pivotally retracting the plurality of projections into a retracted position wherein a surface of each of the plurality of pivotally mounted projections is substantially coplanar with an external surface of the housing.

In one aspect, the method may further comprise or include, after pivotally retracting the plurality of projections, transporting the housing with the plurality of projections, for example, by means of a handle or a strap.

A further embodiment of the invention is a portable apparel drying assembly comprising or including: a vertically-oriented housing having an internal passage; a plurality of projections, each of the plurality of projections pivotally mounted to the housing, having an inlet in fluid communication with the internal passage of the housing, at least one outlet, and an internal passage communicating the inlet to the at least one outlet, and wherein each of the plurality of projections are pivotally extendable into at least one extended position adapted to receive an apparel; and a source of pressurized air mounted in the housing, the source of pressurized air having an outlet in fluid communication with the internal passage of the housing, wherein the pressurized air passes through the internal passage of the housing, into each inlet, through each internal passage, and out each of the at least one outlet to contact and at least partially dry the apparel received by at least one of the plurality of projections; wherein, when extended in the at least one extended position, at least one of the plurality of projections is oriented in a first direction and wherein, when extended in the at least one extended position, at least one of another of the plurality of projections is oriented in a second direction, at least 5 degrees circumferentially from the first direction; and wherein each of the plurality of pivotally mounted projections comprises a retracted position, wherein, in the retracted position, a surface of each of the plurality of pivotally mounted projections is substantially coplanar with an external surface of the housing. In one aspect, the second direction may be at least 15 degrees circumferentially from the first direction, for example, about 90 degrees circumferentially from the first direction.

A further embodiment of the invention is an apparel drying assembly comprising or including: a housing having an internal passage and a plurality of outer walls having a plurality of through holes; a plurality of projections, each of the plurality of projections mounted in one of the plurality of through holes in the housing, and, when mounted, having an inlet in fluid communication with the internal passage of the housing, at least one outlet, and an internal passage communicating the inlet to the at least one outlet, and wherein each of the plurality of projections are adapted to receive an apparel; and a source of pressurized air having an outlet in fluid communication with the internal passage of the housing, wherein the pressurized air passes through the internal passage of the housing, into each inlet, through each internal passage, and out each of the at least one outlet to contact and at least partially dry the apparel received by at least one of the plurality of projections; wherein at least one of the plurality of projections is oriented in a first direction and wherein at least one of another of the plurality of projections is oriented in a second direction, different from the first direction; and wherein each of the plurality of the projections is removably mounted in one of the plurality of through holes in the housing to facilitate transportation or storage of the assembly. In one aspect, the second direction, different from the first direction, is oriented at least 15 degrees circumferentially from the first direction.

In one aspect, at least one of the plurality of projections further comprises a proximal end positioned to deflect a valve element when the projection is mounted in one of the plurality of through holes in the housing. In one aspect, the valve element may be a deflectable baffle mounted to the housing. In one aspect, the proximal end of the pivotally mounted projection may be an extension, a projection, a tab, a pin, a rod, or a bar positioned to deflect the valve element.

In one aspect, the plurality of through holes in the housing may be a plurality of fittings mounted to the housing, the plurality of fittings having a fitting through hole adapted to receive one of the plurality of projections.

In one aspect, the housing may include at least one cavity adapted to receive at least one of the pluralities of projections, for example, the at least one cavity may be located in one of the plurality of outer walls of the housing. In one aspect, the at least one cavity is adapted to receive a plurality of nested projections.

Another embodiment of the invention is a method of drying apparel, the method comprising or including: mounting a plurality of projections in through holes in a housing having an internal passage, each of the plurality of projections having an inlet capable of fluid communication with the internal passage of the housing, at least one outlet, an internal passage communicating the inlet to the at least one outlet; and adapted to receive apparel; while mounting the plurality of projections in the through the holes, deflecting a valve element mounted in the housing with the proximal end of one of the plurality of projections to expose the internal passage of the one of the plurality of projections to the internal passage of the housing; passing pressurized air passed the valve element, into the inlet, through the internal passage, and out the at least one outlet of the one of the plurality of projections; and contacting the air discharged from the at least one outlet upon the apparel to at least partially dry the apparel. In one aspect, after contacting the air and at least partially drying the apparel, dismounting the plurality of projections from the housing. In one aspect, the method may further include placing the dismounted plurality of projections in at least one cavity in the housing.

In one aspect, mounting the plurality of projections in the housing comprises mounting at least one of the plurality of projections in a first direction and mounting at least one of the plurality of projections in a second direction, different from the first direction. In one aspect, mounting at least one of the plurality of projections in the second direction, different from the first direction, may comprise mounting the at least one of the plurality of projections in the second direction 90 degrees circumferentially from the first direction.

In one aspect, the method may further include, after placing the dismounted plurality of projections in at least one cavity in the housing, transporting the housing with the plurality of projections.

These and other aspects, features, and advantages of this invention will become apparent from the following detailed description of the various aspects of the invention taken in conjunction with the accompanying drawings

BRIEF DESCRIPTION OF THE DRAWINGS

The subject matter, which is regarded as the invention, is particularly pointed out and distinctly claimed in the claims at the conclusion of the specification. The foregoing and other features and advantages of the invention will be readily understood from the following detailed description of aspects of the invention taken in conjunction with the accompanying drawings in which:

FIG. 20 is a side elevation view of one projection that may be used for the projection shown in the assembly of FIG. 17, and any projection disclosed herein, according to one aspect of the invention.

FIG. 21 is a front elevation view of the projection shown in FIG. 20.

FIG. 22 is a top view of the projection shown in FIG. 20 as viewed in the direction of Arrow 22 shown in FIG. 20.

FIG. 23 is a detailed view of the proximal end of the projection shown in FIG. 20 as identified by Detail 23 shown in FIG. 20.

FIG. 24 is a front elevation view of one projection that may be used for the projection shown in FIG. 20.

FIG. 25 is a side elevation view of the projection shown in FIG. 24.

FIG. 39 is a front elevation view of a housing that may be used for the housing shown in FIGS. 30-33, according to one aspect of the invention.

FIG. 40 is a side elevation view of the housing shown in FIG. 39.

FIG. 41 is cross sectional view of the housing shown in FIG. 39 as viewed along section lines 41-41 in FIG. 39.

FIGS. 52, 54, and 55 are a top plan view, a side elevation view, and a bottom view, respectively, of the base plate of the apparel drying assembly shown in FIGS. 46 through 50.

DETAILED DESCRIPTION OF THE INVENTION

Figure 2:
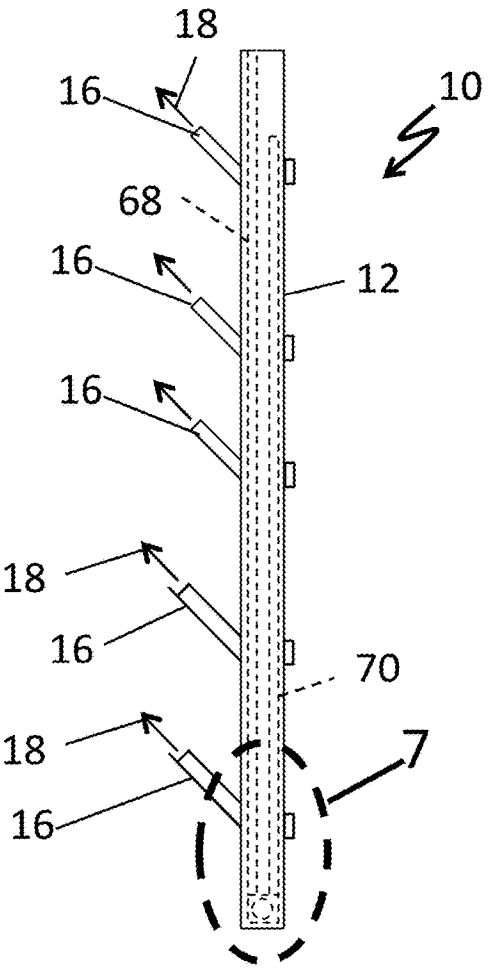
FIG. 2 is a side elevation view of the apparel drying assembly shown in FIG. 1.
Figure 1:
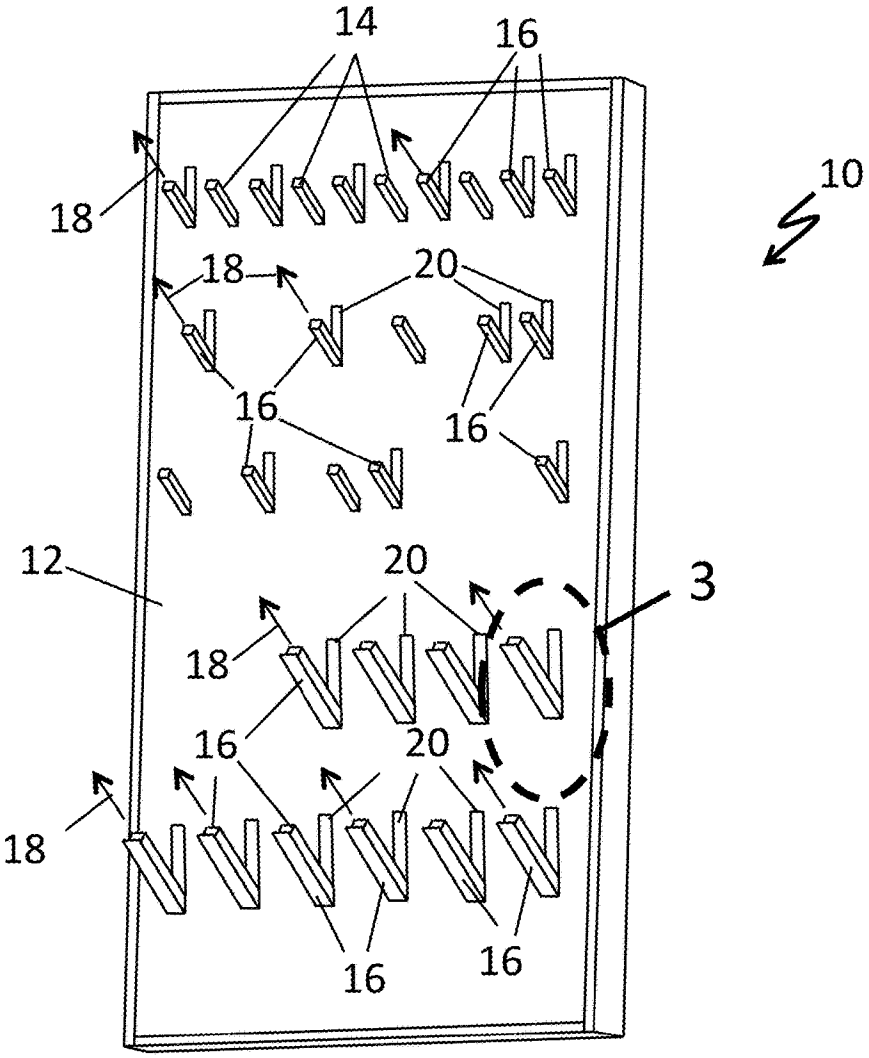
FIG. 1 is a perspective view of an apparel drying assembly according to one aspect of the invention.

FIG. 1 is a perspective view of an apparel drying assembly 10 according to one aspect of the invention. FIG. 2 is a side elevation view of the apparel drying assembly 10 shown in FIG. 1. As shown, assembly 10 typically includes a housing, panel, or board 12 having an arrangement of projections 14, or "pegs," positioned and adapted to receive an article of clothing (not shown), for example, a hat, a coat, a jacket, shoes, boots, gloves, and the like. In addition to or in lieu of projections 14, assembly 10 typically includes at least one, but typically a plurality, of projections 16 adapted to receive an article of clothing (not shown), but also adapted to discharge a flow of air 18, for example, a heated flow of air, to at least partially evaporate moisture from, for example, "to dry," an article of clothing while the article is mounted to a projection 16 of assembly 10. As also shown in FIG. 1, according to one aspect of the invention, panel 12 of assembly 10 may also include one or more cavities or recesses 20 into which projections 16 may be adapted to retract into, for example, pivotally rotate into.

Figure 4:
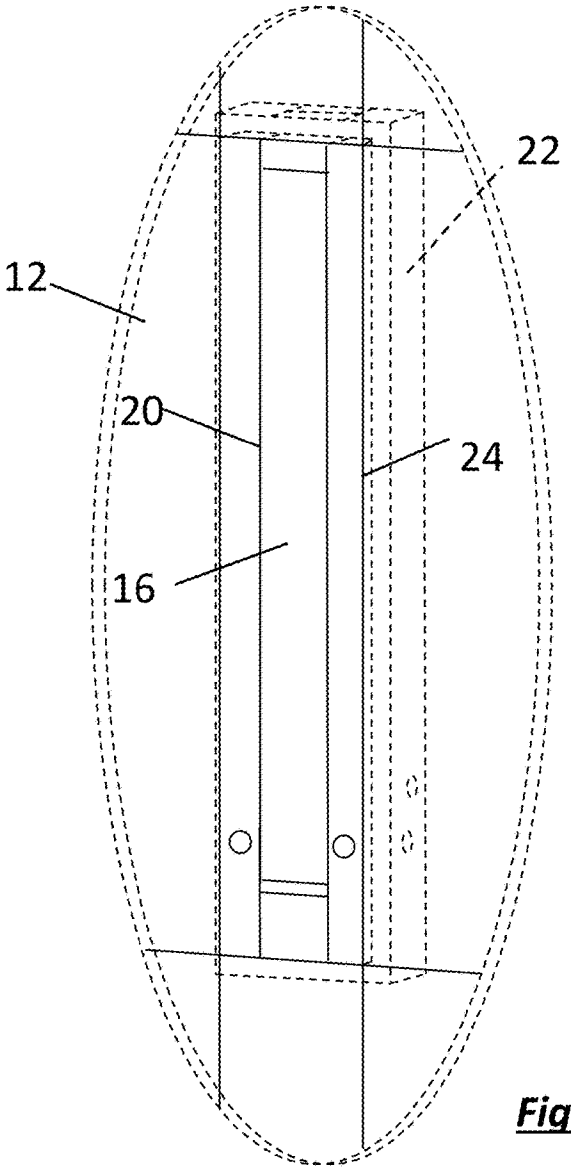
FIG. 4 is a perspective view, similar to FIG. 3, of the detail shown in FIG. 3, with the projection in a retracted position.
Figure 3:
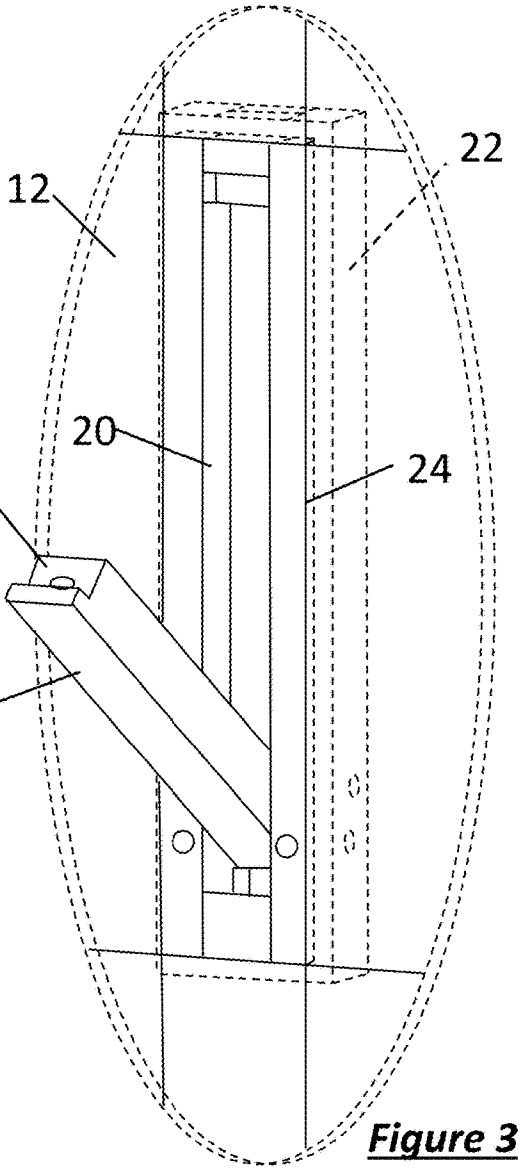
FIG. 3 is a perspective view of a detail of the apparel drying assembly shown in FIG. 1, as identified by Detail 3 in FIG. 1, with the projection in an extended position.

FIG. 3 is a perspective view of a detail of the apparel drying assembly 10 shown in FIG. 1, as identified by Detail 3 in FIG. 1, with the projection or peg 16 in an extended position, for example, pivotally rotated out of cavity 20. FIG. 4 is a perspective view of the Detail 3 shown in FIG. 3, with the projection 16 in a retracted position, for example, pivotally rotated into cavity 20. As shown in FIGS. 3 and 4, in one aspect, projection 16 and cavity 20 may be provided as a subassembly, assembly, or projection module 22 mounted in panel 12, for example, mounted in a hole 24 in panel 12, though other methods of providing projection 16 and recess 20 in panel 12 are envisioned and will be apparent to those of skill in the art. In the aspect shown in FIGS. 3 and 4, hole 24 in panel 12 is a rectangular hole having a substantially vertical long axis, the hole 24 is sized and positioned to accept module 22, though it is envisioned that module 22 and hole 24 may assume different shapes and/or orientations.

Figure 3A:
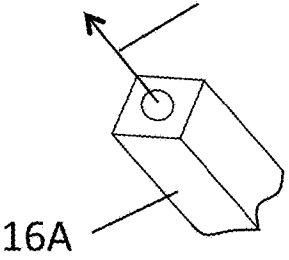
FIG. 3A is a perspective view of the distal end of an alternative projection according an aspect of the invention.

FIG. 3A is perspective view of the distal end of an alternative projection 16A that may be used in projection module 22 shown in FIGS. 3 and 4 according an aspect of the invention. In contrast to projection 16 shown in FIG. 3, the distal end of projection 16A may be devoid of a lip or projection (see reference number 39 in FIG. 6). According to one aspect of the invention, the lip of projection 16 may be provided to uniquely adapt to accommodate an extractable drying tube (for example, as shown and described with respect to FIGS. 11 and 12).

Figure 6:
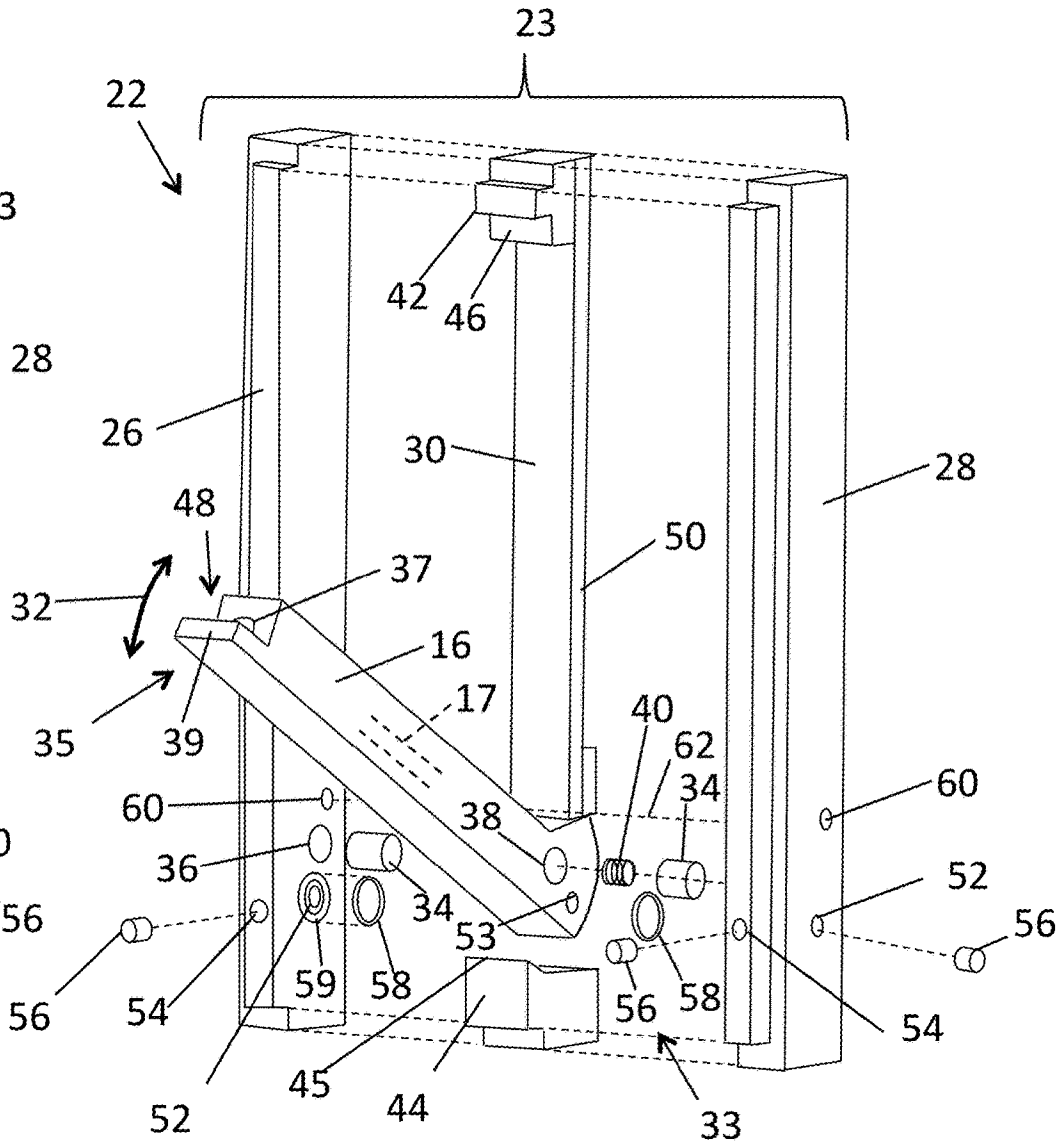
FIG. 6 is an exploded perspective view of the projection module shown in FIG. 5.
Figure 5:
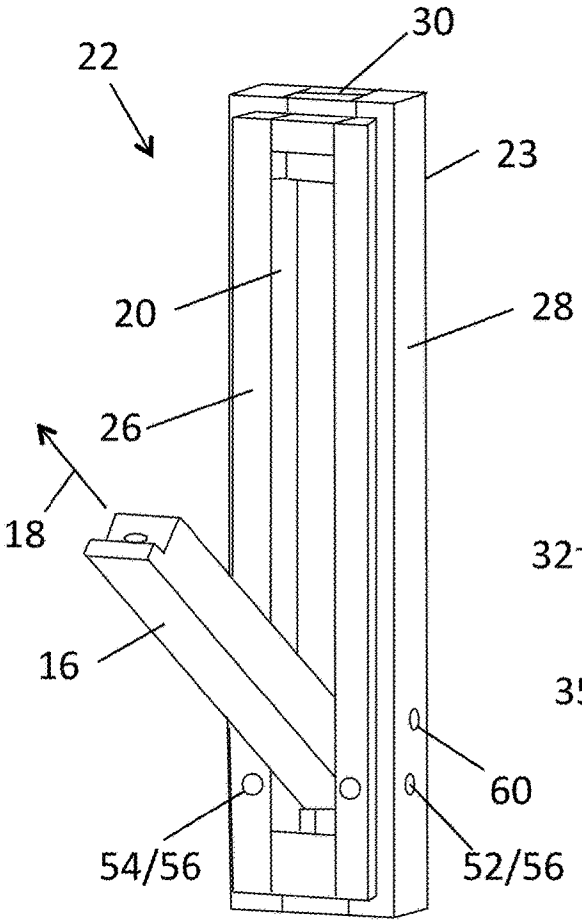
FIG. 5 is a perspective view of the projection module shown in FIG. 3.

FIG. 5 is a perspective view of the projection module 22 shown in FIGS. 3 and 4, and FIG. 6 is an exploded perspective view of the projection module 22 shown in FIG. 5. In the aspect shown in FIGS. 5 and 6, module 22 is fabricated from individual components and assembled into an integral module. The components of module 22 may be fabricated from any convenient material, for example, from a metal, from a plastic, or from wood. In one aspect, as shown in FIGS. 5 and 6, and described herein for the sake of illustration, the components of module 22 are described and illustrated as being predominantly fabricated from wood, for example, a decorative hardwood.

As most clearly shown in FIGS. 5 and 6, module 22 includes a housing 23 containing the projection 16. Housing 23 may comprise or include a pair of opposing side elements 26 and 28 which "sandwich," for example, are positioned about, an internal element 30. As shown in FIG. 6, in one aspect, projection 16 is also "sandwiched," between elements 26 and 28, and may be pivotally mounted to elements 26, 28, or both, as indicated by doubled-headed curved arrow 32. For example, in one aspect, projection 16 may be pivotally mounted at a proximal end 33 and have a distal end 35 having a hole 37 positioned and adapted to emit a flow of gas, such as forced or pressurized air. In one aspect, distal end 35 may include a lip or projection 39 adapted to engage internal element 30 when retracted and/or to conceal an extractable tube (see FIGS. 11 and 12).

In one aspect, the proximal end 33 of projection 16 may be pivotally mounted to module 22, for example, to one or both of elements 26 and 28, via one or more pins, pegs, or dowel pins 34. One or more pins 34 may be mounted in elements 26 and 28, for example, positioned in blind holes 36 (only one of which is shown in FIG. 6) in elements 26 and 28 and pins 34 may be inserted into and rotate with respect to blind or through hole 38 in projection 16. In another aspect, one or more pins 34 may be mounted in projection 16, for example, positioned in blind or through holes 38 (only one of which is shown in FIG. 6) and pins 34 may be inserted into and rotate with respect to blind or through hole 36 in elements 26 and 28. Other methods of pivotally mounting projection 16 to elements 26 and 28 are also within the purview of the present invention and will be apparent to those of skill in the art.

In one aspect, the pivotal mounting of projection 16 in module 22 may bias the position of or orientation of projection 16 in module 22. For exampled, in one aspect, the pivotal mounting of projection 16 may be biased by one or more springs or resilient materials, such as, elastomers or rubber materials. In the aspect of the invention shown in FIG. 6, the orientation of projection 16 may be biased by one or more coil springs 40, for example, inserted into hole 38 and appropriately adapted to engage and bias the position of projection 16. For instance, spring 40 may include extensions from the coil of the spring, for example, radially directed extensions that engage one or more recesses in hole 38 and/or in projection 16. In another aspect, one or more springs or elastomeric materials may bias the axial position of pins 34, for example, a coil spring 40 may bias pins 34 into axial engagement with holes 36 in elements 26 and 28. This biased axial engagement may provide for the manual engagement or disengagement of projection 16 from elements 26 and 28, for example, as "pushable" pins, for instance, for facilitating assembly, disassembly, maintenance, and/or repair of module 22.

In one aspect, module 22 may include one or more "stops" or restrictions that limit the rotation of projection 16. For example, as shown in FIGS. 5 and 6, internal element 30 of module 22 may include an upper stop 42 and a lower stop 44 positioned and sized to limit or impede the travel of projection 16. Upper stop 42 and lower stop 44 may be integrally mounted to internal element 30, or comprise distinct, separate components. Upper stop 42 may provide a surface 46 positioned to contact and limit the travel of projection 16, for example, surface 46 may be shaped and positioned to contact a surface of projection 16, for example, the face 48 of lip 39. In a preferred, but non-limiting, aspect, upper stop 42 and the distal end 35 of projection 16 may be sized and shaped wherein, when retracted (see FIG. 4), the external surface of projection 16 is substantially co-planar with the surfaces of elements 26 and 28 and/or the surface of panel 12 (see FIGS. 3 and 4), for instance, the surfaces of projection 16 and elements 26 and 28 may be substantially "flush" with each other.

Lower stop 44 may provide a surface 45 positioned to contact and limit the travel of projection 16, for example, surface 45 may be shaped and positioned to contact a surface of projection 16. In a preferred, but non-limiting, aspect, lower stop 44 and the proximal end 33 of projection 16 may be sized and shaped wherein, when retracted (see FIG. 4), the external surface of projection 16 is substantially co-planar with the surfaces of elements 26 and 28 and/or panel 12, for instance, the surfaces of projection 16 and elements 26 and 28 are substantially "flush" with each other.

Upper stop 42 and/or lower stop 44 may be mounted on a common spine 50 of internal element 30 which may extend between upper stop 42 and lower stop 44.

According to aspects of the invention, projection module 22 may typically include a network of passages adapted to transmit air, for example, from a source of pressurized air, to projection 16 to be emitted to an article of apparel as indicted by arrow 18 in FIG. 5. As shown in FIG. 6, projection 16 may have one or more openings or orifices 37, for example, at the distal end 35, which is in fluid communication with one or more internal passages 17 in projection 16. Though in one aspect of the invention a single opening 37 and a single internal passage 17 may be provided in projection 16, it is envisioned that 2 or more openings 37 in fluid commination with one or more internal passages 17 may be provided. The two or more openings 37 may be directed axially and/or transversely (for example, radially) from projection 16. According to aspects of the invention, the internal passage 17 of projection 16 may be in fluid communication with fluid passages in any one or more of side elements 26 and/or 28, and/or internal element 30. Internal passage 17 may have any desired cross-section, though in one aspect a circular passage is preferred. The internal diameter of a circular internal passage 17 may range from about 0.125 inches to about 2 inches, depending, among other things, upon the size of projection 16. However, typically, internal passage 17 may have a diameter ranging from about 0.25 inches to about 0.75 inches, for example, about 0.5 inches.

Though many different sized and located passages may be provided inside elements 26 and 28 and internal element 30, in the aspect of the invention shown in FIGS. 5 and 6, side elements 26 and 28 may have passages defined by holes 52 and 54, for example, through holes or blind holes. Holes 52 and 54 may typically be plugged as needed by inserting plugs 56, for example, a press fit and/or with an adhesive. According to one aspect, holes 52 and 54 in side elements 26 and 28 may communicate with one or more holes 53 in the proximal end 33 of projection 16. The one or more holes 53 in projection 16 may communicate with internal passage 17 to supply an airflow to one or more openings 37. In one aspect, in order to minimize or prevent air leakage between adjacent air passages, some form of sealing elements or devices may be provided in or about holes 52 and/or 53 and/or 54. In one aspect, as shown in FIG. 6, one or more O-rings 58 may be provided as needed, for example, inserted into O-ring seats 59 (only one of which is shown in FIG. 6) in side elements 26 and/or 28. Other sealing means may also be used, and, in one aspect, no sealing means may be provided. Holes 52, 53, and 54 may have diameters ranging from about 0.125 inches to about 1 inch, depending, among other things, upon the size of elements 26 and 28 and projection 16. However, typically, holes 52, 53, and 54 may have a diameter ranging from about 0.125 inches to about 0.5 inches, for example, about 0.375 inches.

In one aspect of the invention, projection module 22 may include one or more means to automatedly detecting the positioning of projection 16 to, for example, initiate the flow of drying air through module 22 (as discussed with respect to FIGS. 7 and 8, below). For example, in one aspect, one or more sensors may be provided in or about assembly 22 to detect the positioning of projection 16. In one aspect, the positioning of projection 16 may be detected photometrically, for example, by means of the detection of the presence or absence of light upon a photo detector. In one aspect, as shown in FIGS. 5 and 6, through holes 60 may be provided in side elements 26 and/or 28 through which a light beam, for example, laser beam, may be passed (as indicated by dashed line 62 in FIG. 6). In one aspect, when projection 16 is deflected into the extended position, as shown in FIGS. 5 and 6, an unobstructed path for light beam 62 is provided between holes 60. This light beam 62 may then be detected by a photodetector (not shown), for example, a photodetector positioned in module 22, in an adjacent module 22, or as appropriate anywhere in apparel drying assembly 10. The photodetector may be adapted to emit an electrical signal when light or lack of light is detected, for example, emit an electrical signal via a controller, to initiate activation of the source of drying air flow, for example, to a fan assembly. Conversely, when projection 16 is retracted, as shown in FIG. 4, the path of light beam 62 may be interrupted and the operation of the source of airflow may be terminated or "shut off." Other means of initiating and terminating air flow with sensors, detectors, and/or linkages are also within the purview of the present invention.

Side elements 26 and 28 and internal element 30 may be assembled by any conventional means, for example, with mechanical fasteners, adhesives, and/or welding or brazing, for instance, when manufactured from metallic components.

Figure 7:
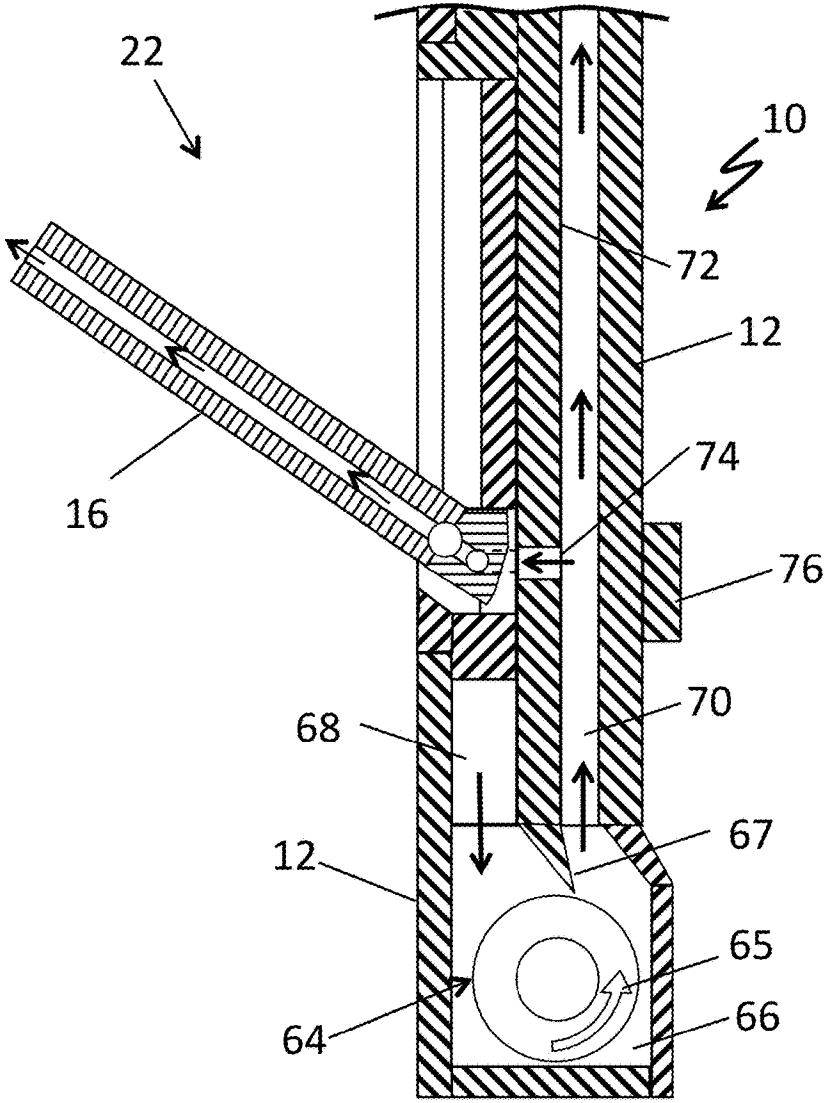
FIG. 7 is a cross sectional view of the apparel drying assembly shown in FIG. 2 as identified by Detail 7 shown in FIG. 2, with the projection in an extended position.

FIG. 7 is a detailed cross sectional view of apparel drying assembly 10 shown in FIGS. 1 and 2 as indicated by Detail 7 in FIG. 2, with projection 16 shown in an extended position. FIG. 8 is a detailed cross sectional view similar to FIG. 7, with projection 16 shown in a retracted position. In addition to illustrating panel 12 and projection module 22 with projection 16, FIGS. 7 and 8 also schematically illustrate the location in assembly 10 of fan assembly 64 according to one aspect of the invention. Though fan assembly 64 may be located anywhere convenient in assembly 10, in one aspect, for example, fan assembly 64 may be located in the bottom of panel 12 and direct a flow of air upward into panel 12, though other locations and directions of airflow for fan assembly 64 may be provided according to aspects of the invention. The rotation of fan assembly 64 is represented by arrow 65 in FIG. 7. In another aspect, fan assembly 64 may not be located within panel 12, but may be located adjacent to or remote from panel 12 and communicate with panel assembly 12 via one or more conduits or passageways as indicated by conduit 13 and/or 15 shown in FIG. 8 in phantom.

Fan assembly 64 may be any conventional fan assembly having the size and airflow output required to provide the desired drying function. Fan assembly 64 may typically have an airflow output of at least about 5 cubic feet per minute [$ft^3$/min] and at most about 400 $ft^3$/min, but typically ranges from about 10 $ft^3$/min to about 100 $ft^3$/min. In one aspect, fan assembly 64 may be a BK Squirrel Cage Blower Fan assembly provided by Smoky Mountain General Store [available at http://www.smgeneralstore.com/bk-blower-fan-bk.aspx], or its equivalent, though any appropriate conventional fan assembly may be used. Since fan assembly 64 is shown schematically in FIGS. 7 and 8, ancillary equipment typically provided with a fan assembly 64, such as, a power supply, a drive motor, electronic controls, anti-friction bearings, and mounting structures and hardware, are not illustrated in FIGS. 7 and 8, but are envisioned, as needed.

According to aspects of the invention, apparel-drying assembly 10 typically includes some form of cavity 66 sized, positioned, and appropriately sealed to retain fan assembly 64. As shown in FIG. 7, in one aspect, cavity 66 may be in fluid communication with one or more passages 68 within panel 12 adapted to communicate air, for example, ambient air, to cavity 66 and fan assembly 64. In one aspect, as shown in FIG. 1, one or more passages 68 may extend to the upper portion or top of panel 12, for instance, to draw warmer air from the top of a room having drying assembly 10 mounted therein. Also, cavity 66 may be in fluid communication with one or more passages 70 within panel 12 adapted to communicate pressurized air from fan assembly 64 to one or more projection modules 22, and ultimately to one or more projections 16. As also shown in FIGS. 7 and 8, cavity 66 may include one or more baffles 67 positioned to assist in promoting airflow from cavity 66 to passage 70. As shown in FIGS. 7 and 8, panel 12 may typically include at least one distribution plate or panel 72 having at least one perforation or hole 74, but typically, a plurality of perforations or holes 74, adapted to direct air from passage 70 to one or more projection modules 22. In one aspect, the interface between panel 72 and module 22 at or around holes 74 may be provided with a sealing device, for example, one or more O-rings (not shown) mounted in an O-ring seat.

Aspects of the invention may also provide one or more devices for heating and/or dehumidifying the airflow introduced to projections 16. For example, in one aspect, an internal or external heater or heat exchanger may be provided in panel 12 and/or adjacent to or remote from panel 12, for example, associated with conduit 13 or conduit 15. For instance, in one aspect, cavity 66 in panel 12 may be sized to contain fan assembly 64 and a heater (not shown). The heater may be a radiant heater (for example, an electric radiant heater or a hot water radiant heater), a hydronic heater, or an oil-, gas-, wood-, or pellet-fired heater. In one aspect, panel 12 may be in fluid communication with an existing heat source, for example, a residential forced-air furnace or a stove, such as, a wood stove, a pellet-burning stove, a propane heater, or a natural gas heater, among others. The one or more heat sources disclosed herein may be used to heat the air flow where the temperature of the air flowing from fan assembly 64 is at least 5 degrees F. above ambient air temperature, in one aspect, at least 10 degrees F. above ambient air temperature. For example, in one aspect, the temperature of the air emitted by projections 16 may range from about 50 degrees F. to about 150 degrees F., but is typically between about 90 degrees F. and about 120 degrees F.

Panel 12 may include a plurality of mounting bars or mounting elements 76 appropriately positioned and configured to mount assembly 10 to a surface, for example, to a vertical wall.

According to aspects of the invention, with the activation of fan assembly 64, for example, via the detection of the deflection of projection 16 via a photodetector discussed herein, fan assembled 64 rotates in the direction of arrow 65 and provides a flow of air to one or more passages 70. Under the operation of fan assembly 64, air is drawn into cavity 66 from one or more intake passages 68, for example, drawn from one or more inlets in the top or upper portion of assembly 10. The pressurized air in passage 70 may typically range from about 0.01 to about 10 pounds per square inch—gauge (psig), but is typically between about 1 inch of water gauge [iwg] (that is, about 0.04 psig) and about 10 iwg (that is, about 0.40 psig). The flow of air within one or more passages 70 distributes pressurized air to one or more holes 74 in distribution panel 72 and to the one or more projection modules 22 and to projections 16. The flow of air into holes 74 may be enhanced by positioning one or more baffles 75 (shown in phantom in FIG. 8) shaped and positioned to direct or encourage airflow into holes 74.

Figure 8:
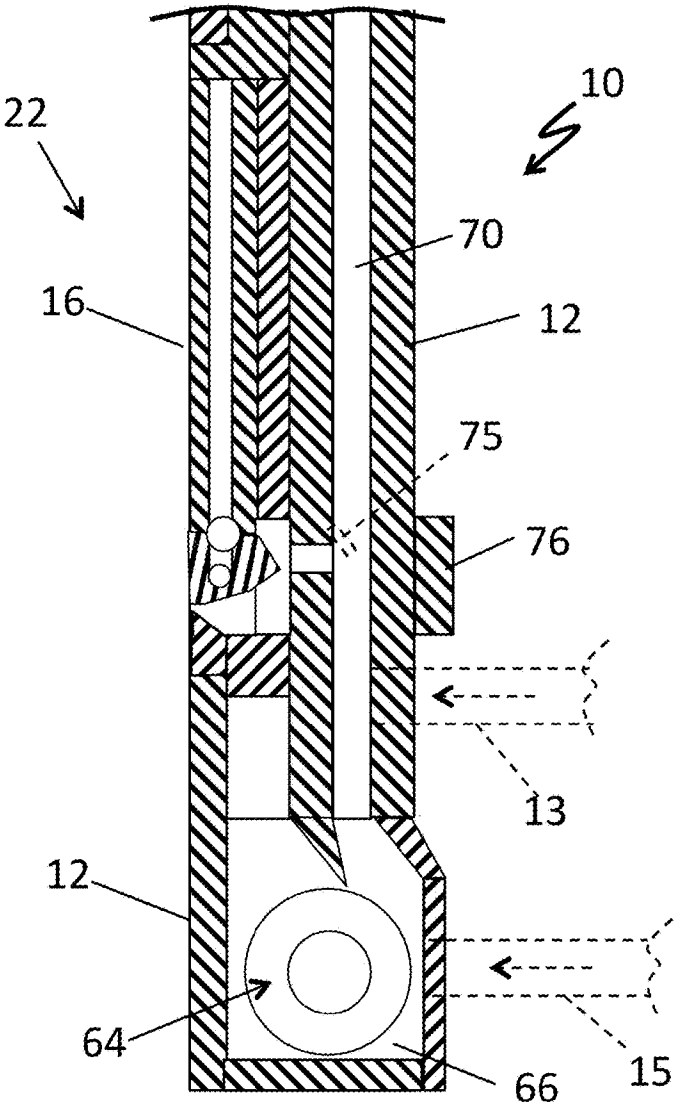
FIG. 8 is a cross sectional view, similar to FIG. 7, of the detail shown in FIG. 7, with the projection in a retracted position.

As shown in FIG. 8, when fan assembly 64 is not operating, projection 16 of projection module 22 may be retracted. When retracted, as shown in FIG. 8, projection 16 may be retained in the retracted position by conventional means, for example, with mechanical fasteners or biasing springs. In one aspect, projection 16 may be retained in the retracted position by friction, for example, friction between opposing surfaces and/or friction between a sealing device, such as, an O-ring, and an opposing surface. However, in one aspect, no mechanical device may be required to retain projection 16 in its retracted position shown in FIG. 8. In addition, when retracted, the position of projection 16 may be detected by one or more sensors, as disclosed herein, where fan assembly 64 is deactivated.

Figure 9:
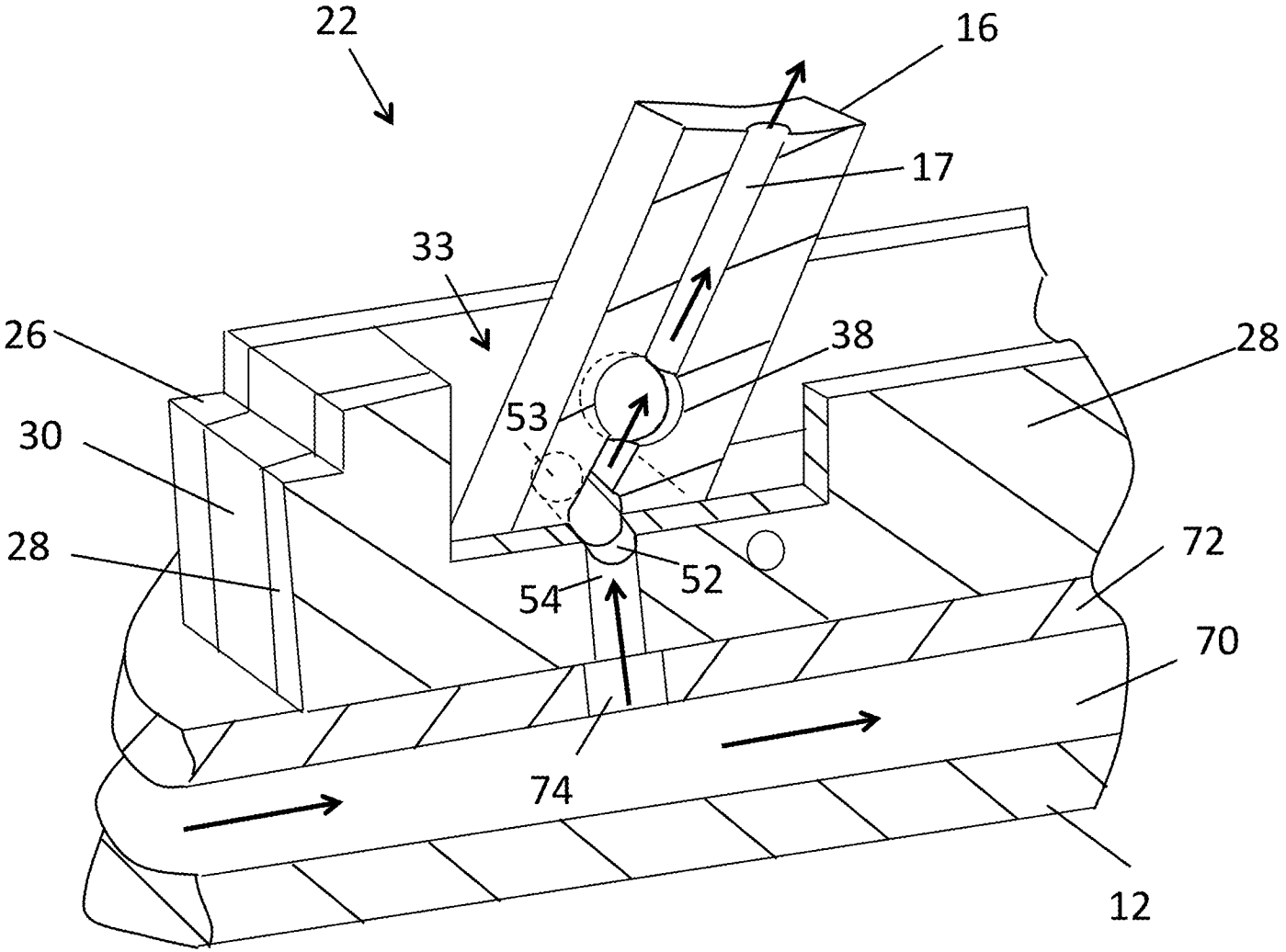
FIG. 9 is a perspective view, partially in cross section, of one set of air passages in the apparel drying assembly shown in FIGS. 1 and 2 according to one aspect of the invention.

FIG. 9 is a perspective view, partially in cross section, of one set of passages in apparel drying assembly 10 shown in FIGS. 1 and 2 according to one aspect of the invention. FIG. 9 includes portions of projection module 22, including projection 16, side elements 26 and 28, and internal element 30; a portion of panel 12; a portion of distribution panel 72 having at least one hole 74; and a portion of passage 70, as disclosed herein. As shown in FIG. 9, in one aspect, pressurized air introduced to passage 70 passes through one or more holes 74 in distribution panel 70 and is introduced to projection module 22, for example, to one of the through holes 54 of side element 28. As shown in FIG. 9, in one aspect, through holes 54 communicate with one or more holes 53 in the distal end 33 of projection 16. In the proximal end 33 of projection 16, holes 53 communicate with internal passage 17 of projection 16. Internal passage 17 may pass through hole 38 that contains pin 34 and, for example, coil spring 40 (not shown in FIG. 9). For example, in one aspect, pressurized air may flow passed pins 34 and through spring 40 en route through internal passage 70. According to aspects to the invention, internal passage 17 distributes the airflow to one or more holes or orifices in projection 16, for example, to one or more holes 37 at the distal end 35 of projection 16 (see FIGS. 5 and 6).

Figure 10:
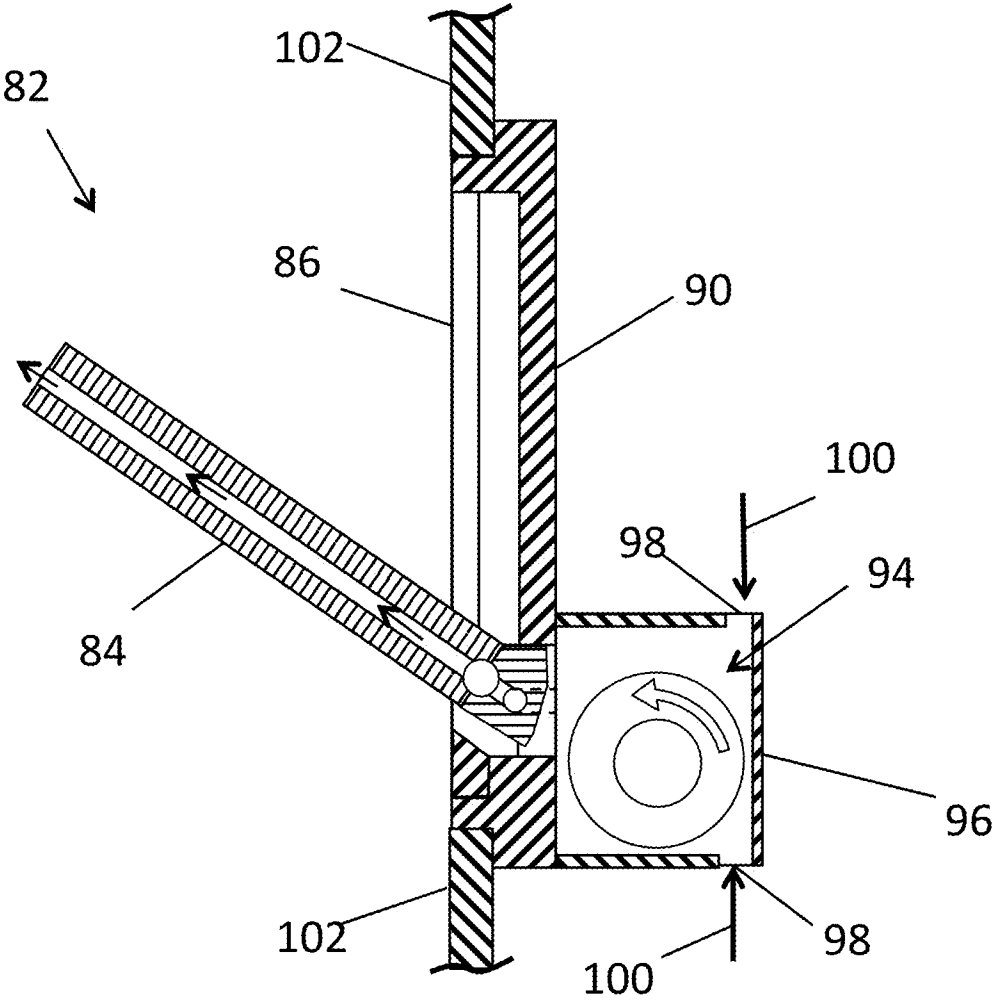
FIG. 10 is a cross sectional view, similar to FIGS. 7 and 8, of a projection module with a projection in an extended position according to another aspect of the invention.

FIG. 10 is a cross sectional view of a projection module 82 having a pivotally mounted projection 84 in an extended position according to another aspect of the invention. In a manner, similar to projection module 22 disclosed herein, projection module 82 may typically include side elements 86 and 88 (not shown) and internal element 90. Otherwise module 82 may include all the features and functions of module 22. In the aspect of the invention shown in FIG. 10, projection module 82 may also include a source of pressurized air 94, for example, an electric fan, contained in a housing 96 mounted to, for example, side elements 86 and 88 and internal element 90. According to the aspect of the invention shown in FIG. 10, projection module 82 includes a dedicated source of pressurized air 94. Though in FIG. 10 source 94 comprises a squirrel-cage type fan or blower, any source of pressurized air may be used with aspects of the invention. Module 82 may also include a heat source adapted to heat the air propelled by the source of pressurized air 94.

As shown in FIG. 10, housing 96 for fan 94 may typically include one or more inlets or apertures 98 allowing air, for example, ambient air, to be drawn into housing 96, as indicated by arrows 100. The air drawn in by fan 96 is then expelled by fan 94 from housing 96 into projection 84, for example, as disclosed herein, to dry the piece of apparel (not shown) mounted on projection 84.

According to this aspect of the invention, module 82 having fan 94 may comprise a self-contained device for drying apparel. For example, as illustrated in FIG. 10, projection module 82 may be positioned or mounted in to a wall, surface, or a panel 102 and the pivotally mounted projection 84 may provide the drying function disclosed herein. Projection module 82 may be mounted to wall, surface, or panel 102 by conventional means, for example, with mechanical fasteners or an adhesive. For example, in one aspect, a plurality of modules 82 may be mounted into a wall, surface, or panel, such as, into panel 12 shown in FIG. 1. In one aspect, two modules 84 may be mounted in a closet or locker to dry footwear, such as, work boots, skates, sneakers, cleats, and the like; or hand wear, such as, gloves, mittens, and the like, as disclosed herein.

Figures 11, 12:
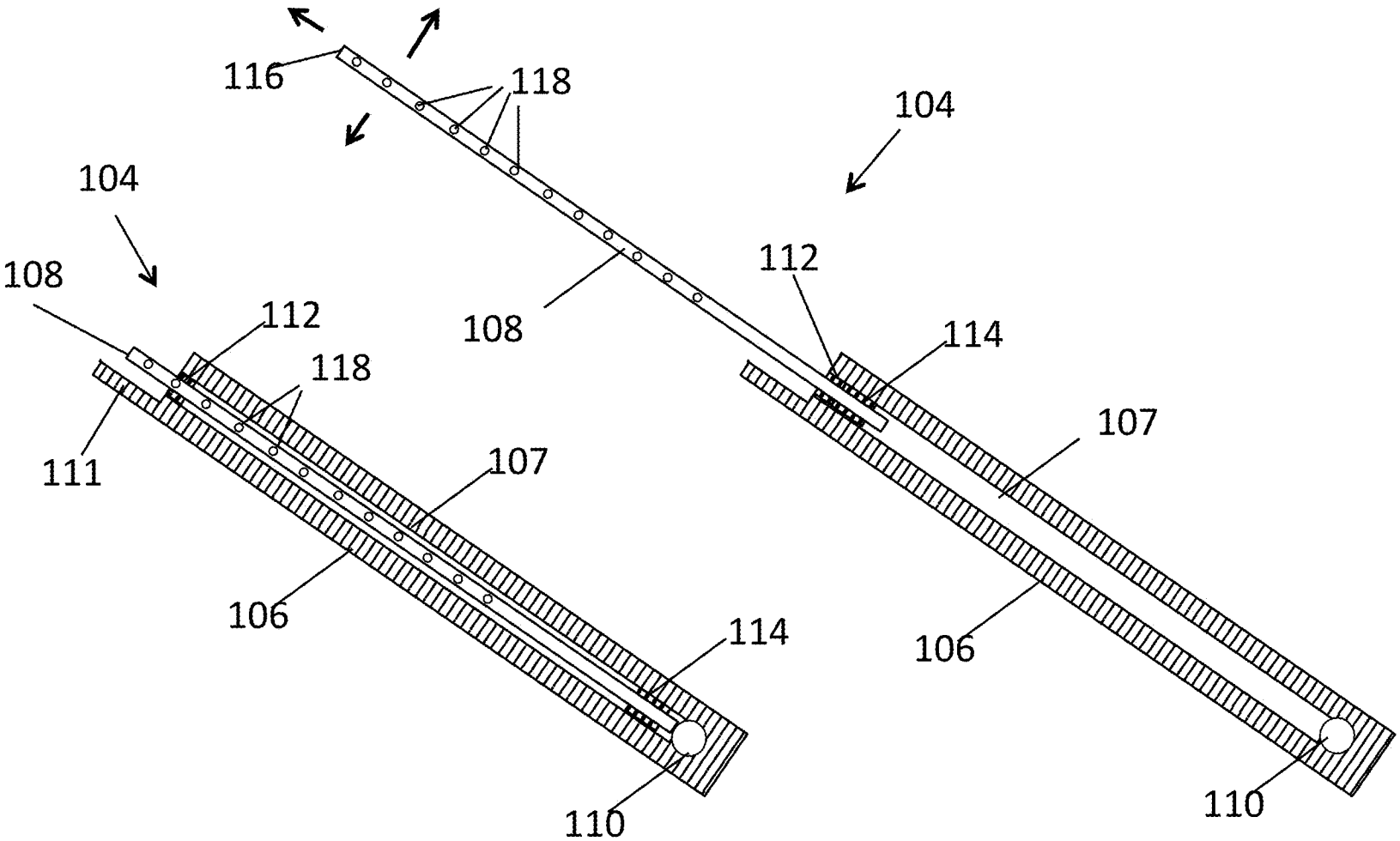
FIG. 11 is a cross sectional view of a projection having an extractable air distribution tube in a retracted position according to another aspect of the invention.
FIG. 12 is a cross-sectional view, similar to FIG. 11, of the projection shown in FIG. 11 having the extractable air distribution tube in an extracted position according to another aspect of the invention.

FIG. 11 is a cross-sectional view of a projection assembly 104 having a projection 106 and an extractable air distribution tube or hose 108 in a retracted position according to another aspect of the invention. As shown, in this aspect, projection 106 includes an internal passage 107 into which tube 108 can be slidably placed. In a manner similar to projection 16 disclosed herein, projection 106 may typically be pivotally mounted, and internal passage 107 is typically in fluid communication with a source of pressurized air, for example, via one or more holes no in the proximal end of projection 106. According to the aspect of the invention shown in FIG. 11, tube 108 is also in fluid communication with the source of pressurized air, and, when extracted (as shown in FIG. 8), tube 108 can be inserted into the apparel mounted on projection 106 to enhance the distribution of drying air into the apparel, for example, into the toe of a shoe, boot, or skate that requires drying. In the aspect shown in FIG. 10, projection 106 may include a lip or projection 111 adapted to conceal and/or protect an end of tube 108, which may protrude from internal passage 107, for example, to conceal tube 108 when projection 106 is in the pivotally retracted position. In other aspects, the lip 111 may be omitted.

In one aspect, projection 106 may be adapted to retain tube 108 in internal passage 107. For example, in one aspect, projection 106 may include an obstruction or restriction 112 adapted to engage and/or retain tube 108 in projection 106. In one aspect, tube 108 may include an annular projection or ring 114 positioned and sized to translate with tube 108 along internal passage 107 and contact obstruction 112 to prevent complete removal of tube 108 from projection 106. Other means of retaining tube 108 within projection 106 will be apparent to those of skill in the art.

FIG. 12 is a cross-sectional view, similar to FIG. 11, of the projection assembly 104 shown in FIG. 11 having the extractable air distribution tube 108 in an extracted position according to another aspect of the invention. As shown in FIG. 12, with the partial extraction of tube 108, ring 114 may contact restriction 112 and limit or prevent the total extraction of tube 108, for example, to prevent removal.

Tube 108 may comprise a hollow conduit, for example, a hollow flexible conduit, having at least one axial hole 116 at its end, and may have a plurality of radially directed holes 118 adapted to direct air radially from tube 108. Tube 108 may be made from a plastic or elastomeric material. In one aspect, tube 108 may have an outside diameter ranging from about 0.0625 inches to about 0.50 inches, but typically has an outside diameter ranging from about 0.125 to about 0.25 inches. Tube 108 may have an inside diameter ranging from about 0.0325 to about 0.375 inches, but typically has an inside diameter ranging from about 0.1625 to about 0.125 inches. Radial holes 118 may be uniformly distributed along tube 108 and may have diameters ranging from about 0.0325 inches to about 0.375 inches, but typically having a diameters ranging from about 0.1625 to about 0.125 inches.

Figure 13:
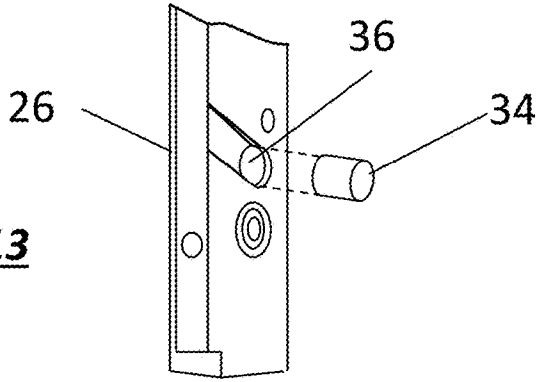
FIG. 13 is an exploded perspective view of a portion of a side element and a pin of a projection assembly according to one aspect of the invention.

FIG. 13 is an exploded perspective view of a portion of a side element 26 of projection assembly 22 and a pin 34 shown in FIGS. 5 and 6 according to one aspect of the invention. As shown, side element 26 includes a blind hole 36 sized and positioned to receive pin 34. As illustrated in FIG. 6, pin 34 may be biased into position in blind hole 36 by, for example, coil spring 40. According to this aspect of the invention, the geometry of blind hole 36 may be adapted whereby projection 16 may be more readily pivotally mounted to side elements 26 and 28, and disengaged from side elements 26 and 28, for example, for assembly, servicing, or maintenance of projection assembly 22. According to aspects of the invention, side element 28 (not shown) may comprise a mirror image of side element 26 shown in FIG. 13 and include a blind hole 36 having substantially identical adaptations to enhance mounting and disengagement.

Figure 14:
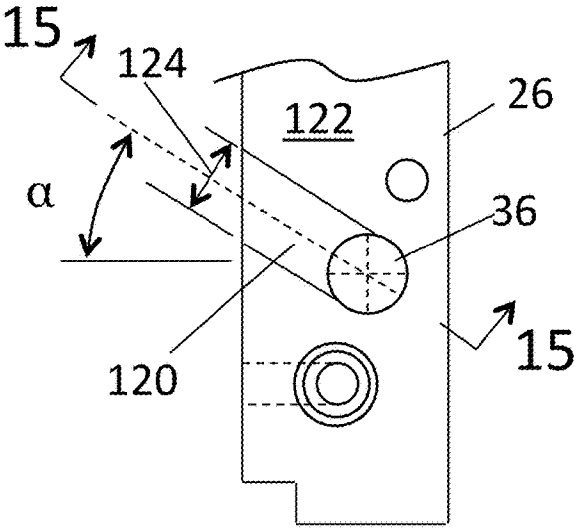
FIG. 14 is a plan view of the portion of the side element shown in FIG. 13.

FIG. 14 is a plan view of the portion of the side element 26 shown in FIG. 13. As shown, in this aspect, blind hole 36 in side element 26 is adapted to engage and disengage pin 34 (not shown in FIG. 14). Accordingly, in one aspect, the blind hole 36 includes a ramp or tapered recess 120 adapted to allow engagement and/or disengagement of pin 34 with side element 26. The angle of orientation, $\alpha$, of ramp 120 is chosen where the projection 16 (not shown in FIG. 14) and pin 34 can be removed or disengaged from side element 26 (for example, when projection 16 is not loaded by an apparel, such as, a boot), but where side element 26 will retain projection 16 and pin 34 when projection 16 is loaded, for example, with a boot. In one aspect, the angle of orientation $\alpha$ may range from about 20 degrees to about 70 degrees, but is typically between about 20 degrees and about 40 degrees, for example, about 30 degrees. The width 124 of ramp 120 may typically be about the diameter of blind hole 36, for example, the width 124 may range from about 0.25 inches to about 2 inches, but is typically between about 0.5 inches and 1 inch, for example, about 0.625 inches.

Figure 15:
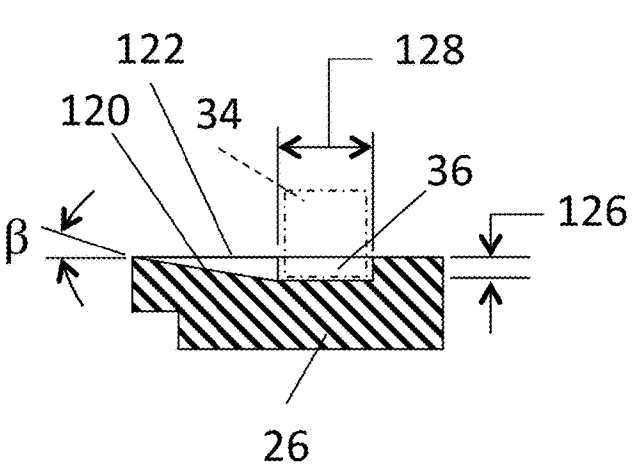
FIG. 15 is a cross-sectional view of the portion of the side element shown in FIG. 14 as viewed along section lines 15-15 in FIG. 14.

FIG. 15 is a cross sectional view of the portion of side element 26 shown in FIG. 14 as viewed along section lines 15-15 in FIG. 14. Pin 34 is shown in phantom in FIG. 15 for reference. As shown most clearly in FIG. 15, ramp 120 tapers at an angle $\beta$ from the bottom or base of blind hole 36 to the surface 122 of side element 26. In one aspect, as shown in FIG. 15, ramp 120 may intersect the surface 122 at an edge of side element 26; however, in another aspect, ramp 120 may intersect surface 122 at a location interior of an edge. The angle $\beta$ of ramp 120 may range from about 0.5 degrees to about 30 degrees, but is typically between about 10 degrees and 20 degrees, for example, about 17 degrees.

As shown in FIG. 15, blind hole 36 may have a depth 126 and a diameter 128. Depth 126 may range from about 0.03125 inches to about 1 inch, but is typically between about 0.0625 inches to about 0.25 inches, for example, about 0.125 inches. Diameter 128 of blind hole 36 may range from about 0.25 inches to about 2 inches, but is typically between about 0.5 inches and about 1 inch, for example, about 0.625 inches.

Figure 16:
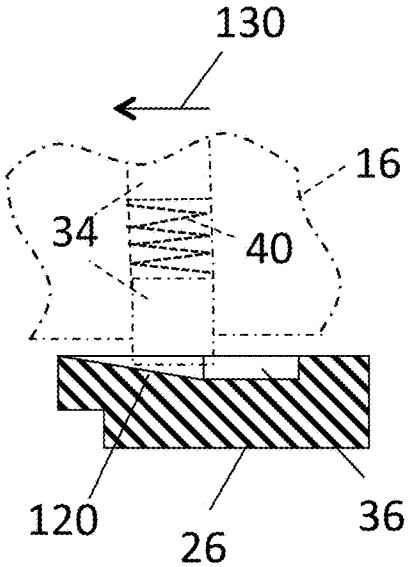
FIG. 16 is a cross-sectional view, similar to FIG. 15, of the portion of the side element shown in FIG. 15 showing the relative movement of a mounting pin.

FIG. 16 is a cross sectional view, similar to FIG. 15, of the portion of the side element 26 shown in FIG. 15 showing the relative movement of mounting pin 34 according to one aspect. In order to aid in the disclosure of this aspect, a representative portion of projection 16, pins 34, and biasing spring 40 are also shown in phantom in FIG. 16. In one aspect, as projection 16 is disengaged from side element 26 (and from side element 28, not shown) as indicated by the direction of arrow 130, under the influence of spring 40, pin 34 engages blind hole 36 and is displaced from blind hole 36 and slidably engages ramp 120. Further movement of projection 16 in the direction of arrow 130 further displaces pin 34 along ramp 120 until pin 34 disengages ramp 120 and projection 16 with pins 34 disengages side element 26 (and side element 28). In a similar fashion, projection 16 and pins 34 can engage side element 26 (and side element 28) by reversing the movement indicated by arrow 130 until pins 34 re-engage blind hole 36.

According to aspects of the invention, the disengagement and engagement (or re-engagement) of projection 16 from side elements 26 and 28 may allow projection 16 and projection module 22 (and any projection module disclosed herein) to be serviced, maintained, or replaced. In addition, ready removal and re-engagement of projection 16 with side elements 26 and 28 can allow access to other components of the invention, for example, to distribution panel 72 (see FIG. 7), to mounting elements 76 (see FIG. 7) and fasteners associated with mounting elements 76, fan assembly 94 (see FIG. 10), spring 40, and pins 34, among other components.

Figure 18:
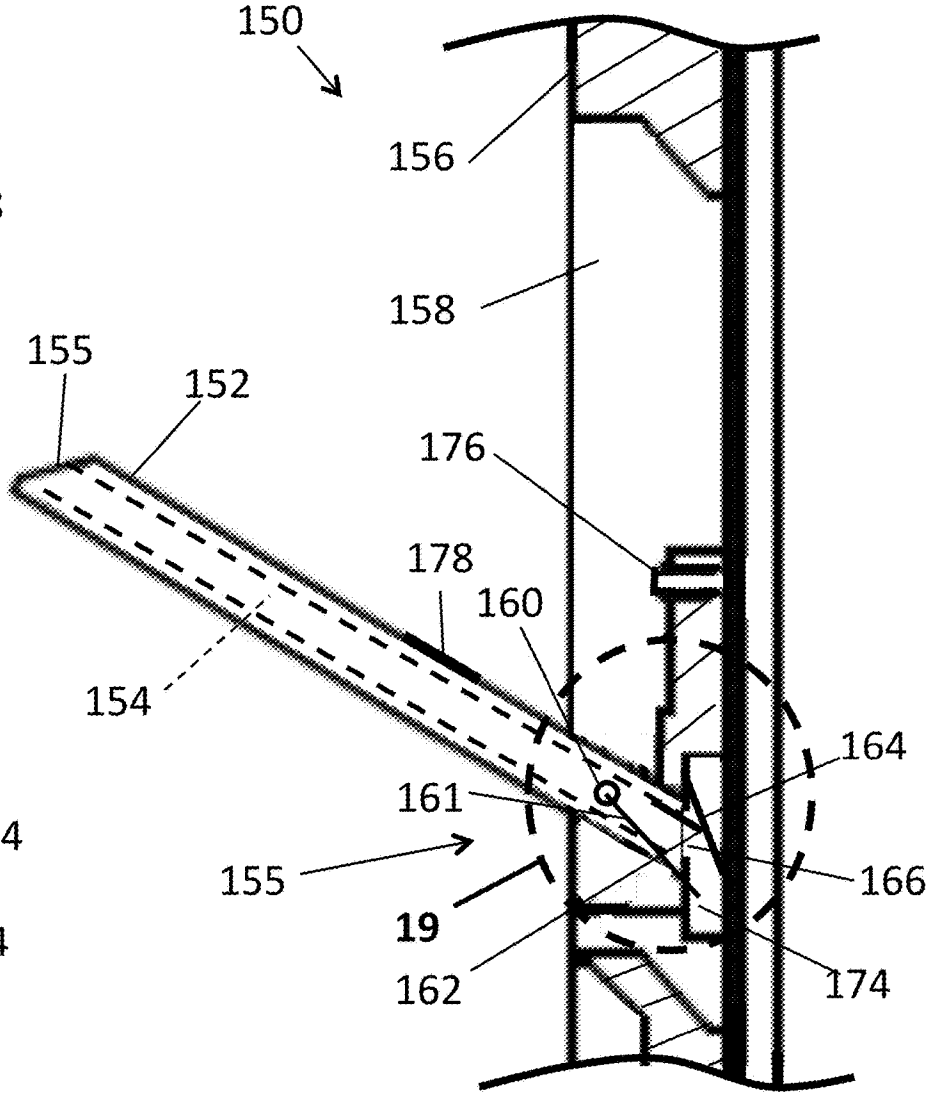
FIG. 18 is a side elevation, partially in cross section, of the apparel drying assembly shown in FIG. 17, with the projection in an extended position.
Figure 17:
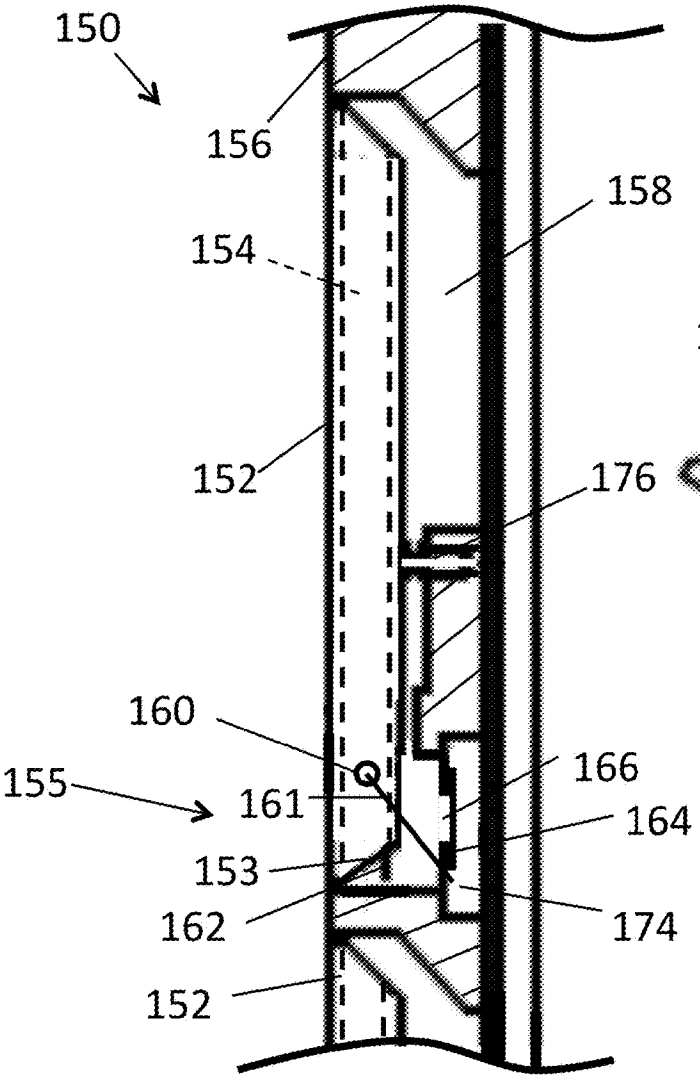
FIG. 17 is a side elevation view, partially in cross section, of an apparel drying assembly according to an aspect of the invention, with the projection in a retracted position.
Figures 26, 27, 28, 29:
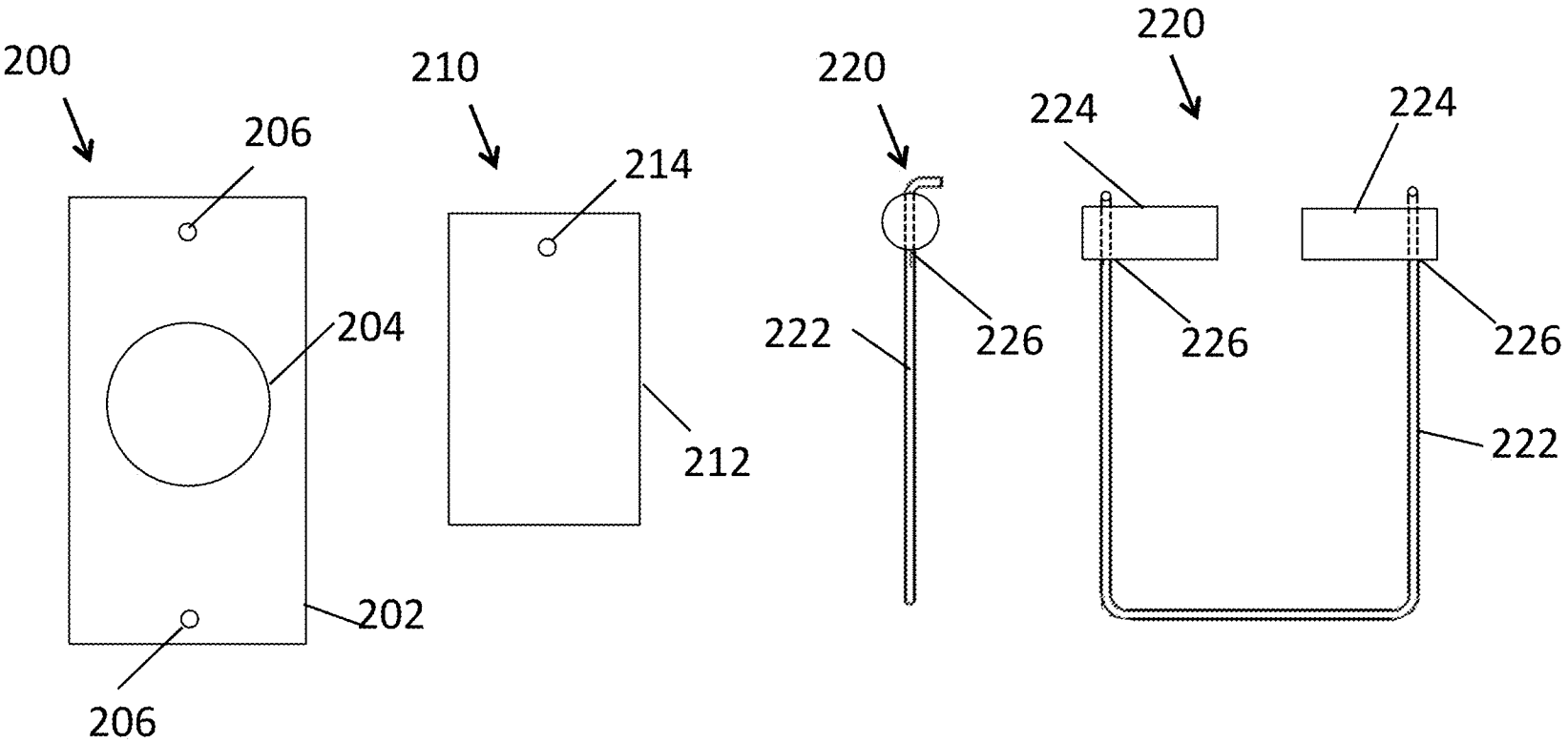
FIG. 26 is a plan view of a panel, plate, or valve seat plate that may be used for plate shown in FIGS. 17-19 according one aspect of the invention.
FIG. 27 is a plan view of the panel, plate, or valve plate that may be used for plate shown in FIGS. 17-19 according one aspect of the invention.
FIG. 28 is a side elevation view of a spring wire assembly, which may be used to bias the position of plate shown in FIGS. 17-19 according to one aspect of the invention.
FIG. 29 is a plan view of the spring wire assembly shown in FIG. 28.

FIG. 17 is a side elevation view, partially in cross section, of an apparel drying assembly or module 150 according to an aspect of the invention, with a projection 152 in a retracted position. FIG. 18 is a side elevation of the apparel drying assembly or module 150 shown in FIG. 17, with the projection 152 in an extended position. Similar to other aspects of the invention disclosed herein, projection or "peg" 152 includes an internal passage 154 having an open end 153. Open end 153 is operatively connected to a source of pressurized air, and projection 152 may be pivotally mounted at a proximal end 155 to a housing 156, for pivotally rotating projection 152 in to and out of a cavity or recess 158 in housing 156. According to this aspect, projection 152 may be pivotally mounted to housing 156 via a pin or dowel 160, for example, a pin 160 having a biasing spring 161 (for example, as shown in FIGS. 28 and 29). As disclosed herein, pressurized air may be passed through internal passage 154 and directed out of open end 155 to dry a piece of apparel (not shown) mounted to projection 152.

Also similar to other aspects disclosed herein, assembly 150 may be provided as a subassembly, an assembly, or a projection module 150 mounted in a wall or panel not shown, for example, into the assemblies shown in FIGS. 42-45.

In the aspect of the invention shown in FIGS. 17 and 18, pivotally mounted projection 152 includes an extension 162 from proximal end 155, and the extension 162 is positioned and adapted to deflect a valve element when the pivotally mounted projection 152 is at least partially rotated into the extend position shown in FIG. 18, for example, a position adapted to receive the apparel (not shown). In one aspect, the extension of proximal end 155 may comprise an extension of the pivotally mounted projection 152, or a projection, a tab, a pin, a rod, a bar, or a related structure mounted to the proximal end 155 of projection 152. In the aspect of the invention shown in FIGS. 17 and 18, the extension may comprise one or more bars or pins 162.

According to aspects of the invention the extension, for example, bar 162, on the proximal end 155 of projection 152 may be positioned and adapted to engage any form of valve element or valve member, for example, a flap, a seat, a stem, a ball, or a plug, where pressurized air provided to housing 156 is provided to the internal passage 154 of projection 152. In the aspect of the invention shown in FIGS. 17 and 18, housing 156 includes one or more deflectable bars, plates, baffles, flaps, or reed valves 164 positioned over a hole or orifice 166 in housing 156. A detail of the deflection of one valve element according to one aspect of the invention is shown in FIG. 19.

In one aspect, housing 156 of assembly or module 150 may include one or more mechanisms or retaining devices configured to assist in retaining the positioning of projection 152 in housing 156, for example, retaining projection 152 within cavity 158 in housing 156. For example, as shown in FIGS. 17 and 18, housing 156 may include one or more "touch latches" 176, for example, magnetic touch latches. In one aspect, when the material of projection 152 is not ferromagnetic, a ferromagnetic contact 178 may be provided and positioned to engage touch latch 176. As known in the art, magnetic touch latch 178 may magnetically retain projection 152 in the retracted position, as shown in FIG. 17, and then when projection 152 is compressed against touch latch 176, touch latch 176 may resiliently deflect projection 152 to facilitate orienting projection 152 as desired by the user, for example, in the extended position shown in FIG. 18. In one aspect, touch latch 176 may be a touch latch provided by EPCO Hardware, for example, magnetic touch latch 176, or its equivalent. Other forms of latches, conventional retainers, and retainer hardware may be used for assembly 150 as will be apparent to those of skill in the art.

Figure 19:
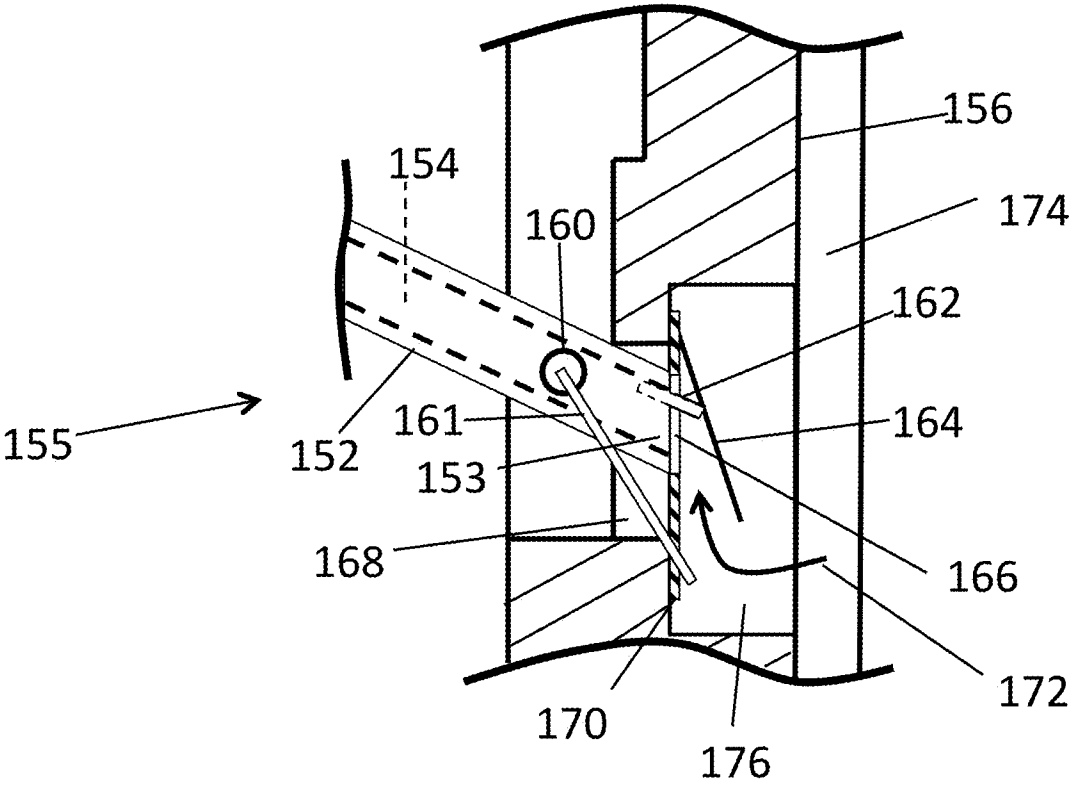
FIG. 19 is a detailed view of the proximal end of the projection shown in FIG. 18 as identified by Detail 19 shown in FIG. 18.

FIG. 19 is a detailed view of the proximal end 155 of the projection 152 shown in FIG. 18 as identified by Detail 19 shown in FIG. 18. As shown in FIG. 19, housing 156 includes a recess or cavity 168 into which the proximal end of projection 152 may rotate into, and a panel or plate 170 having a hole or orifice 166 mounted over and defining one end of recess 168, and positioned to be in fluid communication with open end 153 of projection 152. As also shown in FIG. 19, valve element or baffle 164 may be mounted to panel or plate 170 or to housing 156, and, with the rotation of projection 152, bar or pin 162 on projection 152 contacts and deflects baffle or reed valve 164 to expose hole or orifice 166 and allowing pressurized air, as indicated by arrow 172, to pass from passage 174 in housing 156 through hole 166, through open end 153, and into internal passage 154 of projection 152 and out of open end 155, to dry an apparel mounted on projection 152, as disclosed herein. In one aspect, as shown in FIG. 19, panel or plate 170 and baffle 164 may be mounted in a recess 176 in housing 156 which may typically be exposed to internal passage 174 of housing 156.

FIG. 20 is a side elevation view of a projection 180 that may be used for the projection 152 shown in the assembly of FIGS. 17 and 18, and any projection disclosed herein, according to one aspect of the invention. FIG. 21 is a front elevation view of projection 180 shown in FIG. 20 and FIG. 22 is a top view of projection 180 shown in FIG. 20 as viewed in the direction of Arrow 22 shown in FIG. 21. As shown in FIGS. 20-22, projection 180 may typically be an elongated member 182 having an elongated internal cavity 184 having a proximal opening 186 and a distal opening 188.

As disclosed herein, the elongated member 182 may be fabricated from any convenient material, for example, from a metal, from a plastic, or from wood. In one aspect, elongated member 182 may be fabricated from wood, for example, a decorative hardwood, such as, cherry, oak, or maple. In another aspect, member 182 may be fabricated from aluminum or steel, for example, stainless steel, such as, 304 or 316 stainless steel. Though generally rectangular in cross section, for example, as shown in FIG. 20, member 182 may be fabricated in any conventional cross sectional shape, such as, circular, elliptical, and polygonal, including generally rectangular or square. Also, it is envisioned that, though elongated internal cavity 184 is shown generally circular in cross section, for example, as shown in FIG. 22, elongated internal cavity 184 may be provided in any conventional cross sectional shape, such as, circular, elliptical, and polygonal, including generally rectangular or square.

Elongated member 182 may have a length ranging from about 3 inches to about 4 feet, but typically has a length of between about 6 inches and about 18 inches, for example, about 12.75 inches. Elongated member 182 may have a width or diameter ranging from about 0.25 inches to about 6 inches, but typically has a width or diameter between about 0.75 inches and about 2 inches, for example, about 1.125 inches in width or diameter. The internal cavity 184 of elongated member 182 may have an internal width or internal diameter ranging from about 0.125 inches to about 5 inches, but typically has a width or diameter between about 0.50 inches and about 2 inches, for example about 0.75 inches in width or diameter.

As shown in FIG. 20, member 182 may have chamfered ends, for example, the distal end of member 182 may include a chamfer angle, $\gamma$ (gamma), and the proximal end of member 182 may include a chamfer angle, $\delta$ (delta). The chamfer angles, $\gamma$ and $\delta$, may be the same or vary, and may range from 5 degrees to 90 degrees (that is, substantially no chamfer), but typically range from about 15 degrees to about 60 degrees, for example, about 45 degrees.

According to aspects of the invention, member 182 includes at least one hole 190, for example, a through hole, positioned and sized to receive a dowel or pin, for example, about which member 182 may be rotatably mounted, for instance, pin 160 shown in FIGS. 17-19. Hole hole 190 may have a diameter ranging from about 0.125 inches to about 2 inches, but typically has a diameter of between about 0.25 inches and about 0.50 inches, for example, about 0.375 inches.

As also shown in FIGS. 20 and 21, according to aspects of the invention, member 182 includes at least one projection 192, for example, a bar, tab, or pin, positioned and sized to contact and deflect a valve element as disclosed herein, for example, pin 162 shown in FIGS. 17-19. FIG. 23 is a detailed view of the proximal end of member 182 shown in FIG. 20 as identified by Detail 23 shown in FIG. 20, and showing projection 192 and a typical mounting. Projection 192 may be mounted to elongated member 182, for example, to an internal surface of elongated internal cavity 184 or to an external surface of member 182, by any conventional means, for example, via one or more mechanical fasteners, an adhesive, welded, or formed integrally with member 182. In the aspect of the invention shown in FIGS. 20-23, projection 192 may be mounted to member 182 by a set of fasteners 194, for example, threaded fasteners or rivets.

FIG. 24 is a front elevation view of one projection 192 that may be used for the projection shown in FIGS. 20-23. FIG. 25 is a side elevation view of the projection 192 shown in FIG. 24. As shown in FIGS. 24 and 25, projection 192 may comprise a rectangular bar, though in other aspects, projection 1192 may be non-rectangular, for example, circular or elliptical in cross section. As shown in FIG. 24, projection 192 may have one or more through holes 193, for example, adapted to receive fasteners 194. Holes 193 may be threaded or non-threaded and may have a diameter ranging from about 0.050 inches to about 0.250 inches, but typically have a diameter of about 0.112 inches.

Projection 192 may be fabricated from a metal, a plastic, or wood, but typically is metallic, for example, made of aluminum or stainless steel. Projection 192 may typically have a length ranging from about 0.50 inches to about 5 inches, but typically ranges from about 1 inch to about 2 inches in length, for example, about 1.4375 inches in length. Projection 192 may typically have a width or diameter ranging from about 0.125 inches to about 2 inches, but typically ranges from about 0.125 inch to about 0.50 inches in width or diameter, for example, about 0.25 inches in width or diameter. Projection 192 may typically have a thickness ranging from about 0.03125 inches to about 0.50 inches, but typically ranges from about 0.3125 inches to about 0.25 inches in thickness, for example, about 0.0625 inches in thickness.

FIG. 26 is a plan view of a panel, plate, or valve seat plate 200 that may be used for plate 170 shown in FIGS. 17-19 according one aspect of the invention. As shown in FIG. 26, valve seat plate 200 may typically comprise a plate 202 having an orifice or opening 204 and one or more mounting holes 206. As shown most clearly in FIG. 19, valve seat plate 200 may typically mounted in housing 156 and provide opening 172/204 or "valve seat" that can be obstructed by valve element 164, for example, a deflectable baffle or flap.

Valve seat plate 200 may be made from a metal, a plastic, or wood. For example, in one aspect, valve seat plate 200 may be made of aluminum or steel, for example, stainless steel or spring steel.

In one aspect, orifice or opening 204 in plate 202 may be circular, as shown, or non-circular, for example, elliptical or polygonal, for example, rectangular or square. Orifice or opening 204 may typically have an internal dimension, width, or diameter, ranging from about 0.50 inches to about 5 inches, but typically ranges from about 1 inch to about 1.50 inches in internal dimension, for example, about 1.125 inches in internal dimension.

Though shown generally rectangular in FIG. 26, plate 202 may be circular, elliptic, or polygonal in shape. Plate 202 may typically have a length or diameter ranging from about 0.50 inches to about 8 inches, but typically ranges from about 1 inch to about 5 inches in length or diameter, for example, about 3.125 inches in length or diameter. Plate 202 may typically have a width ranging from about 0.5 inches to about 6 inches, but typically ranges from about 1 inch to about 2 inches in width, for example, about 1.625 inches in width. Plate 202 may have a thickness ranging from about 0.005 inches to about 1 inch, but typically ranges from about 0.005 inches to about 0.125 inches in length, for example, about 0.010 inches in thickness.

FIG. 27 is a plan view of a valve element 210, for example, a deflectable baffle, flap, or reed valve, which may be used for plate 164 shown in FIGS. 17-19 according one aspect of the invention. As shown in FIG. 27, valve element 210 may typically comprise a plate 212 having one or more mounting holes 214. As shown most clearly in FIG. 19, valve element 164/210 may typically be mounted in housing 156, for example, mounted onto valve seat 170, obstruct opening 166, and be deflectable by pin or projection 162 to at least partially remove the obstruction to opening 166.

Plate 212 of reed valve 210 may be made from a metal, a plastic, or wood. For example, in one aspect, plate 212 may be made of aluminum or steel, for example, stainless steel or spring steel.

Though shown generally rectangular in FIG. 27, plate 212 of reed valve 210 may be circular, elliptic, or polygonal in shape. Plate 210 may typically have a length or diameter ranging from about 0.50 inches to about 8 inches, but typically ranges from about 1 inch to about 5 inches in length or diameter, for example, about 2.25 inches in length or diameter. Plate 212 may typically have a width ranging from about 0.5 inches to about 6 inches, but typically ranges from about 1 inch to about 2 inches in width, for example, about 1.375 inches in width. Plate 212 may typically have a thickness ranging from about 0.005 inches to about 1 inch, but typically ranges from about 0.005 inches to about 0.125 inches in length, for example, about 0.010 inches in thickness.

FIG. 28 is a side elevation view of a spring wire assembly 220 which may be used to bias the position of projection 152 shown in FIGS. 17-19 according one aspect of the invention. FIG. 29 is a plan view of the spring wire assembly 220 shown in FIG. 28.

As shown in FIGS. 28 and 29, spring wire assembly 220 includes a u-shaped wire 222 and a set of pins 224 mounted to wire 222. According to aspects of the invention, pins 224 are positioned and sized to engage holes in projection 152, for example, holes 190 in elongated member 182 shown in FIG. 20, and bias the position of projection 152, for example, bias the position of projection 152 into the retracted position, for instance, as shown in FIG. 17. Pins 224 may include through holes 226 sized to receive wire 222. Wire 222 may be retained in holes 226 by deforming wire 222 and/or welding.

Wire 222 of spring wire assembly 220 may be made from a metal, for example, stainless steel or spring steel. Though shown generally rectangular in FIG. 29, wire 222 may be formed to any shape compatible with the shape of the projection, for example, projection 152, which spring wire assembly 220 is intended to engage. Wire 222 may be formed into circular, elliptic, or polygonal shape as needed. Wire 222 may typically have a diameter ranging from about 0.03125 inches to about 0.25 inches, but typically ranges from about 0.03125 inches to about 0.125 inches in diameter, for example, about 0.0625 inches in diameter.

Pins 224 of spring wire assembly 220 may be made from a metal or a plastic, but are typically metallic, for example, stainless steel or spring steel. Though shown generally circular cylindrical in FIG. 29, pins 224 may be formed to any shape compatible with the shape the holes in the projection that pins 224 are intended to engage. Pins 224 may be formed into circular, elliptic, or polygonal shape as needed. Pins 224 may typically have a diameter ranging from about 0.125 inches to about 0.75 inches, but typically from about 0.25 inches to about 00.50 inches in diameter, for example, about 0.375 inches in diameter. Pins 224 may typically have a length ranging from about 0.25 inches to about 3 inches, but typically range from about 0.50 inches to about 1.50 inches in diameter, for example, about 0.9375 inches in diameter.

Figure 32:
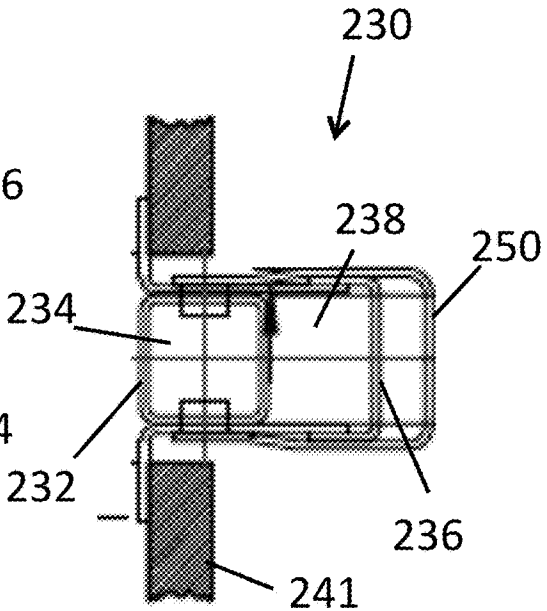
FIG. 32 is a cross-sectional view of the of the apparel drying assembly module shown in FIG. 31, as indicated by section view lines 32-32 shown in FIG. 31, as mounted, for example, within a wall, according to one aspect of the invention.
Figure 31:
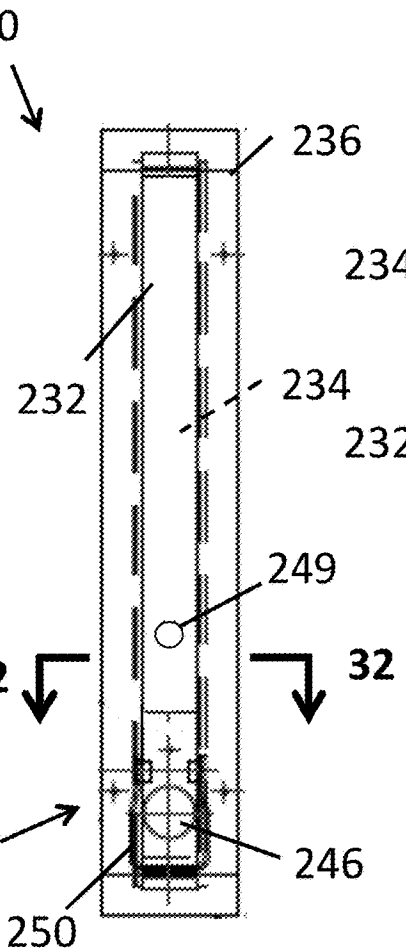
FIG. 31 is a front elevation view of the apparel drying assembly module shown in FIG. 30, with the projection in the retracted position.
Figure 30:
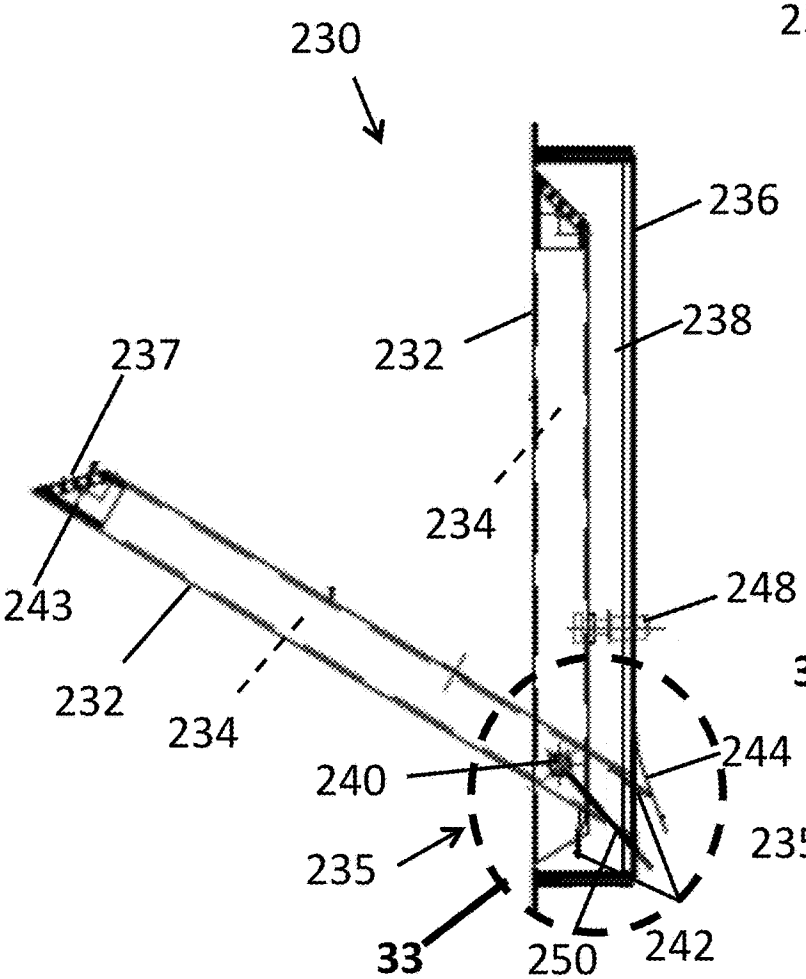
FIG. 30 is a side elevation view, partially in cross section, of an apparel drying assembly module according to another aspect of the invention, with a projection in an extended position and in a retracted position.

FIG. 30 is a side elevation view, partially in cross section, of an apparel drying assembly or module 230 according to another aspect of the invention, with a projection 232 in an extended position and in a retracted position. FIG. 31 is a front elevation view of the apparel drying assembly or module 230 shown in FIG. 30, with the projection 232 in the retracted position. FIG. 32 is a cross-sectional view of the of the apparel drying assembly or module 230 shown in FIG. 31, as indicated by section view lines 32-32 shown in FIG. 31, as mounted, for example, within a wall, according to one aspect of the invention.

Also similar to other aspects disclosed herein, assembly or module 230 may be provided as a subassembly, an assembly, or a projection module 230 mounted in a wall or a panel 241, as shown in FIG. 32, for example, into the assemblies shown in FIGS. 42-45.

Similar to other aspects of the invention disclosed herein, projection or "peg" 232 of module 230 shown in FIGS. 30-32 includes an internal passage 234 having an open distal end 237, an open proximal end 239 (see FIG. 33), and is operatively connected to a source of pressurized air. In one aspect, projection 232 may include one or more air flow diffusing element 243, for example, a device having a plurality of holes or orifices adapted to improve the distribution and/or increase the velocity of flow of air from open distal end 237. Projection 232 may be pivotally mounted at a proximal end 235 to a housing 236, for pivotally rotating projection 232 into and out of a cavity or recess 238 in housing 236. According to this aspect, projection 232 may be pivotally mounted to housing 236 by pin or dowel 240. As disclosed herein, pressurized air may be passed through internal passage 234 and directed out of open distal end 237 to dry a piece of apparel (not shown) mounted to projection 232.

In the aspect of the invention, shown in FIGS. 30-32, pivotally mounted projection 232 includes an extension 242 from proximal end 235, and the extension 242 is positioned and adapted to deflect a valve element 244 when the pivotally mounted projection 232 is at least partially rotated into an extend position, as shown in FIG. 30, for example, a position adapted to receive the apparel (not shown). In one aspect, the extension 242 of proximal end 235 may comprise an extension of the pivotally mounted projection 232, or a projection, a tab, a pin, a rod, a bar, or a related structure mounted to the proximal end 235 of projection 232. In the aspect of the invention shown in FIGS. 30 and 31, the extension 242 may comprise one or more bars or pins.

According to aspects of the invention the extension 242, for example, a bar or pin, on the proximal end 235 of projection 232 may be positioned and adapted to engage any form of valve element is deflected where pressurized air provided to housing 236 is provided to the internal passage 234 of projection 232. In the aspect of the invention shown in FIGS. 30 and 31, housing 236 includes one or more deflectable baffles, flaps, or reed valves 244 positioned over a hole or orifice 246 in housing 236. A detail of the deflection of one valve element according to one aspect of the invention is shown in FIG. 33.

In one aspect, housing 236 of assembly 230 may include one or more mechanisms to assist in retaining the positioning of projection 232 in housing 236, for example, retaining projection 236 within cavity 238 in housing 236. For example, as shown in FIGS. 30 and 31, housing 236 may include one or more "touch latches" 248, for example, magnetic touch latches. In one aspect, when the material of projection 232 is not ferromagnetic, a ferromagnetic contact 249 may be provided and positioned to engage touch latch 248. As known in the art, magnetic touch latch 248 may magnetically retain projection 232 in the retracted position, as shown in FIG. 31, and then when projection 232 is compressed against touch latch 248, touch latch 248 may resiliently deflect projection 232 to facilitate orienting projection 232 as desired by the user, for example, in the extended position shown in FIG. 30. In one aspect, touch latch 248 may be a touch latch provided by EPCO Hardware, for example, magnetic touch latch 248, or its equivalent. Other forms of latches, conventional retainers, and retainer hardware may be used for assembly 230 as will be apparent to those of skill in the art.

In one aspect, projection 232 may be pivotally mounted to housing 236 with one or more biasing elements 250, for example, an elastomeric element or spring element adapted to bias the positioning of projection 232, for example, biased into the retracted position shown in FIGS. 30 and 31. In one aspect, the biasing element may be associated with dowel or pin 240 and bias the positioning of projection 232 into the retracted position. One biasing element that may be used may be the spring wire assembly 220 shown in and described with respect to FIGS. 28 and 29, thought other types of biasing elements may be used.

Figure 33:
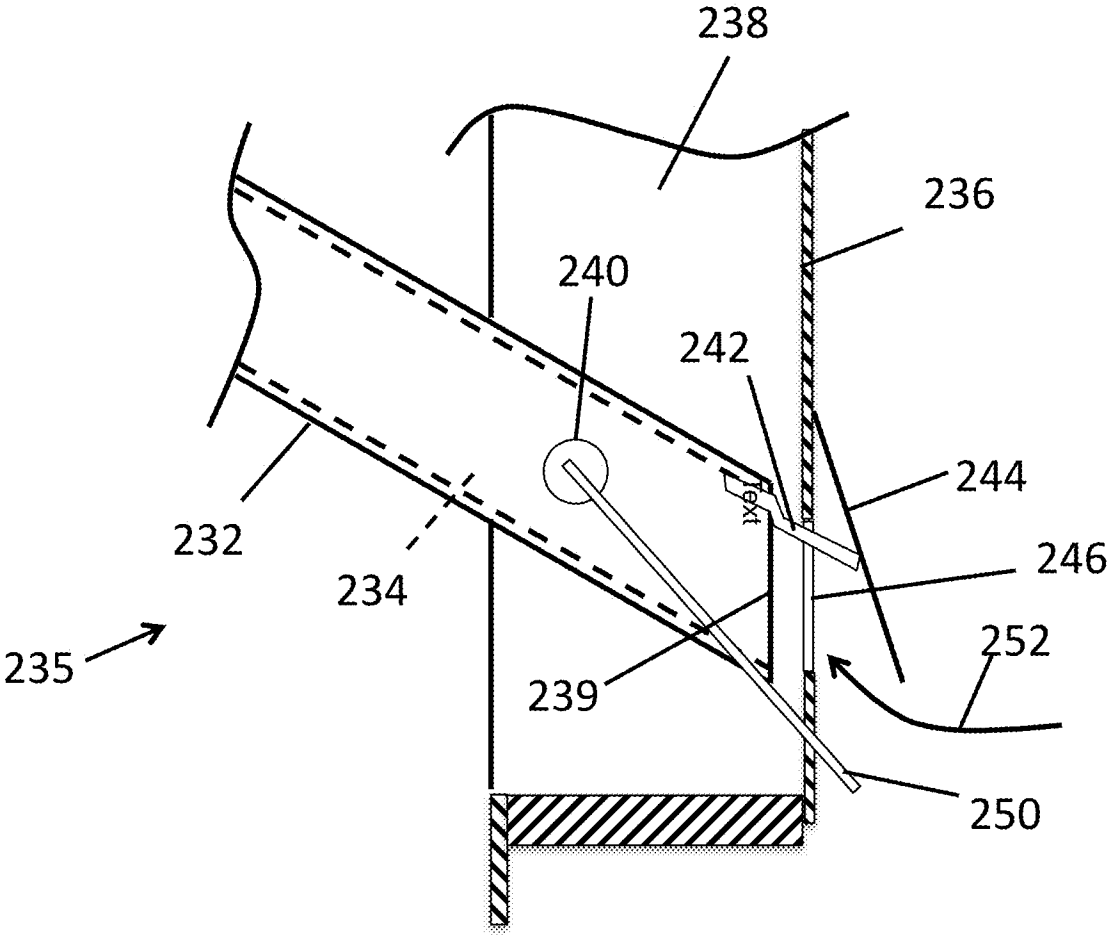
FIG. 33 is a detailed view of the proximal end of the projection of the module shown in FIG. 30 as identified by Detail 33 shown in FIG. 30, showing the projection in the extended position.

FIG. 33 is a detailed view of the proximal end 235 of the projection 232 of module 230 shown in FIG. 30 as identified by Detail 33 shown in FIG. 30, showing the projection 232 in an extended position. As shown in FIG. 33, housing 236 includes a recess or cavity 238 into which the proximal end 255 of projection 232 may rotate into. Projection 232 may be pivotally mounted to housing 236 by biasing element 250. As shown in FIG. 33, housing 236 includes a hole or orifice 246. In the aspect shown, valve element, for example, a baffle or reed valve, 244 may be mounted to housing 236, and, with the rotation of projection 232, projection, bar, or pin 242 on projection 232 contacts and deflects valve element 244 to expose hole or orifice 246 and allow pressurized air, as indicated by arrow 252, to pass through open proximal end 239 and into internal passage 234 of projection 232, and out of open end 237, to dry an apparel mounted on projection 232, as disclosed herein.

Figure 34:
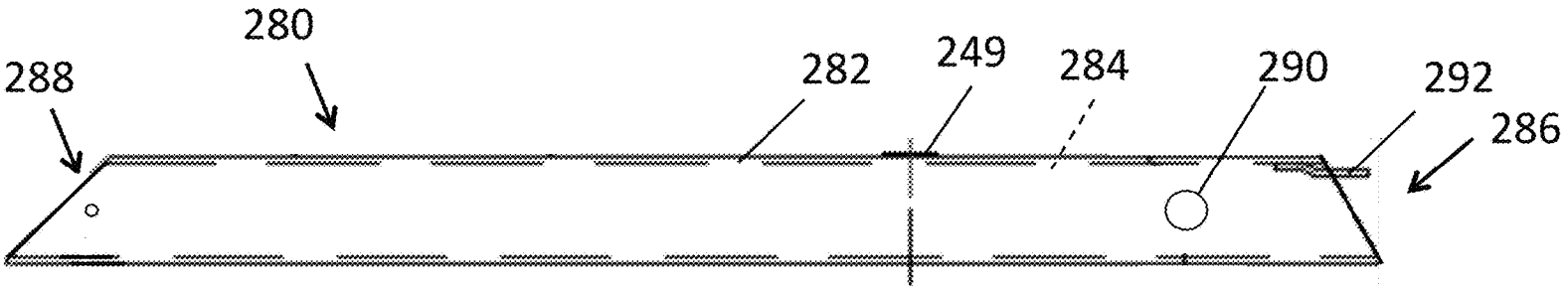
FIG. 34 is a side elevation view of a projection that may be used for the projection shown in the assembly of FIGS. 31-33, and any projection disclosed herein, according to one aspect of the invention.
Figure 35:
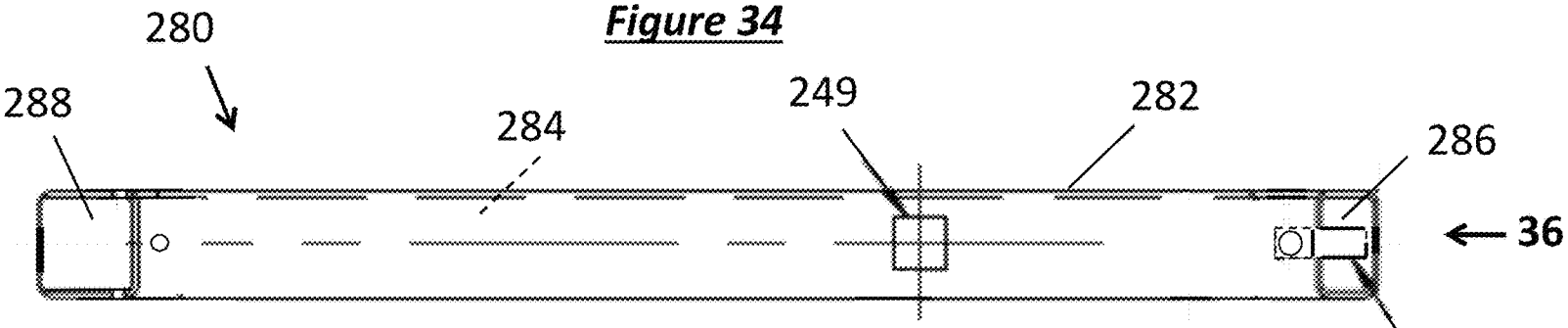
FIG. 35 is a front elevation view of the projection shown in FIG. 34.
Figure 36:
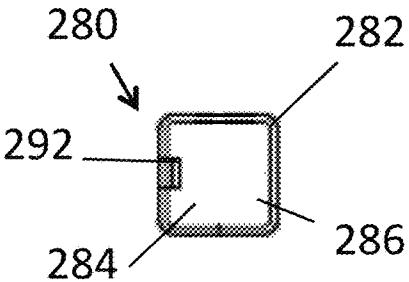
FIG. 36 is a top view of the projection shown in FIG. 35 as viewed in the direction of Arrow 36 shown in FIG. 35.

FIG. 34 is a side elevation view of a projection 280 that may be used for the projection 232 of assembly or module 230 shown in FIGS. 31-33, and any projection disclosed herein, according to one aspect of the invention. FIG. 35 is a front elevation view of projection 280 shown in FIG. 34, and FIG. 36 is a top view of projection 280 shown in FIG. 35 as viewed in the direction of Arrow 36 shown in FIG. 35. As shown in FIGS. 34-36, projection 280 may typically be an elongated member 282 having an elongated internal cavity 284 having a proximal opening 286 and a distal opening 288.

As disclosed herein, the elongated member 282 may be fabricated from any convenient material, for example, from a metal, from a plastic, or from wood. In one aspect, elongated member 282 may be fabricated from a metal, for example, aluminum or steel, for example, stainless steel, such as, 304 or 316 stainless steel. In one aspect, elongated member 282 may be fabricating from metal pipe or tubing. Though generally rectangular in cross section, for example, as shown in FIG. 36, member 282 may be fabricated in any conventional cross sectional shape, including circular, elliptical, and polygonal, including generally rectangular or square. Also, it is envisioned that, though elongated internal cavity 284 is shown generally rectangular in cross section, for example, as shown in FIG. 36, elongated internal cavity 284 may be provided in any conventional cross sectional shape, including circular, elliptical, and polygonal, including generally rectangular or square.

Elongated member 282 may have a length ranging from about 3 inches to about 4 feet, but typically has a length of between about 6 inches and about 18 inches, for example, about 12.625 inches. Elongated member 282 may have a width or diameter ranging from 0.25 inches to 6 inches, but typically has a width or diameter between about 0.75 inches and 2 inches, for example about 1 inch in width or diameter. The internal cavity 184 of elongated member 182 may have an internal width or internal diameter ranging from 0.125 inches to 5 inches, but typically has a width or diameter between about 0.50 inches and 2 inches, for example about 0.75 inches in width or diameter. The wall thickness of elongated member 282 may range from 0.03125 inches to 0.5 inches, but typically has a wall thickness between about 0.03125 inches and 0.125 inches, for example about 0.0625 inches in wall thickness.

As shown in FIG. 34, member 282 may have chamfered ends, for example, similar to the chamfered ends of elongated member 182 shown in FIG. 20. For example, member 282 may have chamfered ends having chamfer angles that may range from 5 degrees to 90 degrees (that is, substantially no chamfer), but typically range from about 15 degrees to about 60 degrees, for example, about 45 degrees.

According to aspects of the invention, member 282 includes at least one hole 290, for example, a through hole, positioned and sized to receive a dowel or pin, for example, about which member 282 may be rotatably mounted, for instance, pin 240 shown in FIG. 30. Hole 290 may have a diameter ranging from about 0.125 inches to about 2 inches, but typically has a diameter of between about 0.25 inches an about 0.50 inches, for example, about 0.375 inches.

As also shown in FIGS. 34-36, according to aspects of the invention, member 282 includes at least one projection 292, for example, a bar, tab, or pin, positioned and sized to contact and deflect a valve element as disclosed herein, for example, projection 242 shown in FIG. 30. Projection 292 may be mounted to elongate member 282, for example, to an internal surface of elongated internal cavity 284 or to an external surface of member 282, by any conventional means, for example, via one or more mechanical fasteners, an adhesive, welded, or formed integrally with member 282. In the aspect of the invention shown in FIGS. 34-36, projection 292 may be mounted to member 282 by a weld, for example, ¼-inch plug weld.

Figure 38:
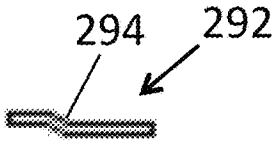
FIG. 38 is a side elevation view of the projection shown in FIG. 37.
Figure 37:
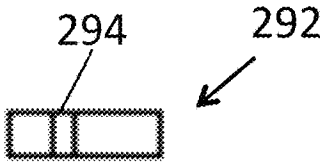
FIG. 37 is a plan view of one projection that may be used for the projection shown in FIGS. 34-36.

FIG. 37 is a plan view of one projection 292 that may be used for the projection shown in FIGS. 34-36. FIG. 38 is a side elevation view of the projection 192 shown in FIG. 37. As shown in FIGS. 37 and 38, projection 292 may comprise a rectangular bar, though in other aspects, projection 292 may be non-rectangular, for example, circular or elliptical in cross section. As shown in FIG. 37, projection 292 may have a "jog" or "kink" 294 to better conform to the shape of elongated member 282 and/or a desired positioning of projection 192; however, in other aspects, no kink may be provided.

Projection 292 may be fabricated from a metal, a plastic, or wood, but typically is metallic, for example, made of aluminum or stainless steel. Projection 292 may typically have a length ranging from about 0.25 inches to about 5 inches, but typically ranges from about 0.50 inch to about 2 inches in length, for example, about 0.875 inches in length. Projection 292 may typically have a width or diameter ranging from about 0.125 inches to about 2 inches, but typically ranges from about 0.125 inch to about 0.50 inches in width or diameter, for example, about 0.25 inches in width or diameter. Projection 292 may typically have a thickness ranging from about 0.03125 inches to about 0.50 inches, but typically ranges from about 0.3125 inches to about 0.25 inches in thickness, for example, about 0.0625 inches in thickness.

FIG. 39 is a front elevation view of a housing 300 that may be used for housing 236 shown in FIGS. 30-33, according to one aspect of the invention. FIG. 40 is a side elevation view of housing 300 shown in FIG. 39, and FIG. 41 is cross sectional view of housing 300 shown in FIG. 39 as viewed along section lines 41-41 in FIG. 39.

As shown in FIG. 39, housing 300 may typically include a main body 302 and a flange 304 mounted to main body 302. According to aspects of the invention, main body 302 includes a cavity or recess 306 into which a projection, for example, projection 232 shown in FIGS. 30-33, may be mounted, for example, pivotally mounted as disclosed herein. Flange 304 may typically include a plurality of mounting holes 305, for example, for mounting housing 300 to a wall or panel, as disclosed herein, for instance .for mounting into the panels disclosed in FIGS. 42-45. According to aspects of the invention, main body 302 and flange 304 may be provided by any conventional construction, for example, piece parts assembled by welding, mechanical fasteners, or an adhesive, or as one or more integral components fabricated by, for example, forging, extrusion, and/or machining. According to aspects of the invention, housing 300 may be made from a metal, a plastic, or wood. For example, in one aspect, housing 300 may be fabricated from carbon steel and/or stainless steel components to yield the desired housing shown in FIGS. 39-41.

As shown in FIG. 39, housing 300 may typically include an orifice or hole 316 which may function as a valve seat for a valve element, for example, for reed valve 244 shown in FIG. 33. Housing 300 may also include one or more mounting holes 318, for example, for mounting a valve element to housing 300, for example, for mounting reed valve 244 to over hole 316. Housing 300 may also include one or more holes 320, for example, for mounting a retaining device, for example, touch latch 248 shown in FIG. 30 to housing 300. As shown in FIG. 40, housing 300 may typically include opposing hole 322 in the opposing sides of housing 300 positioned and adapted to receive a projection mounting pin, for example, to receive the pins of spring wire assembly 220 shown in FIG. 29.

Again, though many means of fabricating housing 300 are envisioned according to aspects of the invention, in the embodiment shown in FIGS. 39-41, as most clearly shown in FIG. 41, housing 300 may be fabricated by assembling angles 308 and one or more channels 310. Angles 308 and channels 310 may be stock angles and/or channels and/or formed angles and/or formed channels, for example, angles and/or channels formed from metal plate or plastic sheets. Angles 308 and channels 310 may have a thickness ranging from 0.03125 inches to 0.25 inches, for example, about 0.0625 inches. Angles 304 and channels 306 may be assembled via welding, an adhesive, or mechanical fasteners.

As most clearly shown in FIG. 40, housing 300 may also be fabricated with end plates 312 and end flanges 314, for example, assembled to angles 308 and channels 310 by welding, an adhesive, or mechanical fasteners. End flanges 314 may have a thickness ranging from about 0.03125 inches to about 0.25 inches, for example, about 0.0625 inches. End plates 312 may have a thickness ranging from about 0.125 inches to about 0.5 inches, for example, about 0.25 inches.

Main body 302 of housing 300 may typically have a length ranging from about 3 inches to about 3 feet, but typically ranges from about 8 inches to about 16 inches in length, for example, about 13.375 inches in length. Main body 302 may typically have a width ranging from about 0.5 inches to about 6 inches, but typically ranges from about 0.50 inches to about 1.50 inches in width, for example, about 1 inch in width. Main body 302 may typically have a depth ranging from about 0.50 inches to about 6 inches, but typically ranges from about 0.50 inches to about 3.0 inches in depth, for example, about 1.75 inches in depth.

Figure 43:
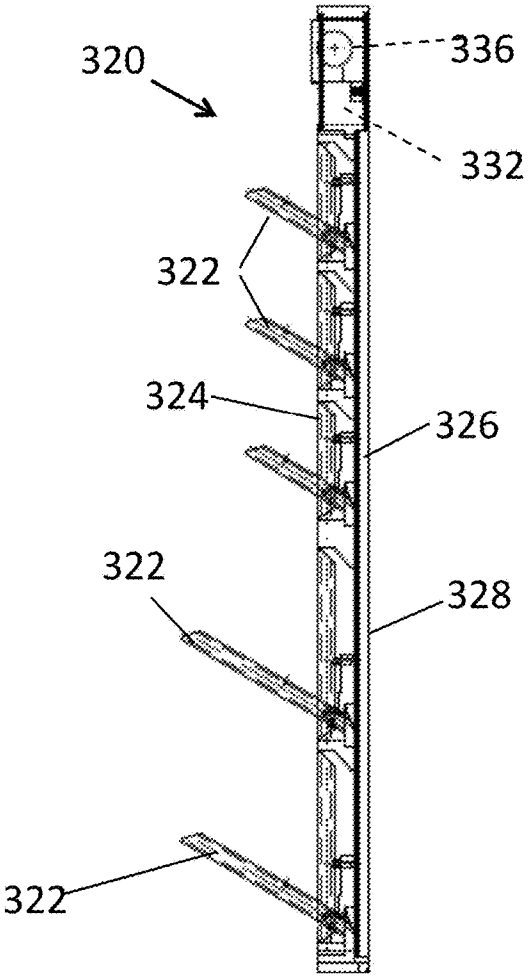
FIG. 43 is a side elevation view of the assembly shown in FIG. 42 having projections oriented in an extended position according to an aspect of the invention.
Figure 42:
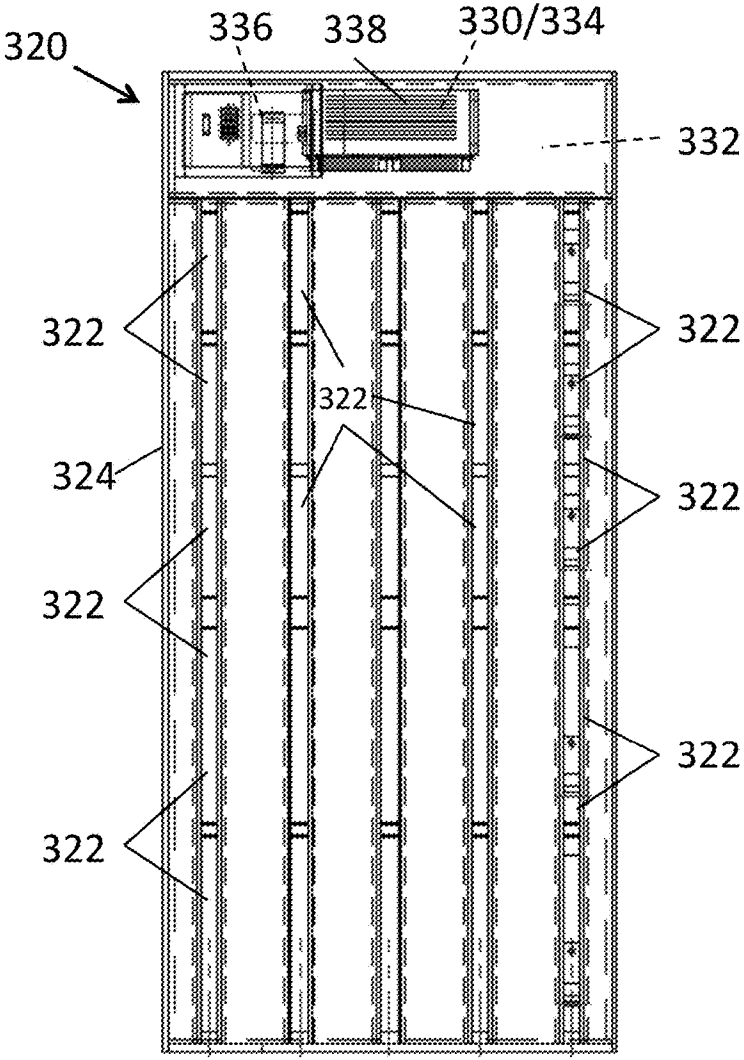
FIG. 42 is a front elevation view of an assembly or panel assembly having a plurality of pivotally-mounted projections according to one aspect of the invention.

FIG. 42 is a front elevation view of an assembly or panel assembly 320 having a plurality of pivotally mounted projections 322 according to one aspect of the invention. FIG. 43 is a side elevation view of assembly 320 shown in FIG. 42 having projections 322 oriented in an extended position according to an aspect of the invention. According to this aspect of the invention, assembly 320 includes a housing or panel 324 adapted to receive the pivotally-mounted projections 322 or projection modules disclosed herein and provide a flow of pressurized air, for example, heated drying air, to the plurality of projections 322, in a fashion disclosed herein. In one aspect of the invention, at least one of the projections 322 may not be pivotally mounted, but may be rigidly mounted in panel 324.

Projections 322 may be mounted to panel 324 and may function as disclosed herein. Projections 322 may be mounted to panel 324 by conventional means, for example, with appropriate hardware, welded, and/or with an adhesive. Projections 322 may also preferably be mounted to panel 324 by any one or more of the mounting means disclosed herein. For example, one or more of the projections 322 may comprise any projection and its mounting, function, and operation disclosed herein. For instance, one or more of the projections 322 may be mounted and have the function, operation, materials, and dimensions of projection 16 disclosed in and described with respect to FIGS. 3-9; one or more of the projections 322 may be mounted and have the function, operation, material, and dimensions of projection 84 disclosed in and described with respect to FIG. 10; one or more of the projections 322 may be mounted and have the function, operation, materials, and dimensions of projection 106 disclosed in and described with respect to FIGS. 11 and 12; one or more of the projections 322 may have the mounting and have the function, operation, materials, and dimensions of projection 152 disclosed in and described with respect to FIGS. 17 and 18; and/or one or more of the projections 322 may have the mounting and have the function, operation, materials, and dimensions of projection 232 disclosed in and described with respect to FIG. 30-33.

As shown most clearly in FIG. 43, one or more of the projections 322 may vary in length.

According to the aspect shown in FIGS. 42 and 43, panel or housing 324 of assembly 320 may be adapted to deliver a flow of pressurized air to at least some, but, typically, most of projections 322. For example, in one aspect, panel 324 may include one or more internal passages, ducts, or channels adapted to transmit a flow of pressurized air to the open ends (as disclosed herein) of at least some of the projections 322. In one aspect, panel 324 may include an internal passage or chamber 326, for example, a chamber 326 at least partially defined by a back panel 328, that is in fluid communication with the open ends of projections 322, for example, via a valve mechanism, such as, the reed valves shown in FIG. 19 or 33.

In one aspect, a source of pressurized air, for example, a fan or blower, may be mounted in assembly 320, for example, at the top, bottom, front, rear, or sides of panel 324, and communicate a flow of pressurized air to one or more of projections 322. In one aspect, the flow of pressurized air may be heated and/or dehumidified.

In the aspects of the invention shown in FIGS. 42 and 43, panel assembly 320 includes at least one source of pressurized air 330 mounted in a cavity 332 in the top of panel assembly 320. In one aspect, this source of pressurized air 330 may be a fan 334 driven by an electric motor 336, and the fan 332 having an inlet 338 in communication with the ambient air, for example, room air, and an outlet operatively communicating with the internal passage 326, for example, via internal cavity 332. Ambient air may be drawn into fan 334 via an appropriate grating 338, for example, a decorative grating. Motor 336 may be provided with appropriate electrical power, for example, a power cord hardwired to a source of electrical power or a power cord adapted to be plugged into an electrical outlet.

The panel 324 and the projections 322 may be fabricated from a metal, a plastic, and/or a wood. In one aspect, panel 324 any projections 322 may be fabricated from a decorative hardwood, for example, a maple, an oak, or a cherry, to provide a more aesthetically appealing appearance.

In one aspect, assembly 320 may be mounted to a surface of barrier or wall or may at least partially be imbedded in a barrier or wall, for example, to minimize intrusion of the assembly into a living or work space. For example, in one aspect, assembly 320 may be mounted in a wall where the front surface of assembly 320 is flush with the wall or barrier, or may protrude only slightly from the surface of the wall. Assembly 320 may be mounted to the barrier or wall by conventional means, for example, with mechanical fasteners.

The size of assembly 320 may vary depending upon the desired installation and, for example, the number of projections 322 desired. In one aspect, panel assembly 320 may have a height ranging from about 3 feet to about 20 feet, but is typicality between about 4 feet and about 8 feet in height, for example, about 5.5 feet in height. In one aspect, panel assembly 320 may have a width ranging from about 6 inches to about 10 feet, but is typicality between about 2 feet and about 5 feet in width, for example, about 2.5 feet in width. In one aspect, panel assembly 320 may have a depth ranging from 2 inches to about 2 feet, but typicality is between about 2 inches and about 1 foot in depth, for example, about 3.5 inches in depth.

Figure 45:
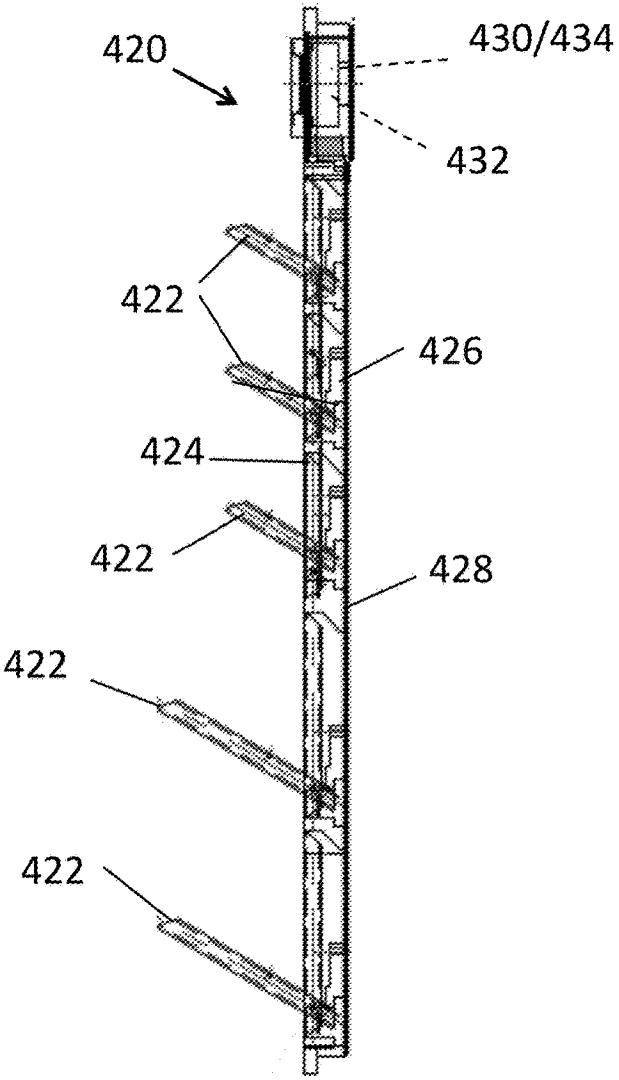
FIG. 45 is a side elevation view of the assembly shown in FIG. 44 having projections oriented in an extended position according to an aspect of the invention.
Figure 44:
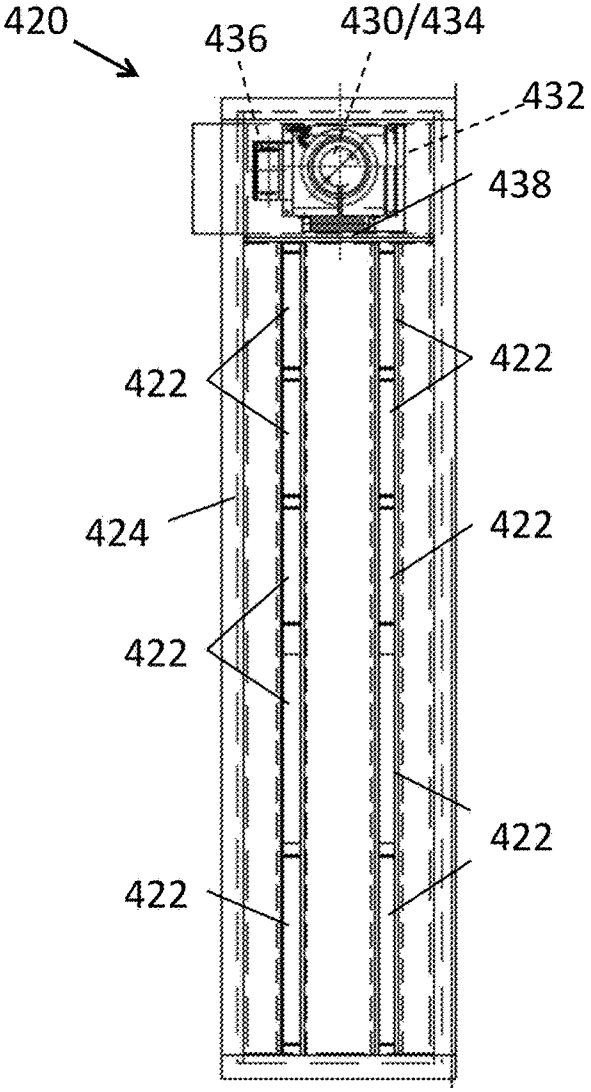
FIG. 44 is a front elevation view of another assembly or panel assembly having a plurality of pivotally-mounted projections according to another aspect of the invention.

FIG. 44 is a front elevation view of another assembly or panel assembly 420 have a plurality of pivotally-mounted projections 422 according to another aspect of the invention. FIG. 45 is a side elevation view of assembly 420 shown in FIG. 44 having projections 422 oriented in an extended position according to an aspect of the invention. According to this aspect of the invention, assembly 420 includes a housing or panel 424 adapted to receive the pivotally-mounted projections 422 and provide a flow of pressurized air, for example, heated drying air, to the plurality of projections 422, in a fashion disclosed herein. In one aspect of the invention, at least one of the projections 442 may not be pivotally mounted, but may be rigidly mounted in panel 424.

Projections 422 may be mounted to panel 424 and may function as disclosed herein. Projections 422 may be mounted to panel 424 by conventional means, for example, with appropriate hardware and/or an adhesive. Projections 422 may also preferably be mounted to panel 424 by any one or more of the mounting means disclosed herein. For example, one or more of the projections 422 may comprise any projection and its mounting, function, and operation disclosed herein. For instance, one or more of the projections 422 may be mounted and have the function, operation, materials, and dimensions of projection 16 disclosed in and described with respect to FIGS. 3-9; one or more of the projections 422 may be mounted and have the function, operation, material, and dimensions of projection 84 disclosed in and described with respect to FIG. 10; one or more of the projections 422 may be mounted and have the function, operation, materials, and dimensions of projection 106 disclosed in and described with respect to FIGS. 11 and 12; one or more of the projections 422 may have the mounting and have the function, operation, materials, and dimensions of projection 152 disclosed in and described with respect to FIGS. 17 and 18; and/or one or more of the projections 422 may have the mounting and have the function, operation, materials, and dimensions of projection 232 disclosed in and described with respect to FIG. 30-33.

As shown most clearly in FIG. 45, one or more of the projections 422 may vary in length.

According to the aspect shown in FIGS. 44 and 45, panel or housing 424 of assembly 420 may be adapted to deliver a flow of pressurized air to at least some, but, typically, most of projections 422. For example, in one aspect, panel 424 may include one or more internal passages, ducts, or channels adapted to transmit a flow pressurized air to the open ends (as disclosed herein) of at least some of the projections 422. In one aspect, panel 424 may include an internal passage or chamber 426, for example, a chambers 426 at least partially defined by a back panel 428, that is in fluid communication with the open ends of projections 422, for example, via a valve mechanism, such as, the reed valve shown in FIG. 19 or 33.

In one aspect, a source of pressurized air, for example, a fan or blower, may be mounted in assembly 420, for example, at the top, bottom, front, rear, or sides of panel 424, and communicate a flow of pressurized air to one or more of projections 422. In one aspect, the flow of pressurized air may be heated and/or dehumidified.

In the aspects of the invention shown in FIGS. 44 and 45, panel assembly 420 includes at least one source of pressurized air 430 mounted to a cavity 432 in the top of panel assembly 420. In one aspect, this source of pressurized air 430 may be a fan 434 driven by a motor 436, and the fan 432 having an inlet 438 in communication with the ambient air, for example, room air, and an outlet operatively communicating with internal passages 426, for example, via internal cavity 432. Ambient air may be drawn into fan 434 via an appropriate grating 438, for example, a decorative grating. Motor 436 may be provided with appropriate electrical power, for example, a power cord hardwired to a source of electrical power or a power cord adapted to be plugged into an electrical outlet.

The panel 424 and the projections 422 may be fabricated from a metal, a plastic, and/or a wood. In one aspect, panel 424 any projections 422 may be fabricated from a metal, such as, stainless steel or aluminum.

In one aspect, assembly 420 may be mounted to a surface of a barrier or wall or may at least partially be imbedded in a barrier or wall, for example, to minimize intrusion of the assembly into a living or work space. For example, in one aspect, assembly 420 may be mounted in a wall where the front surface of assembly 420 is flush with the wall or barrier, or may protrude only slightly from the surface of the wall. Assembly 420 may be mounted to the barrier or wall by conventional means, for example, with mechanical fasteners.

The size of assembly 420 may vary depending upon the desired installation and, for example, the number of projections 422 desired. In one aspect, panel assembly 420 may have a height ranging from about 3 feet to about 20 feet, but is typicality between about 4 feet and about 8 feet in height, for example, about 5.5 feet in height. In one aspect, panel assembly 420 may have a width ranging from about 6 inches to about 10 feet, but is typicality between about 2 feet and about 5 feet in width, for example, about 13.5 inches in width. In one aspect, panel assembly 420 may have a depth ranging from about 2 inches to about 2 feet, but is typicality between about 2 inches and 1 foot in depth, for example, about 3.25 inches in depth.

Figure 46:
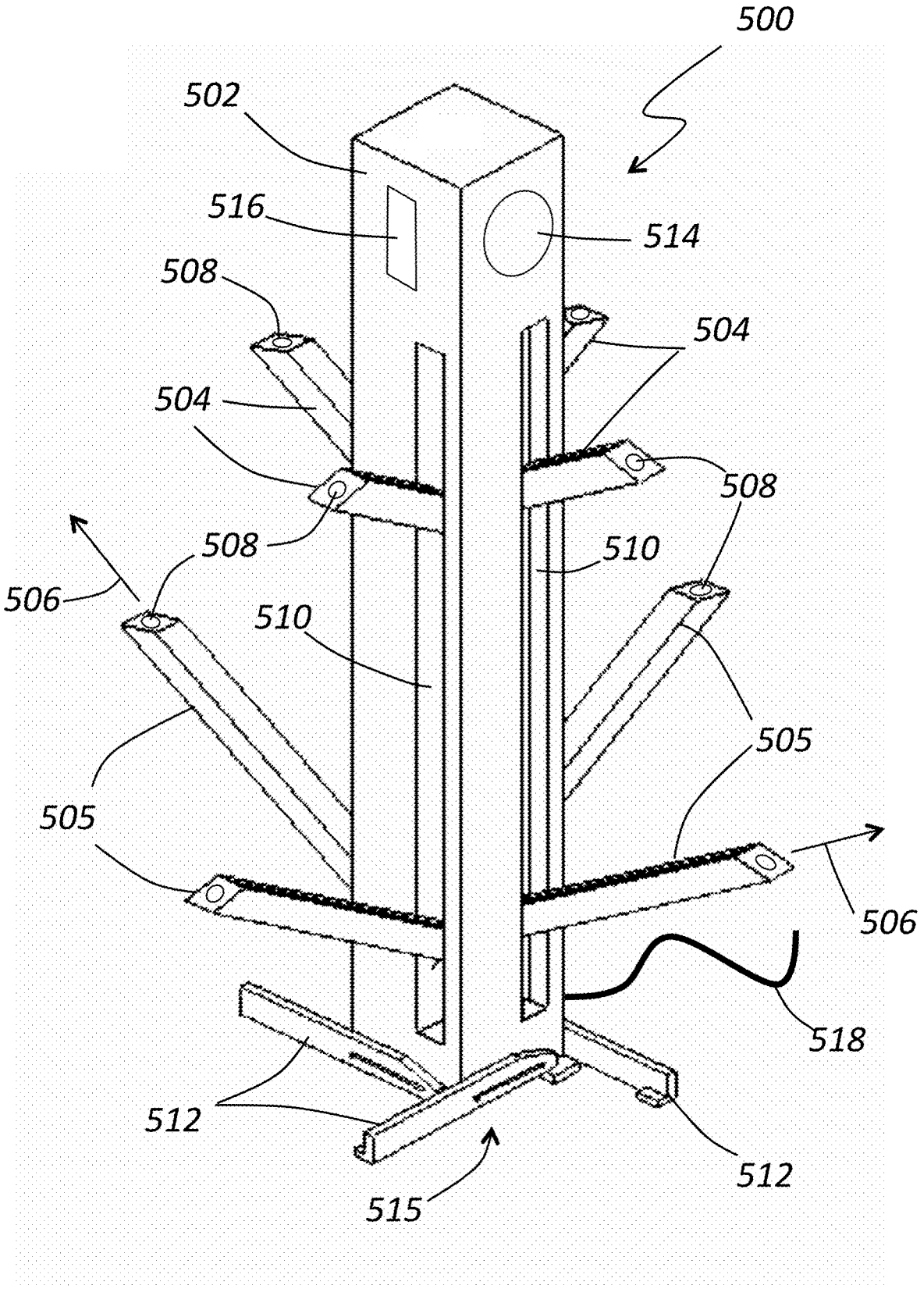
FIG. 46 is a perspective view of another apparel drying assembly according to another aspect of the invention with projections extended.
Figure 47:
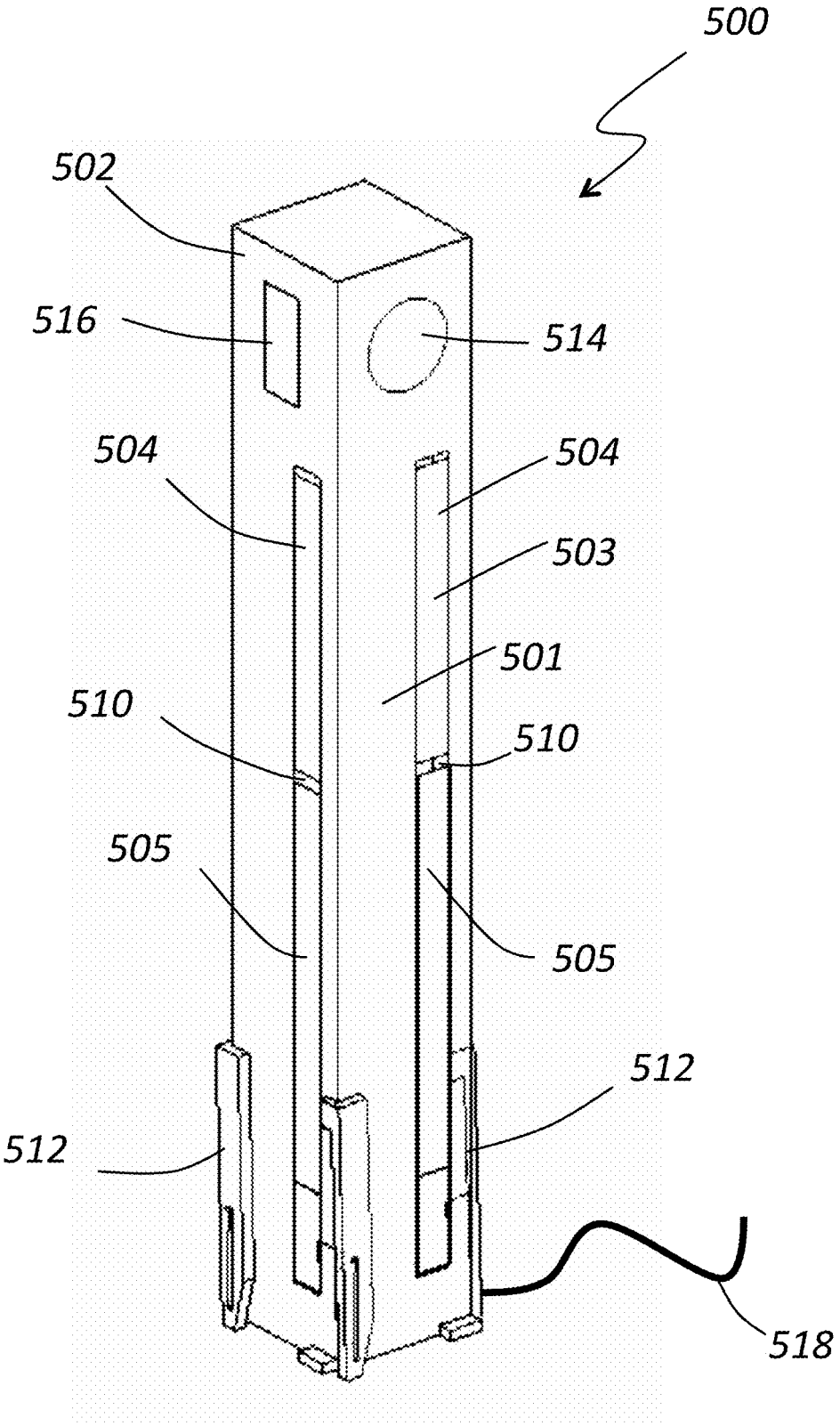
FIG. 47 is a perspective view of the apparel drying assembly shown in FIG. 46 with the projections retracted according to one aspect of the invention.
Figure 48:
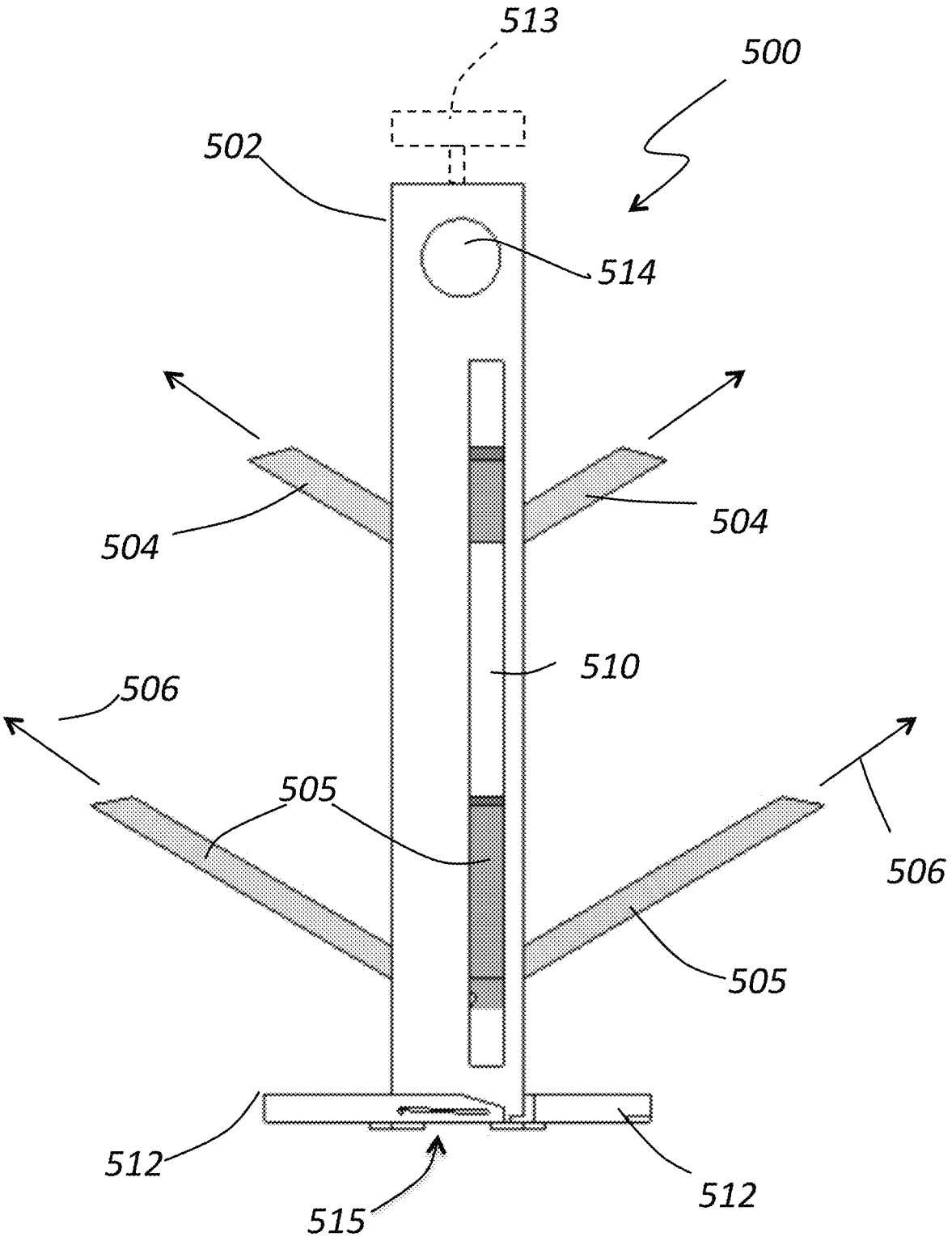
FIG. 48 is a front elevation view of the apparel drying assembly shown in FIG. 46.
Figure 49:
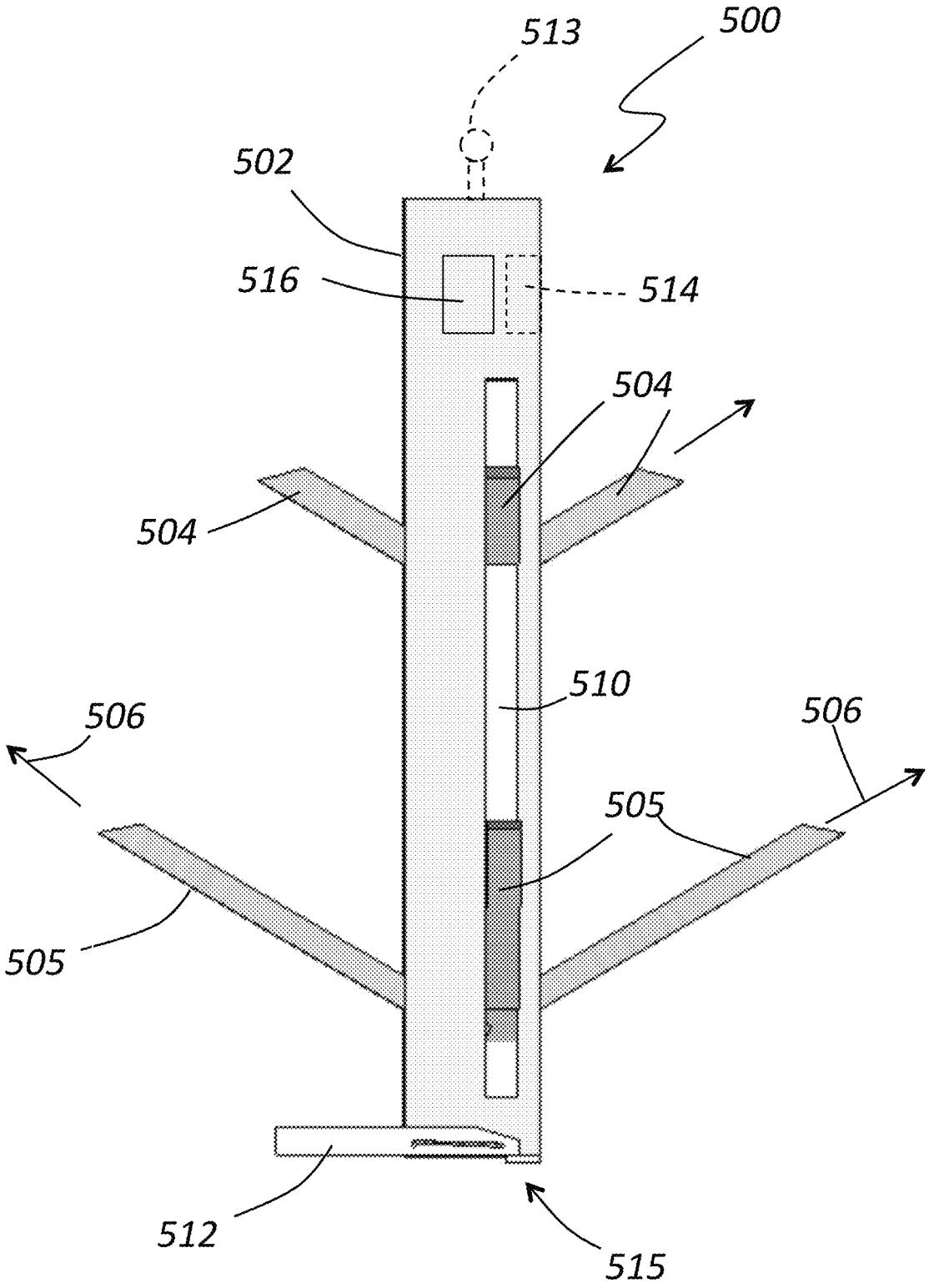
FIG. 49 is a right-side elevation view of the apparel drying assembly shown in FIG. 46.
Figure 50:
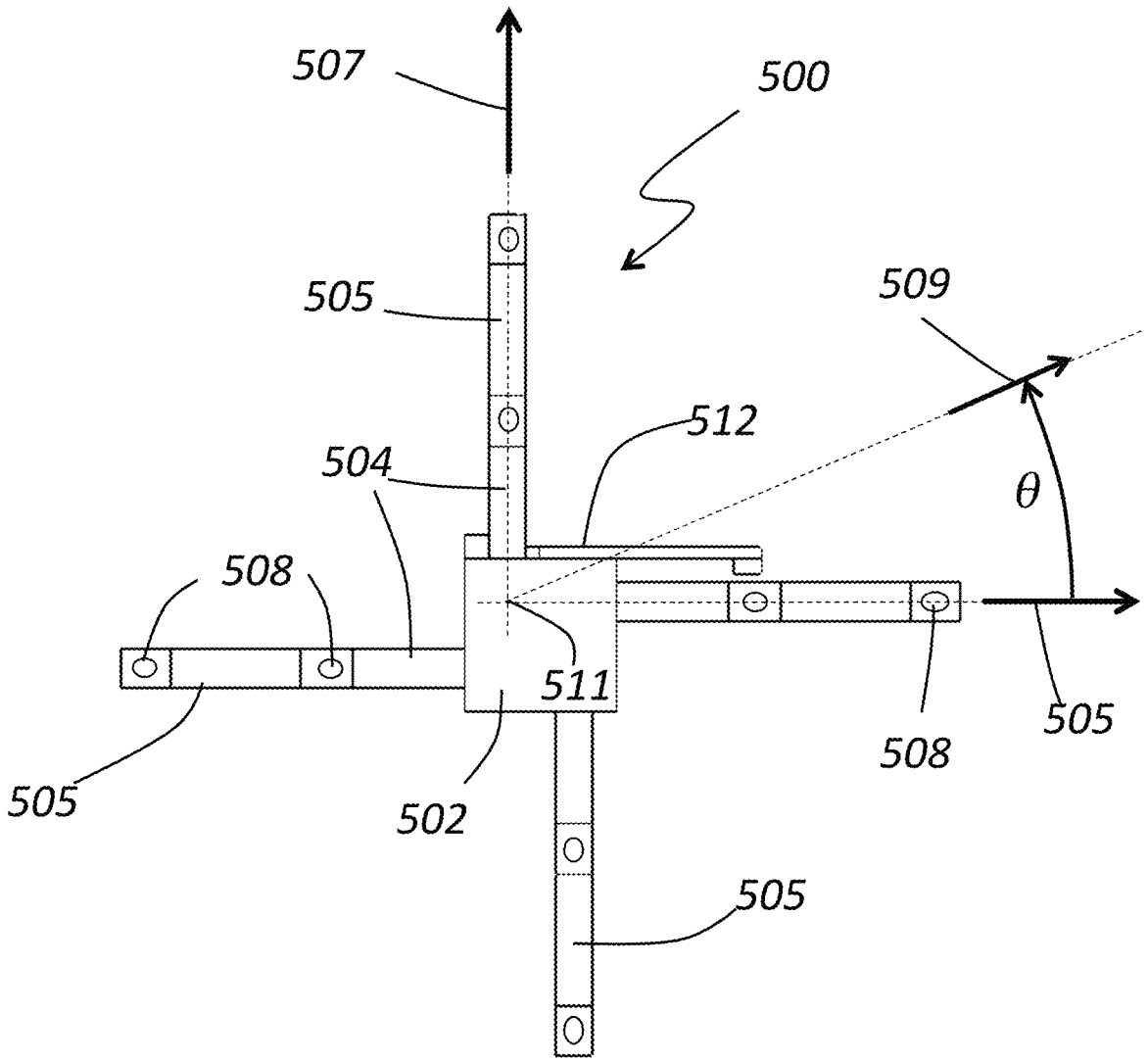
FIG. 50 is a top plan view of the apparel drying assembly shown in FIG. 46.

FIG. 46 is a perspective view of another apparel drying assembly 500 according to another aspect of the invention having a housing 502 with projections 504 and 505 extended. In a fashion similar to other aspects disclosed herein, projections 504 and 505 may typically be pivotally mounted to housing 502, for example, for retraction and/or concealment of projections 504 and 505 within housing 502. FIG. 47 is a perspective view of the apparel drying assembly 500 shown in FIG. 46 with the projections 504 and 505 retracted according to one aspect of the invention. FIG. 48 is a front elevation view of the apparel drying assembly 500 shown in FIG. 46. FIG. 49 is a right-side elevation view of the apparel drying assembly 500 shown in FIG. 46, the left-side elevation view being a mirror image thereof. FIG. 50 is a top plan view of the apparel drying assembly 500 shown in FIG. 46.

As shown in FIGS. 46 through 50, assembly 500 typically includes a housing 502 having an internal cavity (not shown) and having an arrangement of at least two projections 504, and 505, or "pegs," positioned and adapted to receive an article of clothing (not shown), for example, a shoe, a boot, a glove, a hat, a coat, a jacket, and the like, as disclosed herein. According to aspects of the invention, projections 504 and 505 are adapted to receive an article of clothing, and are also adapted to discharge a flow of air 506, for example, a heated flow of air, from the internal cavity in housing 502 to at least partially evaporate moisture from, for example, "to dry," an article of clothing while the article is mounted to a projections 504 and 505 of assembly 500. As disclosed herein, projections 504 and 505 typically include an inlet (not shown) operatively connected to the internal cavity of housing 502, one or more outlets 508, an internal passageway (not shown) providing fluid communication between the inlet to the one or more outlets 508.

As also shown in FIGS. 46 through 50, according to one aspect of the invention, housing 502 of assembly 500 includes one or more cavities or recesses 510 into which projections 504 and 505 may be adapted to retract into, for example, pivotally rotate into, in a fashion disclosed herein. Though in FIGS. 46 through 50 each surface or side of housing 502 includes two projections 504 and 505, it is envisioned that one or more projections 504 and 505 may be provided to a surface, sidewall, or side of housing 502, for example, three or more projections, four or more projections, five or more projections, or even 10 or more projections may be provided per surface, sidewall, or side of housing 502. In one aspect, at least one of projections 504 and 505 may have an extractable air distribution tube as shown in FIGS. 11 and 12.

In one aspect, housing 502 may be mounted to a base plate or footplate 515, see FIGS. 53 through 55 below. In one aspect, housing 502 may be mounted for rotation on base plate 515, for example, with a mechanical fastener. In one aspect housing 502, with projections 504 and 505, may be rotatable about a stationary base plate 515.

As also shown in FIGS. 46 through 50, assembly 500 may include a plurality of extensions or "legs" 512 adapted to support and/or mount housing 502, for example, to support housing 502 (and thus support assembly 500) in the vertically-oriented position shown in FIGS. 46 and 47. In one aspect, legs 512 may be retractable or foldable, for example, as shown in FIG. 47 where legs 512 are retracted, for example, against housing 502. In one aspect, the retraction of projections 504 and 505 and the retraction of legs 512 may reduce the envelope of assembly 500 in order to facilitate storage, handling, and/or transport of assembly 500, for example, during travel or commute. In one aspect, legs 512 may be mounted to base plate 515, for example, with mechanical fasteners.

Projections 504 and 505, and any projections having a similar function disclosed herein, may have a length ranging from about 3 inches to about 4 feet, but typically have a length of between about 6 inches and about 18 inches, for example, about 12.75 inches. Projections 504 and 505, and any projections having a similar function disclosed herein, may have a width or diameter ranging from about 0.25 inches to about 6 inches, but typically have a width or diameter between about 0.75 inches and about 2 inches, for example, about 1.125 inches in width or diameter. The internal cavities of projections 504 and 505, and of any projections having a similar function disclosed herein, may have an internal width or internal diameter ranging from about 0.125 inches to about 5 inches, but typically have a width or diameter between about 0.50 inches and about 2 inches, for example about 0.75 inches in width or diameter.

As shown in FIGS. 46 through 50, according to one aspect of the invention, projections 504 and 505 may be pivotally mounted to housing 502 wherein, when retracted into cavities 510 at least one, but typically all, of the projections 504 and 505 are substantially concealed within, or not projecting from, housing 502. For example, in one aspect, when retracted into cavities 510, a surface of projections 504 and 505, for example, an exposed surface 503 (see FIG. 47) of projections 504 and 505, is substantially coplanar with an external surface 501 of housing 502. This aspect of the invention is most clearly illustrated in FIG. 47, where substantially only one surface 503, for example, a lower surface, of projections 504 and 505 is visible when projections 504 and 505 are pivotally retracted.

As shown in FIGS. 46 through 50, assembly 500 typically includes a fan, blower, or other form of air handler 514 for drawing air or discharging air, for example, ambient air, into the internal cavity of housing 502 and into and through projections 504 and 505. In the aspect of the invention shown in FIGS. 46 through 50, air handler 514 may be positioned in the upper end or top of housing 502, for example, opposite legs 512; however, air handler 514 may be positioned as convenient within housing 502. In one aspect, air handler 514 may be positioned in the base or bottom of housing 502. In one aspect, the air handler 514 may be a fan or blower, for example, a 12-volt DC fan or blower. In one aspect, air handler 514 may be a model number 10025 centrifugal fan; a model number 12032 turbo blower; a model number 9733 turbo blower; or a model number 7530 blower turbine, for example, available from QIYU through AliExpress [https://www.aliexpress.com/store/], or their equivalent. In one aspect, one or more air handlers 514 may be positioned in or in fluid communication with housing 502.

In one aspect, housing 502 may also include a heating device 516 positioned and adapted to heat the air handled by air handler 514. In one aspect, heating device 516 may be positioned adjacent air handler 514, as shown in FIGS. 46 through 50, for example, positioned in the upper end or top of housing 502, for example, opposite legs 512. However, in other aspects, heating device 516 may be positioned as convenient within housing 502. In one aspect, heating device 516 may be positioned in the base or bottom of housing 502. In one aspect, the heating device 516 may an AC or a DC heating device, for example, a Surface Insulated 110V, 100 W, Ceramic Thermostatic, Positive Temperature Coefficient (PTC) Heating Element available from Freshie Wind Store through AliExpress [https://www.aliexpress.com/store/], or its equivalent. In one aspect, one or more heating devices 516 may be positioned in or in fluid communication with housing 502.

In one aspect, air handler 514 and/or heating device 516 may be powered by conventional means, including batteries, photovoltaic cells, and power from the local electric grid. For example, in one aspect, assembly 500 may include a power cord 518 adapted to provide power from a local source, for example, a wall outlet or generator.

As shown in FIG. 50, in one aspect, one or more projections 504 and 505 may be oriented in a first direction 505, and one or more projections 504 and 505 may be oriented in a second direction 507, different from the first direction 505. As shown in FIG. 50, the orientation of second direction 507 and the orientation of first direction 505 may be different by an angle θ ("theta") degrees, for example, an angle θ of about 90 degrees. In other aspects of the invention, one or more projections 504 and 505 may be oriented in a second direction 509 different from the first direction 505 by an angle θ between 0 degrees and 180 degrees. In other aspects of the invention, one or more projections 504 and 505 may be oriented in a second direction 509 different from the first direction 505 by an angle θ of at least 5 degrees, or at least 15 degrees, or at least 30 degrees, or at least 45 degrees, or at least 60 degrees. In one aspect, the angle θ may be directed in a circumferential direction, for example, about a line 511 directed along the direction of elongation of housing 502. In another aspect, the angle θ may be directed in a circumferential direction about vertical line 511 defined by the intersection of the first direction 505 of one or more projections 504 and 505 and the second direction 507 or 509 of one or more other projections 504 and 505.

In one aspect, at least one of the directions 505, 507, and 509 may be substantially perpendicular to an external surface of housing 502. Though the perpendicular orientation of directions 505, 507, and 509 may be apparent in the aspect of the invention having a housing 502 with planar external surfaces shown in FIG. 50, in other aspects, where the shape of the external surfaces of housing 502 may be non-planar, for example, circular or elliptical, the orientations of directions 505, 507, and 509 may also be substantially perpendicular to the non-planar surface(s) of housing 502.

In contrast to other aspects of the invention disclosed herein, apparel drying assembly 500 shown in FIGS. 46 through 50 comprises a compact design that, for example, may facilitate handling, transport, and/or storage of an apparel drying assembly. For example, in one aspect, assembly 500 may be portable, for example, transportable with little or no effort. In one aspect of the invention, assembly 500 may include a handle or strap 513 (shown in phantom in FIGS. 48 and 49) which may facilitate carrying, handling, and/or transport.

Figure 51:
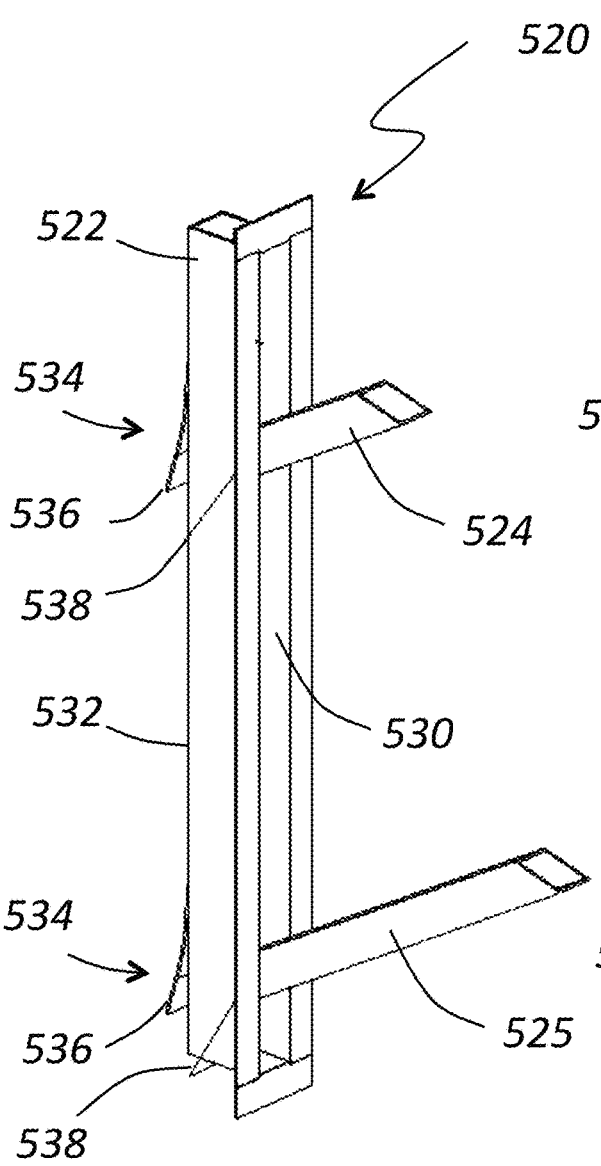
FIG. 51 is a front perspective view of a sub-assembly or module that may be mounted to or comprise a component of the assembly shown in FIGS. 46 through 50 according to one aspect of the invention.
Figure 52:
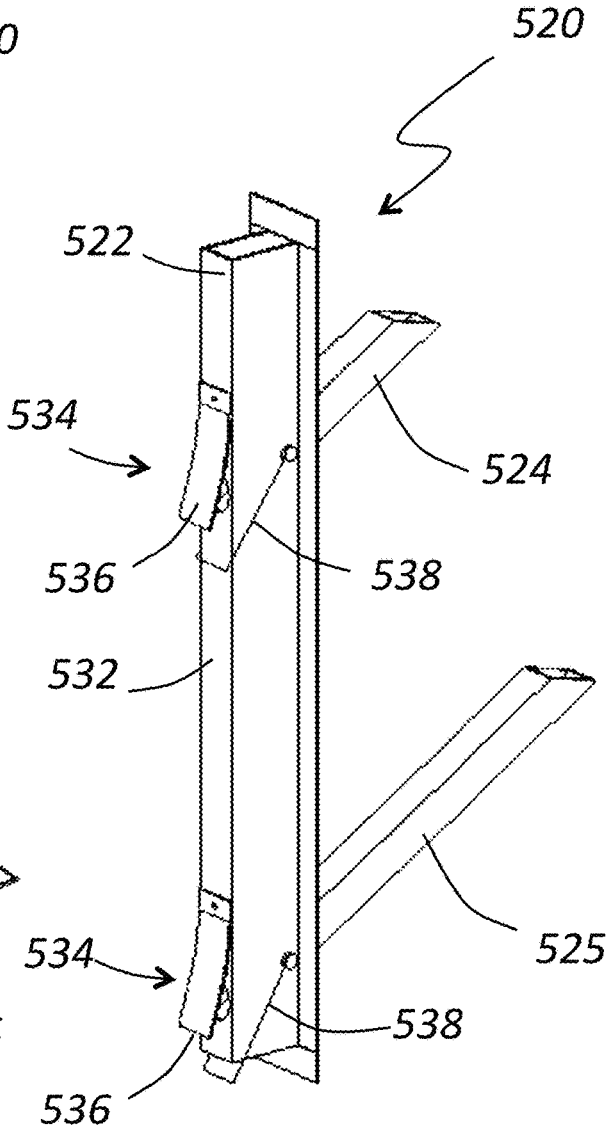
FIG. 52 is a rear perspective view of sub-assembly or module shown in FIG. 51.

FIG. 51 is a front perspective view of one sub-assembly or module 520 that may be mounted to or comprise a component of housing 502 shown in FIGS. 46 through 50 to provide one aspect of the invention. FIG. 52 is a rear perspective view of sub-assembly 520 shown in FIG. 51. Sub-assembly or module 520 may be similar in design and construction to sub-assembly or module 230 and its components shown in and described with respect to FIGS. 30 through 40 above.

According to aspects of the invention, sub-assembly 520 includes a housing 522 and at least one, but typically two, projections 524 and 525 mounted in housing 502 and adapted to receive and transmit pressurized air. According to the aspects of the invention shown in FIGS. 46 through 52, projections 504, 505, 524, and 525, may comprise any elongated member having an inlet, an internal passage, and an outlet 508, for example, hollow wooden pegs, metal conduit, or plastic tubing among others, for example, any one of the projections disclosed herein. In the aspect of the invention shown in FIGS. 51 and 52, projections 524 and 525 are shown as hollow metal conduit, for example, rectangular aluminum conduit similar to projection 232 shown in FIGS. 30 through 33 or projection 280 shown in FIGS. 34 through 36.

Though in FIGS. 51 and 52 sub-assembly or module 520 includes two projections 524 and 525, it is envisioned that one or more projections 524, 525 may be provided to sub-assembly or module 520, for example, three or more projections, four or more projections, five or more projections, or even 10 or more projections may be provided for sub-assembly or module 520.

As shown in FIGS. 51 and 52, housing 522 may be similar in design and construction to housing 300 shown in and described with respect to FIGS. 39 through 41. As also shown in FIGS. 51 and 52, housing 522 includes a cavity or recess 530 into which projections 524 and 525 may pivotally retract, and a rear wall 532 having valve mechanism 534. Valve mechanism 534 may be substantially identical to the valve mechanism shown in FIGS. 19 through 33 above. For example, as shown in FIGS. 51 and 52, the valve mechanism 534 may include a valve element, or flapper, 536 similar to valve element 210 and/or seat plate 200 shown in FIGS. 26 and 27, and a biasing spring 538 similar to spring wire assembly 220 shown in FIGS. 28 and 29 above. Though not shown in FIGS. 51 and 52, projections 524 and 525 may include the projection, bar, or pin 242 shown in FIGS. 33 through 38 on projections 524 and 525 to enhance engagement with valve mechanism 534 and an air flow diffusing element similar to element 243 shown and described with respect to FIG. 30 above.

According to aspects of the invention, one or more sub-assemblies or modules 520 may be mounted or arranged to provide the apparel drying assembly 500 shown in FIGS. 46 through 50. For example, in one aspect, one or more modules 502 may be mounted to a housing, frame, or support structure adapted to provide a flow of pressurized air wherein pressurized air is emitted from the outlets of projections 524 and 525 to dry, for example, a pair of gloves mouthed on projections 524 and 525. The mounting or assembly may be provided by mechanical fasteners or welding. In another aspect, two or more modules 520 may be assembled, for example, with mechanical fasteners or welding, to provide at least a portion of an apparel draying assembly. In another aspect, one or modules 520 may be mounted to a surface, for example, to a panel or to a wall, and be provided with a flow of pressurized air wherein pressurized air is emitted from the outlets of projections 524 and 525.

It is envisioned that one or more sub-assemblies or modules 520 shown in FIGS. 51 and 52 may be implemented in any and all apparel drying assemblies disclosed therein. For example, one or more sub-assemblies or modules 520 shown in FIGS. 51 and 52 may be used in the apparel drying assembly 10 shown in FIGS. 1 and 2; in the apparel drying assembly 320 shown in FIGS. 42 and 43; in the apparel drying assembly 420 shown in FIGS. 44 and 45; and in apparel drying assembly 500 shown in FIGS. 46 through 50.

Figure 55:
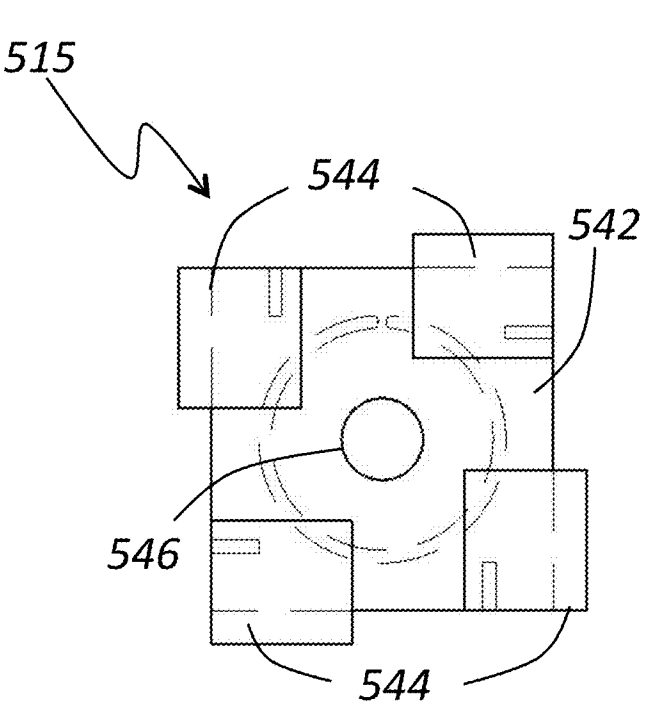
Figure 54:
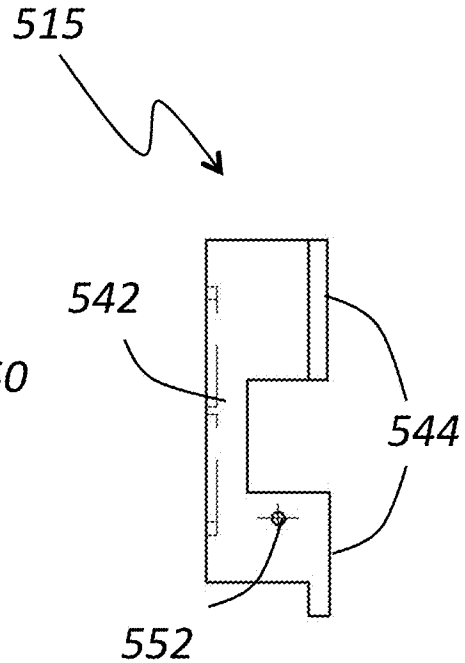
Figure 53:
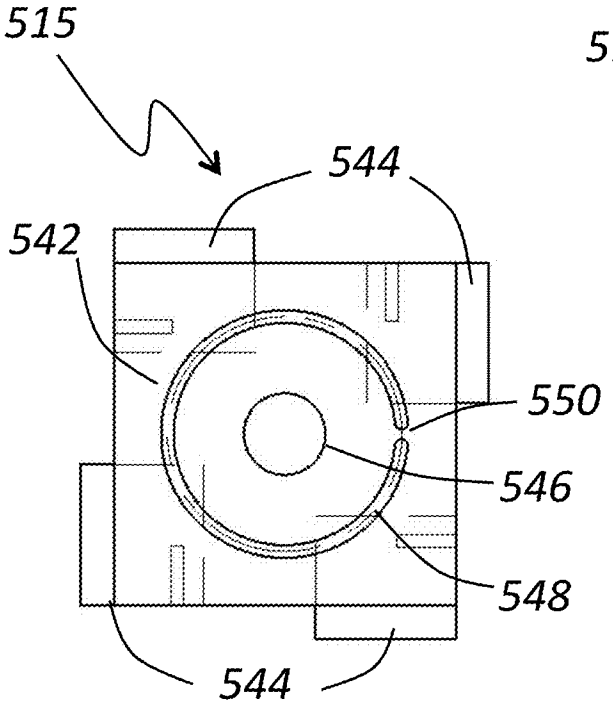

FIGS. 53, 54, and 55 are a top plan view, a side elevation view, and a bottom view, respectively, of base plate 515 of apparel drying assembly 500 shown in FIGS. 46 and 47. According to aspects of the invention, base plate 515 is adapted to receive and support housing 502 of assembly 500. In one aspect, base plate 515 may be adapted to engage support legs 512 of assembly 500. In one aspect, base plate 515 my further be adapted to receive and support housing 502 while permitting housing 502 to rotate about base plate 515, for example, to vary the orientation of projections 504 and 505 of assembly 502.

As shown FIGS. 53, 54, and 55, base plate 515 may comprise a top plate 542 and a plurality of bottom plates 544. As shown in FIGS. 53 and 55, top plate 542 may include a central hole or through hole 546 adapted to receive a fastener (not shown) adapted to mount housing 502 of assembly 500, for example, a fastener allowing housing 502 to rotatably mount to top plate 542. In one aspect, housing 502 may be mounted to top plate 542 by a threaded fastener positioned in through hole 546 and in a corresponding hole in the bottom of housing 502, one or two threaded nuts, and one or more washers, as known in the art.

As also shown in FIGS. 53 and 55, in one aspect, top plate 542, may include an annular recess or groove 548 adapted to engage one or more projections from housing 502. For example, in one aspect, a projection, for example, a pin, from the bottom of housing 502 may engage annular recess 548 in top plate 542 and annular recess 548 may guide and/or limit the rotation of housing 502 about base plate 515. In one aspect, annular recess 548 may include ends 550 that limit the movement of the projection in housing 503 and thus limit the rotation of housing 502. Base plate 515 of apparel drying assembly 500 may include a plurality of holes 552, for example, threaded holes, positioned and adapted to receive fasteners to mount legs 512, for example, rotatably mount legs 512.

As shown FIGS. 53, 54, and 55, top plate 544 may be a rectangular, 1¼ inch thick, 4½ inch×4½ inch plate and base plate 515 may include four bottom plates 544, for example, rectangular, ¼-inch plate thick, 1½ inch×1¼ inch plates. Top plate 542 and bottom plates 544 may be made from any one or more of the materials disclosed herein, for example, from a metal, such as, steel or aluminum, or a plastic, such as, PVC. Bottom plates 544 may be positioned and sized to support top plate 542 and housing 502.

Figure 56:
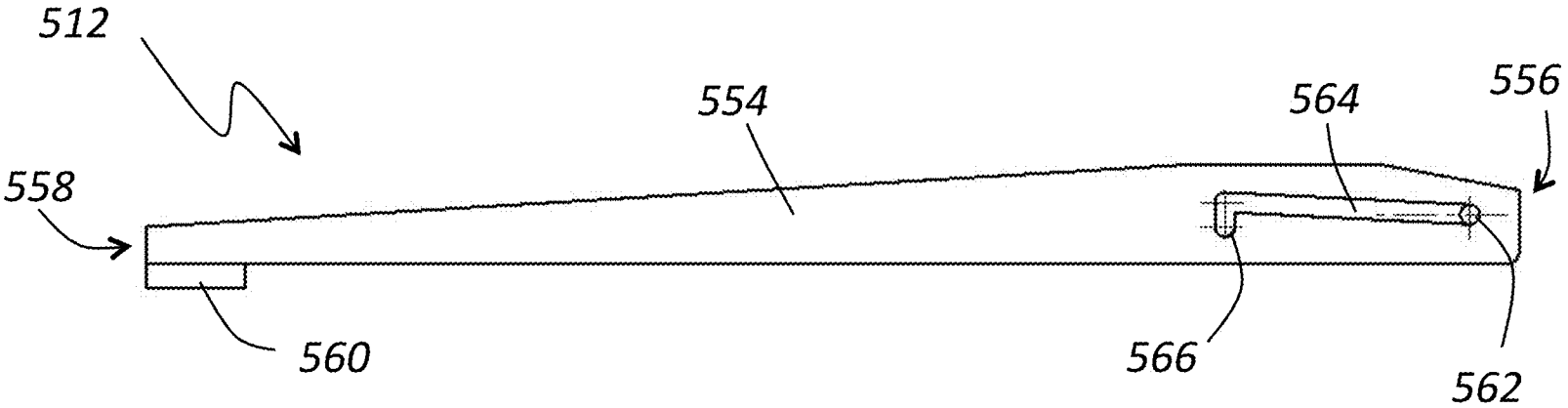
FIGS. 56 and 57 are a side elevation view and a top plan view, respectively, of the support leg of the apparel drying assembly shown in FIGS. 46 through 50.
Figure 57:
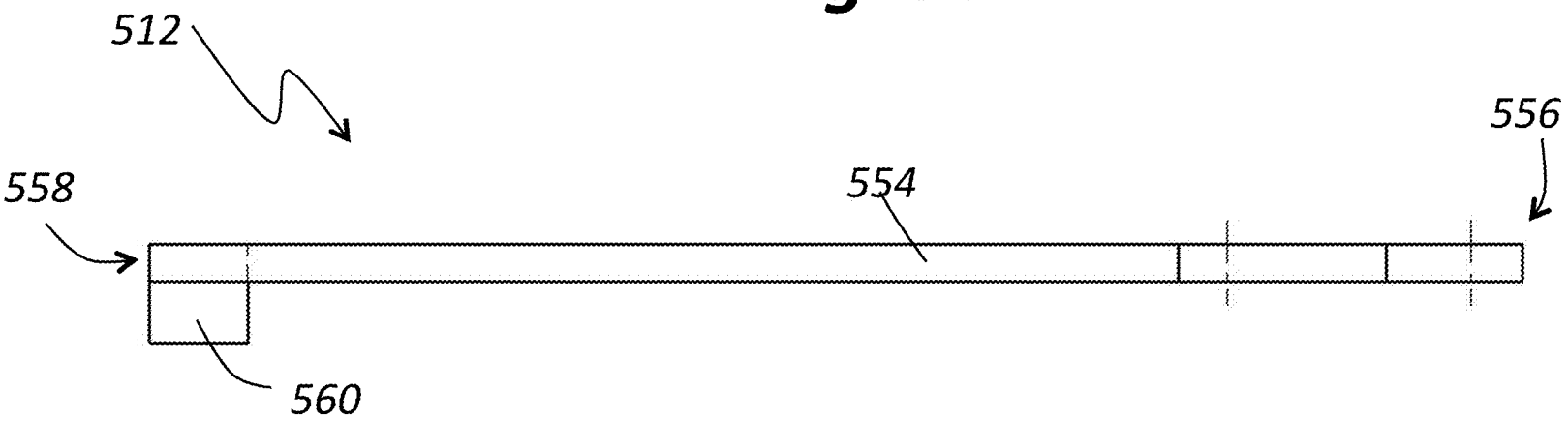

FIGS. 56 and 57 are a side elevation view and a top plan view, respectively, of a support leg 512 of apparel drying assembly 500 shown in FIGS. 46 and 47. As shown in FIGS. 46 and 47, support leg 512 may be mounted, for example, rotatably mounted, to housing 502 or to base plate 515. As shown in FIG. 47, legs 512 may rotate or retract to facilitate handling and storage of aspects of the invention.

As shown in FIGS. 56 and 57, support legs 512 may comprise an elongated cylindrical member 554 having a first, or proximal end, 556 adapted to mount to housing 502 or to base plate 515, and a second, or distal end, 558, having a footplate 560. Elongated cylindrical member 554 may be rectangular in cross section, but any shaped cylindrical member may be provided. As shown, in one aspect, the dimensions of member 554 may vary from first end 556 to second end 558, for example, having a height that tapers from a larger height near first end 556 to a smaller height at second end 558. In one aspect, proximal end 556 of legs 512 may rotatably mount via a hole 552 of legs 512, for example, via a mechanical fastener, such as, a bold or screw, positioned in a through hole 562 in first end 556. As shown, footplate 560 may be rectangular in one aspect, buy may comprise any appropriate shape, such as, circular or elliptical, and provide the desired support and/or stability.

In one aspect, first end 556 of leg 512 may include an elongated slot 564 and a recess 566 adapted to vary the positioning of legs 512 on housing 502 or on base plate 515. For example, as shown in FIGS. 46, 47, and 48, legs 512 may be rotatably mounted to a pin or pivot in housing 502 to hole 562 in leg 512, as shown in the retracted position of FIG. 47, and, when extended as shown in FIGS. 46 and 48, legs 512 may be rotatably mounted to the pin or pivot in housing 502 to recess 566 in leg 512. According to this aspect of the invention, legs 512 may be rotatably mounted to holes 562 wherein legs 512 may be compactly retracted against housing 502 to facilitate handling and storage, while legs 512 may also be rotatably mounted to recesses 566 wherein legs 512 may also effectively support housing 502, for example, when in use.

The size of housing 502 of dryer assembly 500 shown in FIGS. 46 thought 50 may vary depending upon the desired installation and, for example, the number of projections 504 and 505 desired. In one aspect, housing 502 or drying assembly 500 may have a height ranging from about 6 inches to about 20 feet, but is typicality between about 2 feet and about 4 feet in height, for example, about 3 feet in height. In one aspect, the width of housing 502 of dryer assembly 500 may range from about 1 inch to about 3 feet, but is typicality between about 2 inches and about 6 inches in width, for example, about 3 inches in width. Housing 502 may be square cylindrical in shape, as shown in FIGS. 46 through 50, but may be any convenient cylindrical shape, including circular cylindrical, rectangular cylindrical, polygonal cylindrical, and elliptical cylindrical.

According to aspects of the invention, dryer assembly 500 shown in FIGS. 46 though 50, and any of the components of assembly 500 disclosed herein, may be made from any one or more of the materials disclosed wherein, including a wood, a metal, and/or a plastic.

Figure 58:
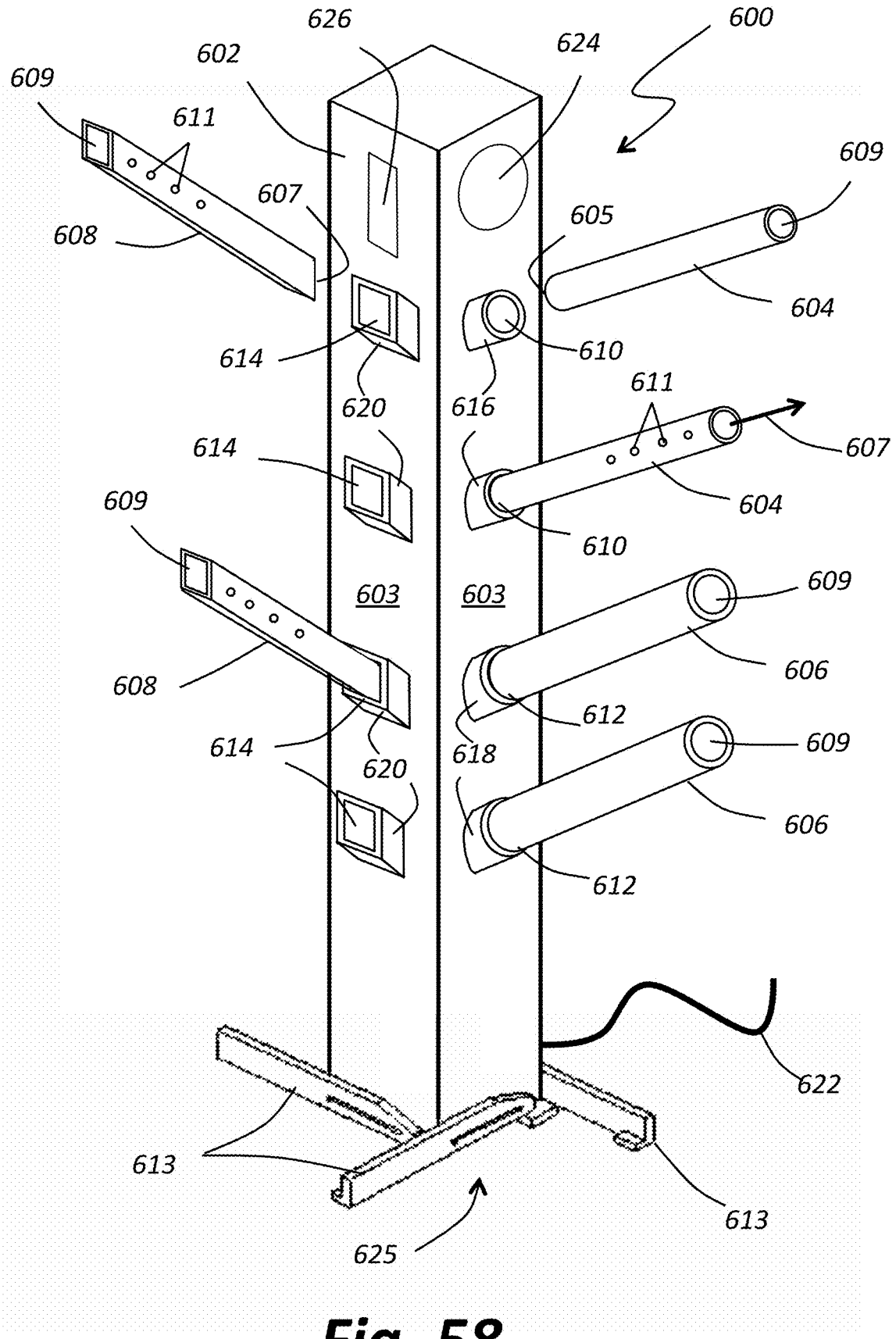
FIG. 58 is a perspective view, partially exploded, of another apparel drying assembly according to another aspect of the invention with projections extended.

FIG. 58 is a perspective view, partially exploded, of another apparel drying assembly 600 according to another aspect of the invention. As shown, apparel drying assembly 600 includes a housing 602 having projections 604, 606, and 608 extending from housing 602. In contrast to other aspects of the invention disclosed wherein, projections 604, 606, and 608 my typically not be pivotally mounted to housing 602, but may be received by housing 602 by appropriately located, oriented, and/or sized recesses, holes, or cavities, 610, 612, and 614, respectively, in housing 602.

Though in one aspect of the invention, recesses, holes, or cavities, 610, 612, and 614 may be cavities or through holes adapted to receive projections 604, 606, and 608 in housing 602, for example, a cavity or through hole in a side wall 603 of housing 602, in the aspect of the invention shown in FIG. 58, recesses, holes, or cavities, 610, 612, and 614 may comprise recesses, holes, or cavities in a reinforcing ring, coupling, or fitting 616, 618, and 620, respectively, mounted in housing 602 and adapted to receive projections 604, 606, and 608. For example, in one aspect, reinforcing rings, couplings, or fittings 616, 618, and 620 having recesses, holes, or cavities, 610, 612, and 614, respectively, may be mounted in a sidewall 603 of housing 602. In the following discussion, though recesses, holes, or cavities, 610, 612, and 614 may comprise many shapes and sizes, for the sake of brevity, these structures and any related structures will be referred to as "holes" 610, 612, and 614; and, though reinforcing rings, couplings, or fittings 616, 618, and 620 may also comprise many structures, shapes, and sizes, for the sake of brevity, these structures and any related structures will be referred to as "fittings" 616, 618, and 620.

As shown in FIG. 58, assembly 600 typically includes a housing 602 having an internal cavity (not shown) and having an arrangement of at least two projections 604, 606, or 608, or "pegs," positioned and adapted to receive an article of clothing (not shown), for example, a shoe, a boot, a glove, a hat, a coat, a jacket, and the like, as disclosed herein. According to aspects of the invention, projections 604, 606, and 608 are adapted to receive an article of clothing, and are also adapted to discharge a flow of air 607, for example, a heated flow of air from the internal cavity in housing 602 to at least partially evaporate moisture from, for example, "to dry," an article of clothing while the article is mounted to a projection 604, 606, or 608 of assembly 600. As disclosed herein, projections 604, 606, and 608 typically include an inlet 605 and 607 in fluid communication with the internal cavity of housing 602, one or more outlets 609, an internal passageway (not shown) providing fluid communication between the inlet 605 or 607 to the one or more outlets 609. In one aspect, in addition to outlet 609, or a distal outlet, projections 604, 606, and/or 608 may include one or more lateral outlets 611, for example, outlets or holes evenly spaced along the length of projections 604, 606, and/or 608, and/or evenly spaced about the perimeter or surface of projections 604, 606, and/or 608.

Projections 604, 606, and 608 may have the dimension of any of the other projections disclosed herein. For example, projections 604, 606, and 608 may have a length ranging from about 3 inches to about 4 feet, but typically has a length of between about 6 inches and about 18 inches; may have a width or outer diameter ranging from about 0.25 inches to about 6 inches, but typically has a width or diameter between about 0.75 inches and about 2 inches; and may have internal cavities having an internal width or internal diameter ranging from about 0.125 inches to about 5 inches, but typically has a width or diameter between about 0.50 inches and about 2 inches.

Though in FIG. 58 each surface or side of housing 602 includes four projections 604, 606, and 608, it is envisioned that one or more projections 604, 606, or 608 may be provided to a surface or sidewall 603 of housing 602, for example, three or more projections, four or more projections, five or more projections, or even 10 or more projections may be provided per surface or sidewall 603 of housing 602. In one aspect, projections 604, 606, and/or 608 may have an extractable air distribution tube as shown in FIGS. 11 and 12.

As also shown in FIG. 58, projections 604, 606, and 608 may vary in size and shape. For example, as shown, projections 604, 606, and 608 may be circular cylindrical having a circular cross section, as indicted by projections 604 and 606 in FIG. 58. Accordingly, holes 610, 612, and 614 in fittings 616, 618, and 620 may be circular in cross section to receive circular cylindrical projections 604, 606, and 608.

In another aspect, as shown, projections 604, 606, and 608 may be rectangular or square cylindrical having a square or rectangular cross section, as indicted by projection 608 in FIG. 58. Accordingly, holes 610, 612, and 614 in fittings 616, 618, and 620 may be square or rectangular in cross section to receive square or rectangular cylindrical projections 604, 606, and 608.

It is also envisioned that projections 604, 606, and 608 may be elliptical cylindrical having an elliptical cross section or polygonal cylindrical having a polygonal cross section. Accordingly, holes 610, 612, and 614 in fittings 616, 618, and 620 may be elliptical or polygonal in cross section to receive elliptical or polygonal cylindrical projections 604, 606, and 608.

Though in one aspect of the invention, projections 604, 606, and 608 may be similar in size and shape, for example, each comprising circular cylindrical projections or square cylindrical projections, in other aspects of the invention, projections 604, 606, and 608 may vary in size and shape, for example, some of projections 604, 606, and 608 may be elliptical cylindrical in shape while others may be polygonal cylindrical in shape. In addition, projections 604, 606, and 608 may vary in size, such as, vary in length and/or vary in outer dimension, such as, vary in outer diameter.

Housing 602 and projections 604, 606, and 608 may be fabricated from any one or more of the materials disclosed herein, for example, from a plastic, such as, PVC pipe; from a metal, such as, aluminum tubing; or from a wood, such as, oak.

In one aspect, housing 602 may be mounted to a base plate or footplate 615, for example, a base plate 615 similar to base plate 515 shown in FIGS. 53 through 55 above. In it is also envisioned that housing 602 may be mounted for rotation on base plate 615, for example, with a mechanical fastener. In one aspect housing 602, with projections 604, 606, and 608, may be rotatable about a stationary base plate 615.

As also shown in FIG. 58, assembly 600 may include a legs 613 adapted to support and/or mount housing 602, for example, to support housing 602 (and thus support assembly 500) in the vertically-oriented position shown in FIG. 58. Legs 613 may be similar in design and function as legs 512 shown in FIGS. 46, 47, 56, and 57. For example, legs 613 may be retractable or foldable, for example, as shown in FIG. 47, to reduce the envelope of assembly 600 in order to facilitate storage, handling, and/or transport of assembly 600, for example, during travel or commute.

As shown in FIG. 58, assembly 600 typically includes one or more fans, blowers, or other forms of air handler 624 for drawing air or discharging air, for example, ambient air, into the internal cavity of housing 602 and into and through projections 604, 606, and 608 as disclosed herein. In one aspect, housing 602 may also include a heating device 626 positioned and adapted to heat the air introduced by air handler 624, as disclosed herein. In one aspect, air handler 624 and/or heating device 626 may be powered by conventional means, including batteries, photovoltaic cells, and power from the local electric grid. For example, in one aspect, assembly 600 may include a power cord 622 adapted to provide power from a local source, for example, a wall outlet or generator.

Figure 59:
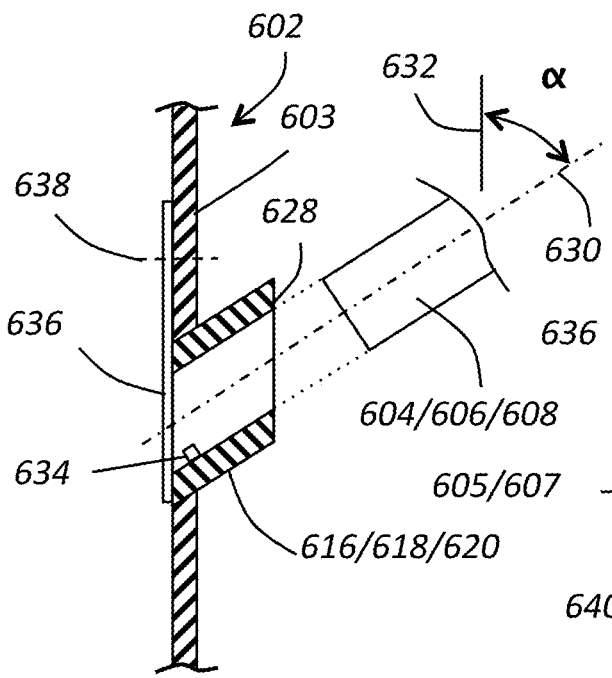
FIG. 59 is a side elevation view, partially in cross section, of an engagement of a projection with the housing shown in FIG. 58 prior to engagement according to one aspect of the invention.
Figure 60:
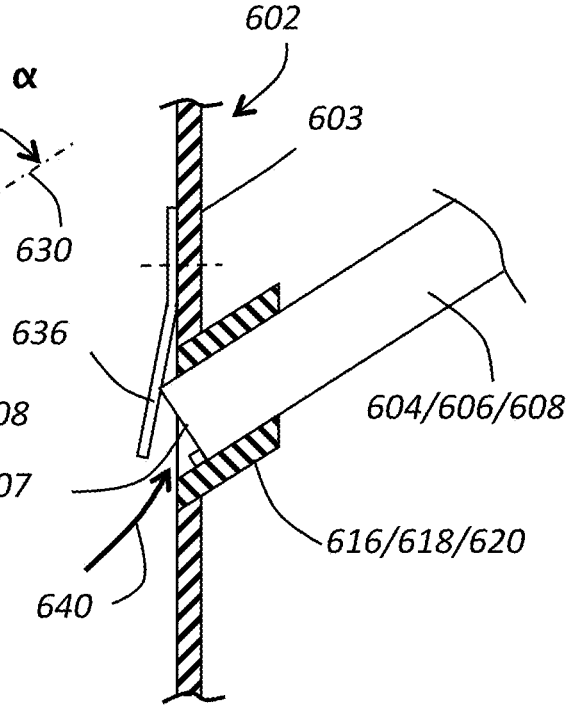
FIG. 60 is a side elevation view, partially in cross section, of an engagement of a projection with the housing shown in FIG. 58 after engagement according to one aspect of the invention.

FIG. 59 is a side elevation view, partially in cross section, of an engagement of projection 604, 606, or 608 with the housing 602 shown in FIG. 58 prior to engagement according to one aspect of the invention. FIG. 60 is a side elevation view, partially in cross section, of an engagement of a projection 604, 606, or 608 with the housing 602 shown in FIG. 58 after engagement according to one aspect of the invention. In FIG. 59, a cross section of a portion of a sidewall 603 of housing 602 is shown having a fitting 616, 618, or 620 positioned and adapted to receive a projection 604, 606, or 608. As shown in FIGS. 59 and 60, fitting 616, 618, or 620 may be a cylindrical body 628, for example, a circular cylindrical body or polygonal cylindrical body, mounted in sidewall 603 of housing 602. According to aspects of the invention cylindrical body 628 of fitting 616, 618, or 620 may be mounted to sidewall 603 by conventional means, for example, with an adhesive, with mechanical fasteners, or integrally molded into sidewall 603. As shown, in one aspect, the ends of cylindrical body 628 may defined planes substantially parallel to the surface of sidewall 603, though in other aspects, the ends of cylindrical body 628 may defined planes substantially non-parallel to the surface of sidewall 603

Figure 61:
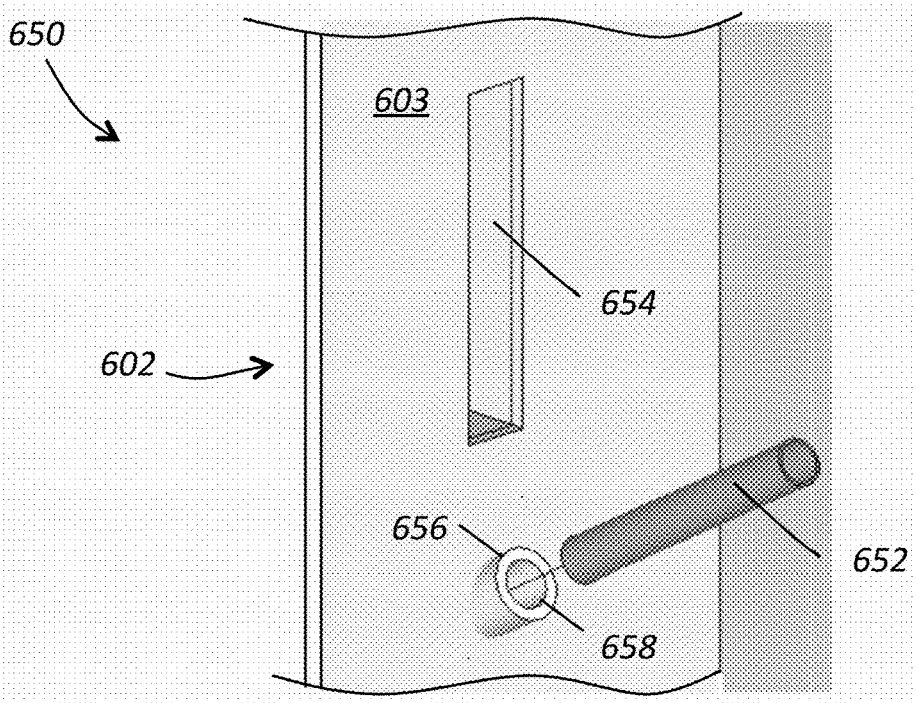
FIG. 61 is a perspective view, partially exploded, of an engagement of a projection with the housing shown in FIG. 58 having a projection storage cavity according to one aspect of the invention.

Cylindrical body 628 of fitting 616, 618, or 620 may have an axis of orientation 630 making an angle $\alpha$ ("alpha") with the direction of the axis of elongation 632 of housing 602. In one aspect, the direction of the axis of elongation 632 may be substantially parallel to the surface 603 of housing 602 and/or substantially parallel to a vertical plane defined by a plumb bob. According to aspects of the invention, the angle $\alpha$ may range from about 10 degrees to about 80 degrees, but is typically, ranges between about 40 degrees and about 50 degrees, for example, about 45 degrees. It will be understood that with the engagement of cylindrical projections 604, 606, or 608 with fitting 616, 618, or 620, as shown in FIG. 61, when mounted to housing 602, the orientation or direction of projections 604, 606, or 608 may be defined by angle $\alpha$.

In one aspect, the internal surface of cylindrical body 628 may be adapted to accommodate and/or retain cylindrical projections 604, 606, or 608. For example, in one aspect, the shape of the internal cross section of cylindrical body 628 may be sized and shaped to receive the external cross section of cylindrical projections 604, 606, or 608. In one aspect, the shape of the internal cross section of cylindrical body 628 may be tapered to receive and engage the external cross section of cylindrical projections 604, 606, or 608. In another aspect, the internal surface of cylindrical body 628 may be threaded and receive and engage an external threaded surface of the cylindrical projections 604, 606, or 608. In another aspect, the internal cross surface of cylindrical body 628 may include a projection 634 or step reduction in internal dimension (such as, a reduction in internal width or in internal diameter) to restrict or prevent the insertion of the cylindrical projections 604, 606, or 608 past the stop or step, as shown in FIG. 60. Other means for engaging cylindrical projections 604, 606, or 608 with fitting 616, 618, or 620 or limiting the insertion of cylindrical projections 604, 606, or 608 in to fitting 616, 618, or 620 will be apparent to those of skill in the art.

In one aspect of the invention, housing 602 includes a valve element 636 and the insertion of projections 604, 606, or 608 into fitting 616, 618, or 620 at least partially deflects the valve element 636, as shown in FIG. 60, to expose the inlet 605 or 607 of projections 604, 606, or 608. As disclosed herein, valve element 636 may be a flapper valve element similar or identical to flapper valve element 210 shown in FIG. 27. For example, valve element 636 may a deflectable baffle, flap, or reed valve mounted by one or more fasteners 638 to sidewall 603. As disclosed herein, this deflection of valve element 636 may allow any pressurized air within housing 602, for example, from air handler 624, to access and flow through inlet 605 and 607, as indicated by arrow 640, and through projections 604, 606, or 608 to dry apparel placed on projections 604, 606, or 608.

As shown in FIGS. 59 and 60, according to one aspect of the invention, the insertion of a projection 604, 606, or 608 into a fitting 616, 618, or 620 having a valve element 636 mounted nearby deflects the valve element 636 to allow pressurized air to pass through a projection 604, 606, or 608 to dry, for example, glove. However, without the insertion of a projection 604, 606, or 608 into a fitting 616, 618, or 620, the valve element 636 is not deflected, and little or no pressurized air is allowed to exit the internal cavity of housing 602. Accordingly, in one aspect, pressurized air is only discharged from housing 602 when a projection 604, 606, or 608 is inserted into a fitting 616, 618, or 620 mounted to housing 602.

It is envisioned that the valve element deflection shown in FIGS. 59 and 60 is not limited to assembly 600 shown in FIG. 58, but may be implemented in any and all apparel drying assemblies disclosed therein. For example, the insertion of a projection 604, 606, or 608 into a fitting 616, 618, or 620 to deflect a valve element 636 may be practiced in the apparel drying assembly 10 shown in FIGS. 1 and 2; in the apparel drying assembly 320 shown in FIGS. 42 and 43; in the apparel drying assembly 420 shown in FIGS. 44 and 45; and in apparel drying assembly 500 shown in FIGS. 46 through 50.

The size of housing 602 of dryer assembly 600 shown in FIGS. 58 through 60 may be similar to the size of housing 502 of dryer assembly 500 shown in FIGS. 46 through 50. For example, housing 602 or drying assembly 600 may have a height ranging from about 6 inches to about 20 feet, but is typicality between about 2 feet and about 4 feet in height, for example, about 3 feet in height. Housing 602 may be square cylindrical in shape, as shown in FIGS. 58 through 60, but may be any convenient cylindrical shape, including circular cylindrical, rectangular cylindrical, polygonal cylindrical, and elliptical cylindrical.

Figure 62:
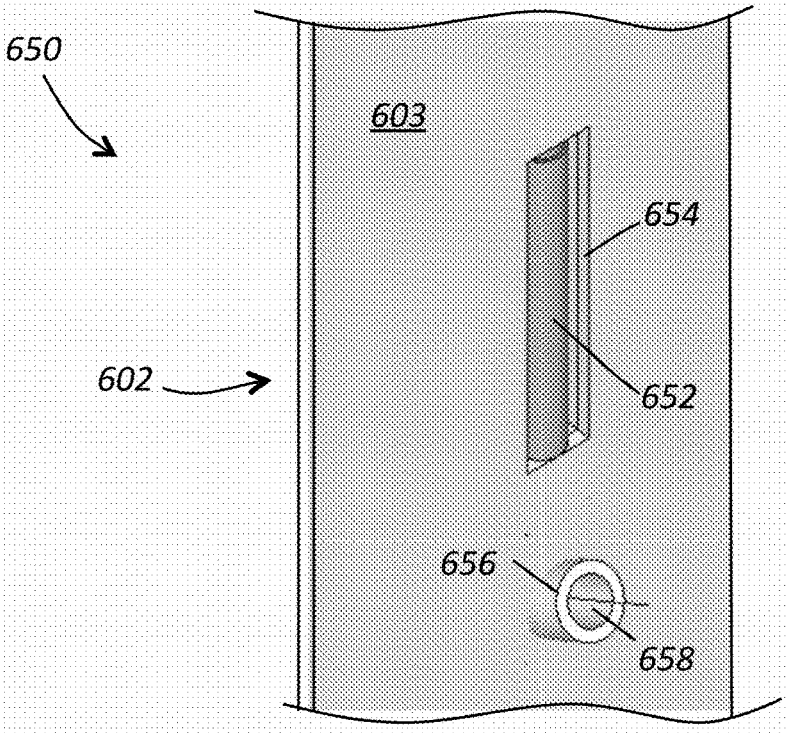
FIG. 62 is a perspective view, partially exploded, similar to FIG. 62 of an engagement of a projection with the housing shown in FIG. 58 having a projection storage cavity holding a projection according to one aspect of the invention.

FIG. 61 is a perspective view, partially exploded, of a mounting arrangement 650 for a projection 652 with housing 602 shown in FIG. 58. As shown, housing 602 includes a projection storage cavity 654 according to one aspect of the invention. FIG. 62 is a perspective view, partially exploded, similar to FIG. 61 of mounting arrangement 650 for the projection 652 with housing 602. In FIG. 62, the projection 652 is positioned in the projection storage cavity 654 according to one aspect of the invention.

As shown in FIGS. 61 and 62, housing 602 includes a fitting 656 positioned and adapted to receive projection 652. According to this aspect, projection 652 may have one or more of the features of projections 604, 606, or 608 disclosed herein. For example, projection 652 may comprise a circular cylindrical tube. Fitting 656 may have one or more of the features of fittings 616, 618, or 620 disclosed herein. For example, fitting 656 may have an opening 658 sized to receive projection 652. In this aspect of the invention, housing 602 includes at least one cavity or recess 654 sized to receive one or more projections 652.

As shown in FIGS. 61 and 62, prior to or after inserting projection 652 into fitting 656, projection 652 may be placed in to cavity 654, for example, for storage during transport or handling. Though a single projection 652, a single fitting 656 and a single cavity 654 are shown in FIGS. 61 and 62, according to aspects of the invention, a plurality of projections 652, a plurality of fittings 656 and a plurality of cavities may be provided, for example, on or in one or more sidewalls 603 of housing 602. In addition, though in the aspect of the invention shown in FIGS. 61 and 62, cavity 654 is shown positioned above fitting 656, according to aspects of the invention, cavity 654 may be located in any location in housing 602, for example, to one or more sides of fitting 656, below fitting 656, and/or within housing 602, such as, in a cavity accessed from the top or the bottom of housing 602, among other positions.

Though not shown in FIGS. 61 and 62, in one aspect, cavity 654 may be adapted to not only receive one or more projections 652, but cavity 654 may be adapted to retain one or more projections 652, for example, retain one or more projections 652 to minimize or prevent dislodgement from cavity 654. For example, in one aspect, cavity 654 may be sized to snugly receive one or more projections 652, for example, where friction between a wall of cavity 654 and a surface of projection 652 to minimize or prevent dislodgement. In another aspect, cavity 654 may include a retaining device or mechanism, for example, one or more retaining clips or retaining straps, such as, a hook and loop type retaining strap (for example, a strap with a Velcro-type fastener or its equivalent) that minimizes or prevents dislodgement. In another aspect, cavity 654 may include a cover, for example, a removable or hinged cover or door adapted to retain one or more projections 652 within cavity 654, for example, during transport or handling.

It is envisioned that the mounting arrangement 650 shown in FIGS. 61 and 62 is not limited to assembly boo shown in FIG. 58, but may be implemented in any and all apparel drying assemblies disclosed therein. For example, the mounting arrangement 650 shown in FIGS. 61 and 62 may be utilized in the apparel drying assembly 10 shown in FIGS. 1 and 2; in the apparel drying assembly 320 shown in FIGS. 42 and 43; in the apparel drying assembly 420 shown in FIGS. 44 and 45; and in apparel drying assembly 500 shown in FIGS. 46 through 50.

Figure 63:
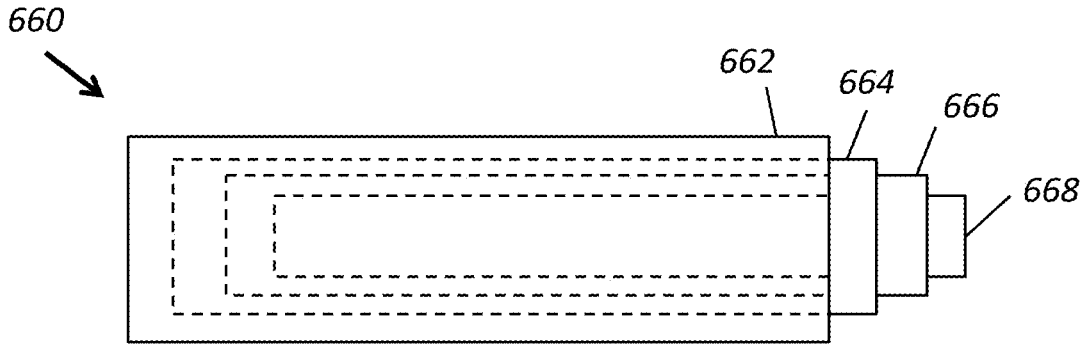
FIG. 63 is a side elevation view of a nested assembly of a plurality of projections according to an aspect of the invention.

FIG. 63 is a side elevation view of a nested assembly 660 of a plurality of projections 662, 664, 666, and 668 according to an aspect of the invention. As shown in FIG. 63, in this aspect, projections 662, 664, 666, and 668 are progressively larger in size, for example, larger in outer width or diameter, wherein the projections may be at least partially received inside a larger projection. As shown in FIG. 63, projection 668 may fit into projection 666, which may fit into projection 664, which may fit into projection 662. Projections 662, 664, 666, and 668 may have any one or more the properties of projections 604, 606, or 608 disclosed herein. For example, projections 662, 664, 666, and 668 may be metallic or plastic, and may be circular cylindrical or polygonal cylindrical. In one aspect, projections 662, 664, 666, and 668 may about the same length; in other aspects, the lengths of projections 662, 664, 666, and 668 may vary. Though the nested assembly 660 shown in FIG. 63 includes four nested projections, according to aspects of the invention, assembly 660 may have two or more projections.

In one aspect of the invention, the nested assembly 660 of projections 662, 664, 666, and 668 may be received by cavity 654 as shown in FIGS. 61 and 62. In other words, cavity 654 may be sized and adapted to receive a nested assembly 660. For example, in one aspect, a nested assembly 660 of projections may be inserted into one or more cavities 654 on a sidewall 603 of housing 602 or within a cavity within housing 602, for instance, to facilitate storage or handling.

As disclosed herein, embodiments of the invention, in their many aspects, provide systems, devices, and methods for introducing a stream of drying air to articles, for example, articles of clothing, for instance, foot wear (for example, ski boots, snowboard boots, shoes, boots, work boots, sneakers, skates, cleats, soccer boots, socks, and the like); hand wear (for example, gloves, work gloves, ski gloves, hockey gloves, mittens, and the like); over coats (for example, ski wear, parkas, jackets, leg wear (for example, pants, ski pants, trousers, and the like); and other clothes or garments to dry the article and, for example, facilitate further use. Aspects of the invention may be adapted for use in firehouses, for example, to dry firemen's boots. Aspects of the invention may also be adapted for use by athletes, for example, in locker rooms, for instance, hockey locker rooms, for drying hockey gloves, hockey skates, and other gear, or in football locker rooms to dry footwear, helmets, and other gear. Aspects of the invention may be uniquely adapted to drying winter clothing, in particular, after a day on the skiing or sledding, but other aspects of the invention may be used for drying any form of clothing, including damp swim wear and beach towels. In addition to residential or resort use, aspects of the invention may also be used in commercial and/or industrial applications where the drying of articles, for example, fabrics, work gear, or manufactured articles is desired.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

While several aspects of the present invention have been described and depicted herein, alternative aspects may be affected by those skilled in the art to accomplish the same objectives. Accordingly, it is intended by the appended claims to cover all such alternative aspects as fall within the true spirit and scope of the invention.

The invention claimed is:

1. An apparel drying assembly comprising:

a housing having an internal passage;

a plurality of projections, each of the plurality of projections pivotally mounted to the housing, having an inlet in fluid communication with the internal passage of the housing, at least one outlet, and an internal passage communicating the inlet to the at least one outlet, and wherein each of the plurality of projections [are] *is* pivotally extendable *from a retracted position wherein the internal passage of the projection is generally vertical* into at least one extended position *wherein the internal passage of the projection is non-vertical and the projection is* adapted to receive an apparel; and a source of pressurized air having an outlet in fluid communication with the internal passage of the housing, wherein the pressurized air passes through the internal passage of the housing, into each inlet, through each internal passage, and out each of the at least one outlet to contact and at least partially dry the apparel received by at least one of the plurality of projections;

wherein, when extended in the at least one extended position, at least one of the plurality of projections is oriented in a first direction and wherein, when extended in the at least one extended position, at least one of another of the plurality of projections is oriented in a second direction, different from the first direction; and

[wherein each of the plurality of pivotally mounted projections comprises a retracted position, wherein, in the retracted position, a surface of each of the plurality of pivotally mounted projections is substantially coplanar with an external surface of the housing]

*wherein each of the plurality of pivotally mounted projections further comprises an extension from a proximal end, the extension positioned to deflect a valve element allowing the pressurized air into the internal passage of the projection when the pivotally mounted projection is pivotally rotated to the at least one extended position to receive the apparel.*

2. The drying assembly as recited in claim 1, wherein the second direction, different from the first direction, is oriented at least 5 degrees circumferentially from the first direction.

3. The drying assembly as recited in claim 1, wherein the second direction, different from the first direction, is oriented at least 15 degrees circumferentially from the first direction.

4. The drying assembly as recited in claim 1, wherein the second direction, different from the first direction, is oriented 90 degrees circumferentially from the first direction.

5. The drying assembly as recited in claim 1, wherein the housing comprises a vertically-oriented housing.

6. The drying assembly as recited in claim 5, wherein the vertically-oriented housing comprises a vertically-oriented cylindrical housing.

7. The drying assembly as recited in claim 6, wherein the vertically-oriented cylindrical housing comprises one of polygonal cylindrical housing, a circular cylindrical housing, and an elliptical cylindrical housing.

[8. The drying assembly as recited in claim 1, wherein the housing comprises at least one passage in fluid communication with the outlet of the source of pressurized air and the inlet of each of the plurality of projections.]

9. The drying assembly as recited in claim 1, wherein the drying assembly is portable.

10. The drying assembly as recited in claim 9, wherein the portable drying assembly further comprises a carrying handle or carrying strap.

[11. The drying assembly as recited in claim 1, wherein the pivotally mounted projection further comprises an extension from a proximal end of the pivotally mounted projection, the extension positioned to deflect a valve element when the pivotally mounted projection is rotated into the at least one position adapted to receive the apparel.]

12. The drying assembly as recited in claim [11] *1*, wherein the valve element comprises a deflectable baffle mounted to the housing.

13. The drying assembly as recited in claim 12, wherein, when the deflectable baffle is not deflected, the baffle at least partially obstructs an opening in the housing between the source of pressurized air and the pivotally mounted projection, and wherein, when the deflectable baffle is deflected by the extension, at least some pressurized air is allowed to pass to the internal passage of the pivotally mounted projection.

14. The drying assembly as recited in claim [11] *1*, wherein the extension from the proximal end of the pivotally mounted projection comprises at least one of an extension of the pivotally mounted projection, a projection, a tab, a pin, a rod, and a bar.

[15. The drying assembly as recited in claim 1, wherein the second direction is 90 degrees circumferentially from the first direction.]

16. A method of drying apparel, the method comprising:

pivotally mounting a plurality of projections to a housing having an internal passage, each of the plurality of projections pivotally mounted to the housing, having an inlet in fluid communication with the internal passage of the housing, having at least one outlet, having an internal passage communicating the inlet to the at least one outlet[;], and pivotally extendable *from a retracted position wherein the internal passage of the projection is generally vertical* into at least one extended position *wherein the internal passage of the projection is non-vertical and the projection is* adapted to receive apparel;

pivotally extending at least one of the plurality of projections [in the at least one extended position] in a first direction [from the surface of the housing] *to the at least one extended position and contacting a first valve element with an* extension of the at least one of the plurality of projections and deflecting the first valve element;

pivotally extending at least one *of another* of the plurality of projections in the at least one extended position in a second direction, different from the first direction;

mounting apparel on to at least one of the extended projections;

passing pressurized air to the inlet, through the internal passage, and out the at least one outlet of the at least one of the extended projections; *and* contacting the air discharged from the at least one outlet upon the apparel [to] *and* at least partially [dry] *drying* the apparel[; and after contacting the air and at least partially dry the apparel, pivotally retracting the plurality of projections into a retracted position wherein a surface of each of the plurality of pivotally mounted projections is substantially coplanar with an external surface of the housing].

17. The method as recited in claim 16, wherein pivotally extending the at least one of the plurality of projections in the at least one extended position in a second direction comprises pivotally extending the at least one of the plurality of projections in the second direction at least 5 degrees circumferentially from the first direction.

18. The method as recited in claim 16, wherein pivotally extending the at least one of the plurality of projections in the at least one extended position in a second direction comprises pivotally extending the at least one of the plurality of projections in the second direction at least 15 degrees circumferentially from the first direction.

19. The method as recited in claim 16, wherein pivotally extending the at least one of the plurality of projections in the at least one extended position in a second direction comprises pivotally extending the at least one of the plurality of projections in the second direction 90 degrees circumferentially from the first direction.

[20. The method as recited in claim 16, wherein the method further comprises, after pivotally retracting the plurality of projections, transporting the housing with the plurality of projections.]

*21. The drying assembly as recited in claim 1, wherein the retracted position further comprises having a surface of each of the plurality of pivotally mounted projections substantially coplanar with an external surface of the housing.*

*22. The method as recited in claim 16, wherein, after contacting the air discharged from the at least one outlet upon the apparel and at least partially drying the apparel, pivotally retracting the plurality of projections into the retracted position wherein a surface of each of the plurality of pivotally mounted projections is substantially coplanar with an external surface of the housing.*

*23. The method as recited in claim 22, wherein the method further comprises, after pivotally retracting the plurality of projections, transporting the housing with the plurality of projections.*

*24. The method as recited in claim 22, wherein the method further comprises, while pivotally extending the at least one of another of the plurality of projections in the at least one extended position in a second direction, contacting a second valve element with an extension of the at least one of another of the plurality of projections and deflecting the second valve element.*

* * * * *